United States Patent
Baarman et al.

(10) Patent No.: US 9,424,446 B2
(45) Date of Patent: Aug. 23, 2016

(54) POINT OF SALE INDUCTIVE SYSTEMS AND METHODS

(71) Applicant: Access Business Group International LLC, Ada, MI (US)

(72) Inventors: David W. Baarman, Fennville, MI (US); Scott A. Mollema, Rockford, MI (US); William T. Stoner, Jr., Ada, MI (US)

(73) Assignee: ACCESS BUSINESS GROUP INTERNATIONAL LLC, Ada, MI (US)

( * ) Notice: Subject to any disclaimer, the term of this patent is extended or adjusted under 35 U.S.C. 154(b) by 0 days.

(21) Appl. No.: 14/682,364

(22) Filed: Apr. 9, 2015

(65) Prior Publication Data

US 2015/0242660 A1   Aug. 27, 2015

Related U.S. Application Data

(63) Continuation of application No. 13/082,513, filed on Apr. 8, 2011, now Pat. No. 9,027,840.

(60) Provisional application No. 61/427,984, filed on Dec. 29, 2010, provisional application No. 61/322,056, filed on Apr. 8, 2010.

(51) Int. Cl.
*G06K 19/06* (2006.01)
*G06K 7/08* (2006.01)
(Continued)

(52) U.S. Cl.
CPC ............. *G06K 7/086* (2013.01); *D06F 93/005* (2013.01); *G01F 23/20* (2013.01); *G01F 23/24* (2013.01);

(Continued)

(58) Field of Classification Search
CPC ........... G06K 19/0723; G06K 19/077; G06K 7/086; G06Q 10/087; G06Q 10/08
USPC ................ 235/375, 385, 439, 440, 487, 492
See application file for complete search history.

(56) References Cited

U.S. PATENT DOCUMENTS

| | | |
|---|---|---|
| 3,684,853 A | 8/1972 | Welch et al. |
| 3,742,178 A | 6/1973 | Harnden, Jr. |

(Continued)

FOREIGN PATENT DOCUMENTS

| | | |
|---|---|---|
| CA | 2 275 239 | 7/1998 |
| DE | 44 39 095 | 5/1996 |

(Continued)

OTHER PUBLICATIONS

AlertMe Project Research, AlertMe.com Ltd., pp. 1-3.

(Continued)

*Primary Examiner* — Paultep Savusdiphol
(74) *Attorney, Agent, or Firm* — Warner Norcross & Judd LLP

(57) ABSTRACT

Systems and methods for the identification, powering and control of products and product packaging. The systems can include a point of sale display having a contactless power supply. The contactless power supply can provide a source of wireless power for products and product packaging. The products and product packaging can include light emitting diodes, e-ink displays and printed speaker circuits that activate as the operating frequency of the contactless power supply varies. Other embodiments include product level sensors, inductive reader networks, printed temperature sensors, product alignment systems, passive identification circuits and methods for controlling operation of the same.

20 Claims, 73 Drawing Sheets

(51) Int. Cl.
| | | |
|---|---|---|
| *D06F 93/00* | (2006.01) | |
| *G01F 23/20* | (2006.01) | |
| *G01F 23/24* | (2006.01) | |
| *G01F 23/26* | (2006.01) | |
| *G01G 7/00* | (2006.01) | |
| *G01G 19/414* | (2006.01) | |
| *G06K 19/067* | (2006.01) | |
| *G06K 19/07* | (2006.01) | |
| *A47F 10/02* | (2006.01) | |
| *H01F 21/02* | (2006.01) | |
| *H01F 38/14* | (2006.01) | |
| *G06F 3/147* | (2006.01) | |

(52) U.S. Cl.
CPC ............ *G01F 23/244* (2013.01); *G01F 23/26* (2013.01); *G01G 7/00* (2013.01); *G01G 19/4144* (2013.01); *G06K 19/0672* (2013.01); *G06K 19/0717* (2013.01); *G06K 19/0723* (2013.01); *A47F 10/02* (2013.01); *G06F 3/147* (2013.01); *G09G 2370/16* (2013.01); *G09G 2380/04* (2013.01); *H01F 21/02* (2013.01); *H01F 38/14* (2013.01); *Y10T 29/49002* (2015.01)

(56) References Cited

U.S. PATENT DOCUMENTS

| | | | |
|---|---|---|---|
| 3,745,676 A | 7/1973 | Dikoff | |
| 3,760,149 A | 9/1973 | Harsanyi | |
| 3,761,668 A | 9/1973 | Harnden, Jr. et al. | |
| 4,160,971 A | 7/1979 | Jones et al. | |
| 4,183,001 A | 1/1980 | Brooks et al. | |
| 4,268,737 A | 5/1981 | Paschakarnis et al. | |
| 4,351,996 A | 9/1982 | Kondo et al. | |
| 4,428,232 A | 1/1984 | Tanaka et al. | |
| 4,430,553 A | 2/1984 | Antimovski | |
| 4,499,355 A | 2/1985 | Walter | |
| 4,563,739 A | 1/1986 | Gerpheide et al. | |
| 4,694,283 A | 9/1987 | Reeb | |
| 4,727,402 A | 2/1988 | Smith | |
| 4,752,680 A * | 6/1988 | Larsson | G01V 15/00 235/451 |
| 4,774,395 A | 9/1988 | Yabuuchi et al. | |
| 4,827,104 A | 5/1989 | Foster, Jr. | |
| 4,845,486 A | 7/1989 | Knight et al. | |
| 4,996,405 A | 2/1991 | Poumey et al. | |
| 5,039,838 A | 8/1991 | Ito et al. | |
| 5,117,092 A | 5/1992 | Shimizu et al. | |
| 5,119,070 A | 6/1992 | Matsumoto et al. | |
| 5,120,934 A | 6/1992 | Nakada et al. | |
| 5,221,088 A | 6/1993 | McTeigue et al. | |
| 5,271,643 A | 12/1993 | Hafele | |
| 5,291,180 A | 3/1994 | Reeb | |
| 5,305,199 A | 4/1994 | LoBiondo et al. | |
| 5,381,137 A * | 1/1995 | Ghaem | G08B 13/2414 29/846 |
| 5,446,447 A * | 8/1995 | Carney | G06K 19/0672 340/10.34 |
| 5,450,305 A | 9/1995 | Boys et al. | |
| 5,537,126 A | 7/1996 | Kayser et al. | |
| 5,640,002 A | 6/1997 | Ruppert et al. | |
| 5,648,008 A | 7/1997 | Barritt et al. | |
| 5,661,470 A | 8/1997 | Karr | |
| 5,736,967 A | 4/1998 | Kayser et al. | |
| 5,802,749 A | 9/1998 | Barmentlo et al. | |
| 5,831,531 A | 11/1998 | Tuttle | |
| 5,838,235 A | 11/1998 | Thorigne | |
| 5,842,976 A | 12/1998 | Williamson | |
| 5,908,574 A | 6/1999 | Keogh | |
| 5,954,984 A | 9/1999 | Ablah et al. | |
| 5,991,170 A | 11/1999 | Nagai et al. | |
| 5,991,676 A | 11/1999 | Podoloff et al. | |
| 6,016,550 A | 1/2000 | Kokkosoulis et al. | |
| 6,025,725 A * | 2/2000 | Gershenfeld | H01F 17/0006 324/652 |
| 6,027,027 A | 2/2000 | Smithgall | |
| 6,040,986 A | 3/2000 | Sakamoto et al. | |
| 6,080,975 A | 6/2000 | Kuse et al. | |
| 6,087,837 A | 7/2000 | Chase | |
| 6,089,453 A | 7/2000 | Kayser et al. | |
| 6,109,117 A | 8/2000 | Stanley et al. | |
| 6,122,849 A | 9/2000 | Kida et al. | |
| 6,133,833 A | 10/2000 | Sidlauskas et al. | |
| 6,138,389 A | 10/2000 | Kanazawa et al. | |
| 6,140,899 A | 10/2000 | Kayser et al. | |
| 6,169,483 B1 | 1/2001 | Ghaffari et al. | |
| 6,173,119 B1 | 1/2001 | Manico et al. | |
| 6,181,299 B1 | 1/2001 | Frederick et al. | |
| 6,184,651 B1 | 2/2001 | Fernandez et al. | |
| 6,189,036 B1 | 2/2001 | Kao | |
| 6,204,763 B1 * | 3/2001 | Sone | A47G 29/141 221/2 |
| 6,209,831 B1 | 4/2001 | Kiplinger et al. | |
| 6,232,585 B1 | 5/2001 | Clothier et al. | |
| 6,249,263 B1 | 6/2001 | Kayser et al. | |
| 6,262,664 B1 | 7/2001 | Maloney | |
| 6,266,052 B1 | 7/2001 | Kayser et al. | |
| 6,271,807 B1 | 8/2001 | Kayser et al. | |
| 6,274,856 B1 | 8/2001 | Clothier et al. | |
| 6,304,169 B1 * | 10/2001 | Blama | G06K 7/086 235/380 |
| 6,307,468 B1 | 10/2001 | Ward, Jr. | |
| 6,313,748 B1 | 11/2001 | Lake | |
| 6,316,753 B2 | 11/2001 | Clothier et al. | |
| 6,320,169 B1 | 11/2001 | Clothier | |
| 6,341,522 B1 | 1/2002 | Goss et al. | |
| 6,348,640 B1 | 2/2002 | Navot et al. | |
| 6,360,208 B1 | 3/2002 | Ohanian et al. | |
| 6,361,396 B1 | 3/2002 | Snyder et al. | |
| 6,364,735 B1 | 4/2002 | Bristow et al. | |
| 6,404,779 B1 | 6/2002 | Silvers | |
| 6,407,665 B2 | 6/2002 | Maloney | |
| 6,409,132 B2 | 6/2002 | Heisler et al. | |
| 6,424,254 B1 | 7/2002 | Rydel | |
| 6,426,707 B1 | 7/2002 | Prieto et al. | |
| 6,427,065 B1 | 7/2002 | Suga et al. | |
| 6,444,961 B2 | 9/2002 | Clothier et al. | |
| 6,476,716 B1 | 11/2002 | Ledlow | |
| 6,479,964 B2 | 11/2002 | Woodroffe et al. | |
| 6,501,054 B2 | 12/2002 | Engelmann et al. | |
| 6,504,135 B2 | 1/2003 | Clothier et al. | |
| 6,505,780 B1 | 1/2003 | Yassin et al. | |
| 6,507,279 B2 | 1/2003 | Loof | |
| 6,509,555 B1 | 1/2003 | Riess et al. | |
| 6,531,957 B1 | 3/2003 | Nysen | |
| 6,552,663 B2 | 4/2003 | Swartzel et al. | |
| 6,554,188 B1 | 4/2003 | Johnson et al. | |
| 6,555,766 B2 | 4/2003 | Breed et al. | |
| 6,571,299 B1 | 5/2003 | Schroyer et al. | |
| 6,600,419 B2 | 7/2003 | Barritz | |
| 6,609,656 B1 | 8/2003 | Elledge | |
| 6,621,410 B1 | 9/2003 | Lastinger et al. | |
| 6,657,170 B2 | 12/2003 | Clothier | |
| 6,664,520 B2 | 12/2003 | Clothier | |
| 6,727,482 B2 | 4/2004 | Bassil et al. | |
| 6,727,817 B2 | 4/2004 | Maloney | |
| 6,738,689 B2 | 5/2004 | Sansone | |
| 6,741,178 B1 | 5/2004 | Tuttle | |
| 6,752,277 B1 | 6/2004 | Sempliner | |
| 6,753,830 B2 | 6/2004 | Gelbman | |
| 6,774,346 B2 | 8/2004 | Clothier | |
| 6,810,313 B2 | 10/2004 | Cooper et al. | |
| 6,822,204 B2 | 11/2004 | Clothier | |
| 6,823,321 B2 | 11/2004 | Johnson et al. | |
| 6,825,620 B2 | 11/2004 | Kuennen et al. | |
| 6,844,821 B2 | 1/2005 | Swartzel et al. | |
| 6,859,745 B2 | 2/2005 | Carr et al. | |
| 6,912,364 B2 | 6/2005 | Kim | |
| 6,924,781 B1 | 8/2005 | Gelbman | |
| 6,953,919 B2 | 10/2005 | Clothier | |
| 6,957,111 B2 | 10/2005 | Zhu et al. | |
| 6,959,862 B2 | 11/2005 | Neumark | |

(56) References Cited

U.S. PATENT DOCUMENTS

| | | | |
|---|---|---|---|
| 6,966,403 B1 | 11/2005 | Chandra | |
| 6,972,543 B1 | 12/2005 | Wells | |
| 7,036,729 B2 | 5/2006 | Chung | |
| 7,042,902 B2 | 5/2006 | Silvers et al. | |
| 7,065,501 B1 | 6/2006 | Brown et al. | |
| 7,072,855 B1 | 7/2006 | Godlewski et al. | |
| 7,088,245 B2 | 8/2006 | Guntersdorfer et al. | |
| 7,123,129 B1 | 10/2006 | Schrott et al. | |
| 7,154,255 B2 | 12/2006 | Toya | |
| 7,208,707 B2 | 4/2007 | Clothier et al. | |
| 7,212,127 B2 | 5/2007 | Jacober et al. | |
| 7,212,414 B2 | 5/2007 | Baarman | |
| 7,228,078 B2 | 6/2007 | Okochi | |
| 7,233,241 B2 | 6/2007 | Overhultz et al. | |
| 7,242,301 B2 | 7/2007 | August et al. | |
| 7,336,175 B2 | 2/2008 | Howarth et al. | |
| 7,355,150 B2 * | 4/2008 | Baarman | H05B 6/062 219/506 |
| 7,392,948 B2 | 7/2008 | Smith et al. | |
| 7,443,057 B2 | 10/2008 | Nunally | |
| 7,478,749 B2 | 1/2009 | Clothier et al. | |
| 7,492,164 B2 | 2/2009 | Hanhikorpi et al. | |
| 7,513,425 B2 | 4/2009 | Chung | |
| 7,573,005 B2 | 8/2009 | Clothier | |
| 7,648,065 B2 | 1/2010 | Marino | |
| 7,667,602 B2 | 2/2010 | Ulrich | |
| 7,699,226 B2 | 4/2010 | Smith et al. | |
| 7,775,083 B2 * | 8/2010 | Potyrailo | G01N 27/021 73/19.01 |
| 7,794,142 B2 | 9/2010 | Clothier et al. | |
| 7,816,632 B2 | 10/2010 | Bourke, III et al. | |
| 7,818,088 B2 | 10/2010 | Andersen et al. | |
| 7,830,259 B2 | 11/2010 | Walker et al. | |
| 7,865,071 B2 | 1/2011 | Baarman | |
| 7,923,938 B2 | 4/2011 | Sokola | |
| 7,937,289 B2 | 5/2011 | Bodin et al. | |
| 7,940,181 B2 | 5/2011 | Ramachandra | |
| 7,954,712 B2 | 6/2011 | Babcock et al. | |
| RE42,513 E | 7/2011 | Clothier | |
| 7,989,986 B2 | 8/2011 | Baarman et al. | |
| 7,999,414 B2 | 8/2011 | Brühn | |
| 8,077,041 B2 | 12/2011 | Stern et al. | |
| 8,154,409 B2 | 4/2012 | Rasband et al. | |
| 8,192,080 B2 | 6/2012 | Clothier | |
| 8,251,581 B2 | 8/2012 | Clothier et al. | |
| 8,258,441 B2 | 9/2012 | Clothier | |
| 8,286,497 B2 | 10/2012 | Clothier et al. | |
| 8,342,400 B1 | 1/2013 | Reese | |
| 8,350,196 B2 | 1/2013 | Buchanan | |
| 8,389,910 B2 | 3/2013 | Bourke, III et al. | |
| 8,468,871 B2 * | 6/2013 | Potyrailo | G01N 27/021 73/19.01 |
| 2001/0001856 A1 | 5/2001 | Gould et al. | |
| 2001/0004235 A1 | 6/2001 | Maloney | |
| 2002/0017993 A1 * | 2/2002 | Blama | G06K 7/086 340/572.1 |
| 2002/0022991 A1 | 2/2002 | Sharood et al. | |
| 2002/0035524 A1 | 3/2002 | Husslage | |
| 2002/0048287 A1 | 4/2002 | Silvers | |
| 2002/0049650 A1 | 4/2002 | Reff | |
| 2002/0089410 A1 | 7/2002 | Janiak et al. | |
| 2002/0116268 A1 | 8/2002 | Fukuda | |
| 2002/0116301 A1 | 8/2002 | Chapman et al. | |
| 2002/0143320 A1 | 10/2002 | Levin | |
| 2002/0152178 A1 | 10/2002 | Lee | |
| 2002/0157411 A1 * | 10/2002 | Ishikawa | B65D 5/42 62/231 |
| 2002/0178063 A1 | 11/2002 | Gravelle et al. | |
| 2002/0186133 A1 | 12/2002 | Loof | |
| 2002/0191534 A1 | 12/2002 | Silvers et al. | |
| 2003/0057167 A1 | 3/2003 | Johnson et al. | |
| 2003/0117330 A1 * | 6/2003 | Guntersdorfer | G06K 19/0672 343/742 |
| 2003/0120607 A1 | 6/2003 | Piotrowski | |
| 2003/0125836 A1 | 7/2003 | Chirnomas | |
| 2003/0135417 A1 | 7/2003 | Bodin | |
| 2003/0171984 A1 | 9/2003 | Wodka et al. | |
| 2003/0174099 A1 | 9/2003 | Bauer et al. | |
| 2003/0177053 A1 | 9/2003 | Otto | |
| 2003/0189094 A1 | 10/2003 | Trabitz | |
| 2003/0220803 A1 | 11/2003 | Giaquinto et al. | |
| 2004/0004073 A1 | 1/2004 | Clothier | |
| 2004/0032330 A1 | 2/2004 | Hoffman | |
| 2004/0046020 A1 | 3/2004 | Andreasson et al. | |
| 2004/0071321 A1 | 4/2004 | Watkins et al. | |
| 2004/0093274 A1 | 5/2004 | Vanska et al. | |
| 2004/0098350 A1 | 5/2004 | Labrou et al. | |
| 2004/0125403 A1 | 7/2004 | Furst et al. | |
| 2004/0130915 A1 | 7/2004 | Baarman | |
| 2004/0130916 A1 | 7/2004 | Baarman | |
| 2004/0134903 A1 | 7/2004 | Chun | |
| 2004/0149736 A1 | 8/2004 | Clothier | |
| 2005/0007067 A1 | 1/2005 | Baarman et al. | |
| 2005/0031051 A1 | 2/2005 | Rosen et al. | |
| 2005/0049914 A1 | 3/2005 | Parish | |
| 2005/0067410 A1 | 3/2005 | Ring | |
| 2005/0131578 A1 | 6/2005 | Weaver | |
| 2005/0151511 A1 | 7/2005 | Chary | |
| 2005/0167959 A1 | 8/2005 | Speckhart et al. | |
| 2005/0190072 A1 | 9/2005 | Brown et al. | |
| 2005/0247696 A1 | 11/2005 | Clothier | |
| 2005/0275533 A1 | 12/2005 | Hanhikorpi et al. | |
| 2006/0132045 A1 | 6/2006 | Baarman | |
| 2006/0145864 A1 | 7/2006 | Jacober et al. | |
| 2006/0192003 A1 | 8/2006 | Chung | |
| 2006/0205381 A1 | 9/2006 | Beart et al. | |
| 2006/0210115 A1 | 9/2006 | Nemet | |
| 2007/0023510 A1 | 2/2007 | Smith et al. | |
| 2007/0023511 A1 | 2/2007 | Smith et al. | |
| 2007/0138923 A1 | 6/2007 | Sokola | |
| 2007/0228833 A1 | 10/2007 | Stevens et al. | |
| 2007/0236174 A1 * | 10/2007 | Kaye | H02J 7/025 320/112 |
| 2007/0279286 A1 | 12/2007 | Coutts et al. | |
| 2008/0000894 A1 * | 1/2008 | Baarman | H05B 1/02 219/601 |
| 2008/0052037 A1 | 2/2008 | Bodin et al. | |
| 2008/0157603 A1 * | 7/2008 | Baarman | H04B 5/0037 307/104 |
| 2008/0217999 A1 * | 9/2008 | Baarman | H05B 6/062 307/104 |
| 2008/0266092 A1 | 10/2008 | Campero et al. | |
| 2008/0283599 A1 | 11/2008 | Rasband et al. | |
| 2009/0168088 A1 | 7/2009 | Rosenblatt | |
| 2009/0224040 A1 | 9/2009 | Kushida et al. | |
| 2009/0254419 A1 | 10/2009 | Mochizuki et al. | |
| 2009/0278493 A1 * | 11/2009 | Alden | H01R 13/6633 320/108 |
| 2009/0284179 A1 | 11/2009 | Ray et al. | |
| 2009/0295749 A1 | 12/2009 | Sato et al. | |
| 2009/0309736 A1 | 12/2009 | Heurtier | |
| 2009/0313142 A1 | 12/2009 | Hiruma et al. | |
| 2010/0006646 A1 | 1/2010 | Stiller | |
| 2010/0052908 A1 | 3/2010 | Doan et al. | |
| 2010/0064901 A1 | 3/2010 | Clothier et al. | |
| 2010/0065632 A1 | 3/2010 | Babcock et al. | |
| 2010/0079416 A1 | 4/2010 | Chung et al. | |
| 2010/0156650 A1 | 6/2010 | Stern | |
| 2010/0315389 A1 | 12/2010 | Sorrell et al. | |
| 2011/0038395 A1 | 2/2011 | Sorkine et al. | |
| 2011/0090937 A1 | 4/2011 | Malyshev et al. | |
| 2012/0205837 A1 | 8/2012 | Clothier | |
| 2012/0230365 A1 | 9/2012 | Clothier | |
| 2012/0250726 A1 | 10/2012 | Sorkine | |
| 2013/0015177 A1 | 1/2013 | Clothier | |

FOREIGN PATENT DOCUMENTS

| | | |
|---|---|---|
| DE | 195 02 935 | 8/1996 |
| DE | 10 05 2689 | 5/2002 |
| EP | 0 267 009 | 5/1988 |
| EP | 0 394 148 | 10/1990 |
| EP | 0 260 788 | 4/1993 |
| EP | 0 804 051 | 10/1997 |

(56) References Cited

FOREIGN PATENT DOCUMENTS

| | | |
|---|---|---|
| EP | 0 831 379 | 10/2002 |
| EP | 1 496 469 | 1/2005 |
| EP | 2 051 049 | 4/2009 |
| GB | 2 371 129 | 7/2002 |
| GB | 2 392 171 | 2/2004 |
| GB | 2 409 282 | 6/2005 |
| JP | H06-020766 | 1/1994 |
| JP | H07-139991 | 6/1995 |
| JP | H10-165294 | 6/1998 |
| JP | H10-215530 | 8/1998 |
| JP | 2000-190457 | 7/2000 |
| JP | 2000-295796 | 10/2000 |
| JP | 2002-075615 | 3/2002 |
| JP | 2004-144683 | 5/2004 |
| JP | 2007-115152 | 5/2007 |
| TW | 407106 | 10/2000 |
| WO | 97/34518 | 9/1997 |
| WO | 98/28126 | 7/1998 |
| WO | 99/15990 | 4/1999 |
| WO | 01/19141 | 3/2001 |
| WO | 03/044521 | 5/2003 |
| WO | 2005/018282 | 2/2005 |
| WO | 2005/072013 | 8/2005 |
| WO | 2006/001557 | 1/2006 |
| WO | 2009/004542 | 1/2009 |
| WO | 2009/143334 | 11/2009 |
| WO | 2010/080738 | 7/2010 |

OTHER PUBLICATIONS

Printed Electronic Inks and Printed Electronic Applications, Henkel Corporation, pp. 1-2.
Cerepak Electronic Compliance Packaging, MeadWestvaco, dated Aug. 28, 2008, pp. 1-2.
Dosepak Unit-Dose Medication Packaging, MeadWestvaco, dated Aug. 28, 2008, pp. 1-2.
Healthcare Packaging, MeadWestvaco, dated Aug. 28, 2008, pp. 1-2.
Shellpak Unit-Dose Medication Packaging, MeadWestvaco, dated Aug. 28, 2008, pp. 1-2.
Temperature Sensor Printed on Foil, Fraunhofer IZM, p. 1.
International Search Report and the Written Opinion of the International Searching Authority for International Application No. PCT/US2011/031661, mailed Nov. 8, 2011.

\* cited by examiner

POINT OF SALE INDUCTIVE SYSTEMS AND METHODS

BACKGROUND OF THE INVENTION

The present invention relates to inductive systems and methods at the point of sale and in other locations.

Point of sale systems can generally include a series of shelving units and associated signage. Gondola shelving units, for example, benefit from being inexpensive, reconfigurable, and capable of displaying a variety of products. Signage can include source information, product information and/or sale information to promote or otherwise draw attention to a corresponding product. For example, signage can include placards affixed to or placed proximate the corresponding shelving unit.

Point of sale systems have also benefited from recent improvements in product packaging. Contemporary product packaging increasingly utilizes RFID labels as one aspect of inventory control, anti-counterfeiting and/or tamper-proofing measures. Product packaging can also serve more traditional functions, including providing a secure housing for a product while also displaying product specifications, compatibility information, power requirements, and hardware requirements.

In addition, point of sale systems can include a network of check-out terminals to monitor product inventory. For example, known inventory control systems include a network of terminals having magnetic stripe readers, bar code readers, check acceptance systems and/or fraud detection systems. Such inventory control systems can automatically reorder a product when the store inventory falls below a given level or in anticipation of an increase in product demand.

While the aforementioned point of sale systems are widely accepted, they suffer from a number of shortcomings. For example, the ability to interact with the product is limited in many display and packaging designs. In addition, losses in battery charge can occur, particularly where a product remains in inventory for an extended period. The visual inspection of product quantities can also become necessary at the point of sale, as inventory control typically occurs at check-out, but not before.

Accordingly, there remains a continued need for improved systems and methods for promoting products and product information at the point of sale. In addition, there remains a continual need for improved systems and methods to leverage the benefits of existing inventory control systems and to improve product identification and automatic reordering at the point of sale, at home, and in other locations.

SUMMARY OF THE INVENTION

Embodiments of the invention provide inductive systems and methods for the identification, powering and control of products and product packaging.

According to one embodiment, systems and methods for monitoring product levels are provided. The system can include a product container having a product level sensor and a passive tuned circuit whose impedance varies based on the amount of product remaining. The system can further include an inductive reader having a primary coil to monitor the impedance of the passive tuned circuit. The system can be configured to monitor product levels for liquids, loose articles, and rolls of sheet material, for example. When product levels fall below a predetermined level, additional product quantities can be automatically reordered in some embodiments.

According to another embodiment, localized clusters of inductive readers are positioned at various locations throughout a home, a restaurant or other locations. For example, a localized cluster may be positioned in a refrigerator, in a laundry room, in a medicine cabinet, in a cleaning supplies closet, and/or in a cleaning supplies caddy. The inductive readers can be operable to determine both the identity of a product and the amount of a product remaining. In one embodiment, a localized cluster of inductive readers can monitor caloric consumption based on the amount of products remaining after a given period. In another embodiment, a localized cluster of inductive readers can assist in recipe preparation. In still another embodiment, a localized cluster of inductive readers can generate a shopping list based on remaining levels of food products in a pantry or elsewhere.

According to another embodiment, systems and methods for heating food products are provided. The system can include a product container having a temperature sensor and a passive tuned circuit whose impedance varies based on the temperature of the product container. The system can further include a primary coil to monitor the impedance of the passive tuned circuit associated with the product container. The system can be configured to provide a source of wireless power to a heating element associated with the product container when the temperature falls below desired levels. In some embodiments, the heating element can include a ferromagnetic material that reacts to a time-varying electromagnetic field. In other embodiments, the heating element can be electrically connected to a secondary tank circuit.

According to another embodiment, systems and methods for providing a source of wireless power to a portable heating appliance are provided. The system can include a contactless power supply and a portable appliance including a heating element electrically connected to a secondary coil. In one embodiment, the heating element is a ferromagnetic heating element. In another embodiment, the portable appliance is a cordless iron and the contactless power supply is incorporated into a stowable ironing board. In this embodiment, the cordless iron can include a passive identification circuit defining an inductive identification profile.

According to another embodiment, a product alignment system and method are provided. The system can include a display surface having one or more primary coils for providing a source of wireless power to a secondary coil in a product or product container. The system can include a guide plate to urge the product or product container to a position in alignment with the one or more primary coils. In one embodiment, only the leading product among a row of products will be in alignment with the one or more primary coils. In another embodiment, the one or more primary coils can provide a source of wireless power to an LED, a speaker, a battery or other device associated with the leading product or product container.

According to another embodiment, systems and methods for providing a source of wireless power to product packaging are provided. The system can include a product container having a secondary tank circuit electrically coupled to one or more visual elements, speaker elements or both. The visual elements can include one or more LEDs, OLEDs, LCD displays and e-ink displays, and the speaker element can include an electrostatic speaker, for example. In one embodiment, the secondary tank circuit can be formed on a printed label adhered to the product container. The printed label can include an upper portion supporting a load, and a lower portion supporting a secondary tank circuit. The upper portion can be sized to conform to a product container sidewall, and the lower portion can be sized to conform to a product container base.

According to another embodiment, systems and methods for wireless identification of a product are provided. The system can include a plurality of products or product containers each having one or more resonant circuits. An inductive reader can identify the product or the product container based on a resonant frequency of each resonant circuit and a numerical key. The numerical key can include a prime number assigned to each resonant frequency. In one embodiment, the resonant circuits can each include shielding layers to selectively vary the reflected impedance of a corresponding secondary coil. In another embodiment, the resonant circuits at least partially overlie each other to selectively vary the combined reflected impedance of the resonant circuits.

According to another embodiment, a printed secondary circuit is provided. The printed secondary circuit can include a substrate defining a perforation and a resonant circuit supported by the substrate across the perforation, where separation of the substrate along the perforation varies the inductive identification profile of the printed secondary circuit. The inductive identification profile can indicate a battery is in need of additional charge, while in other embodiments the inductive identification profile can indicate the desired temperature setting for an item within a product container.

According to another embodiment, a printed secondary circuit for a load is provided. The printed secondary circuit can include a non-conducting substrate, a first printed winding supported by the substrate and defining a inner diameter, and a second printed winding supported by the substrate and defining an outer diameter less than the inner diameter. The second printed winding can include first and second end portions for connection to a load. The first and second printed windings can be substantially coaxial, and the substrate can adhere to a product or product container. The first and second end portions can extend across portions of the first printed winding. The first and second printed windings can be disposed on one side of the non-conducting substrate or on opposing sides of the non-conducting substrate.

These and other advantages and features of the present invention will be more fully understood and appreciated in view of the description of the current embodiments and the drawings.

DESCRIPTION OF THE CURRENT EMBODIMENTS

Figure 1:
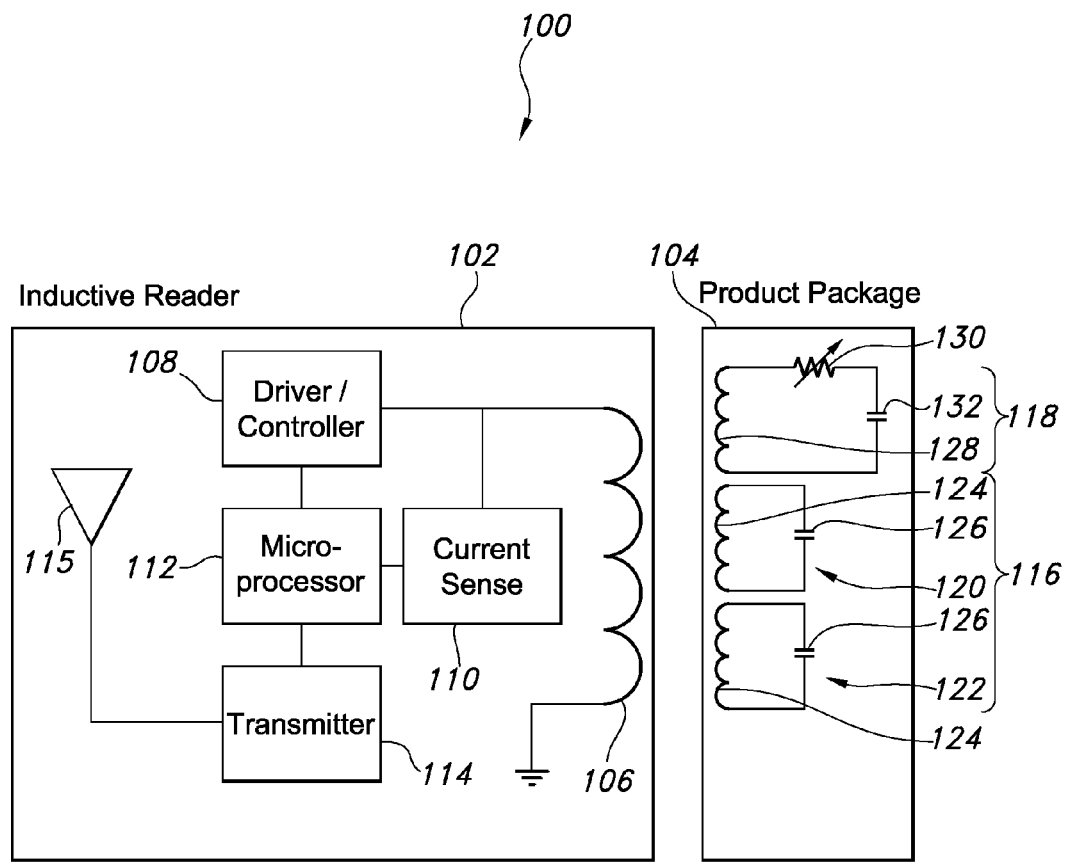
FIG. 1 is a circuit diagram of an inductive product monitoring system.

The embodiments of the present invention provide wireless power systems and methods related to the identification, powering and control of products at the point of sale and in other locations.

I. Product Monitoring Systems

In a first aspect of the invention, a system for monitoring product levels is provided. The system can include an inductive reader and a product container having a passive identification circuit and a product quantity sensor circuit. The inductive reader can be operable to identify the product and product quantity based on the reflected impedance of the passive identification circuit and the product quantity sensor circuit, respectively.

According to a first embodiment, a system for monitoring liquid product levels is illustrated in FIGS. 1-5 and generally designated 100. The system includes an inductive reader 102 and a product container 104. The inductive reader 102 can include a primary coil 106, a driver 108, a current sensor 110, a microcontroller 112, and a transmitter 114. The driver 108 can be electrically connected to the primary coil 106 to drive the primary coil 106 across a range of operating frequencies. The microcontroller 112 can be electrically connected to the driver 108 to control the driver output, and hence the operating frequency. The current sensor 110, optionally a hall effect current sensor, generates an electrical output proportional to the current in the primary coil 106. In use, the driver 108 can sweep through a predetermined range of frequencies while monitoring the reflected impedance from a nearby inductive secondary. When the current in the primary coil 106 achieves a threshold value, a local maxima, or other criteria as measured by the current sensor 110, the microcontroller 112 can record the corresponding operating frequency or frequencies in non-volatile memory. As explained below, this operating frequency or frequencies can correspond to a unique inductive identification profile and/or a measure of the remaining liquid. With reference to a look-up table stored in memory, the microcontroller 112 can identify the liquid and the amount remaining.

As also shown in FIG. 1, the product container 104 includes a passive product identification circuit 116 and a passive product sensor circuit 118. The passive product identification circuit 114 can include one or more isolated resonant circuits 120, 122. Each isolated resonant circuit, shown as a LC circuit having an inductor 124 and a capacitor 126, contribute to the inductive identification profile of the product container 104. That is, the isolated resonant circuits 120, 122 can generate a reflected impedance in response to a time varying current in a nearby primary coil 106. The inductive reader 102, and in particular, the current sensor 110, can monitor the reflected impedance to identify one or more unique resonant frequencies corresponding to the isolated resonant circuits 120, 122. Each resonant frequency can be a result of tuned inductance, tuned capacitance, or both. The microcontroller 112 can identify the container 104, and therefore its contents, by comparing the detected resonant frequencies of the passive product identification circuit 116 with a look-up table stored in memory. The unique resonant frequencies of the resonant circuits 118, 120 can also allow for the creation of a number of unique identification codes, explained in greater detail in Part VII below.

Figure 2:
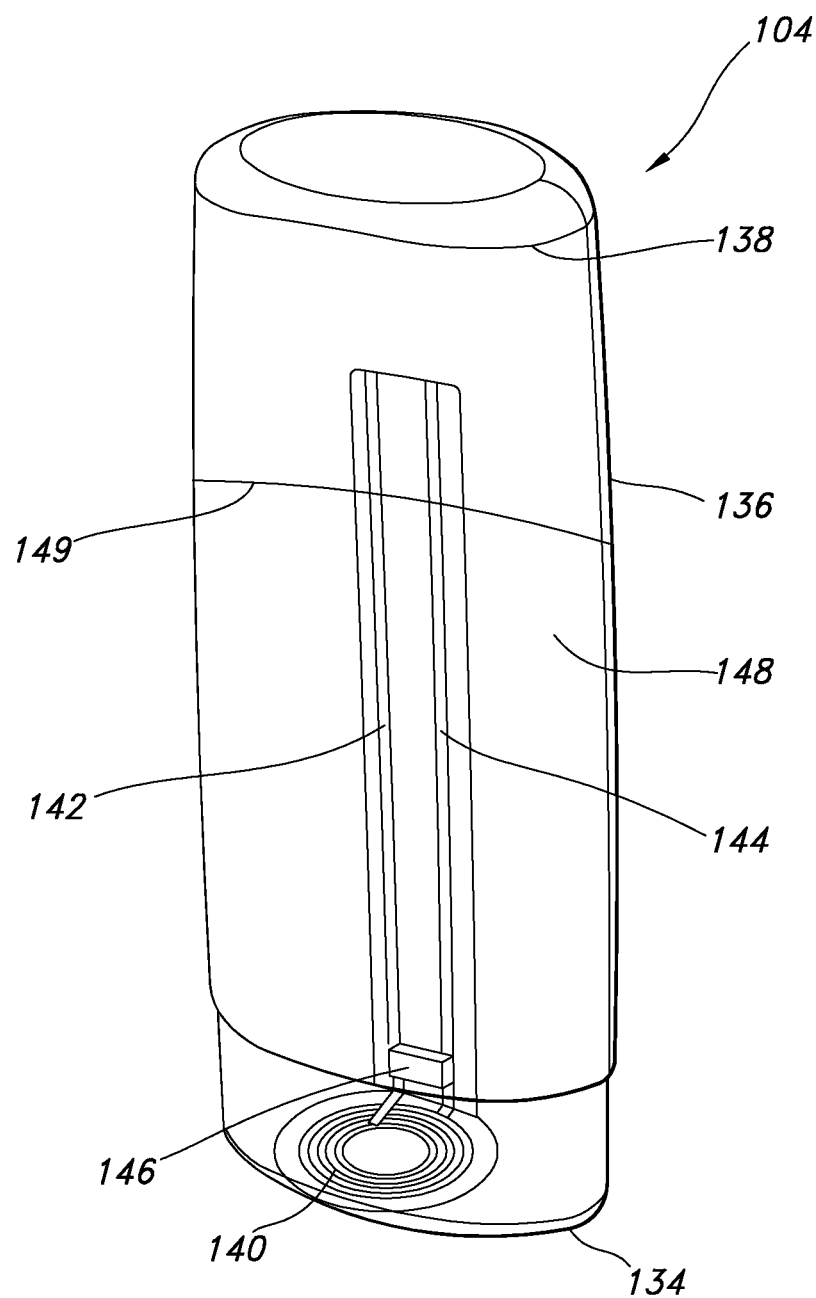
FIG. 2 is a perspective view of a product container including a passive product sensor circuit.

The passive product sensor circuit 118 can include a secondary coil 128, a variable resistor 130, and a series capacitor 132. In the illustrated embodiment, the resistance of the passive product sensor circuit 118 varies as a function of the volume of liquid remaining. In other embodiments, the inductance, capacitance, or both may vary. As shown in FIG. 2 for example, the product container 104 can further include a base 134, at least one upward extending sidewall 136 terminating in a periphery or opening 138, an inductive winding 140, and first and second conductors 142, 144 electrically connected to opposing end portions of the inductive winding 140. The first and second conductors 142, 144 can be substantially parallel to each other and generally upright in spaced apart relation. A resistive or capacitive element 146 can also be connected across the conductors 142, 144. During use, the product container 104 may include a conductive fluid 148 defining an upper level 149. The fluid 148 may be in the form of a liquid, a gel, or any other sufficiently conductive material. For example, the fluid may contain sufficient electrolytes to render it at least partially conductive.

Figure 3:
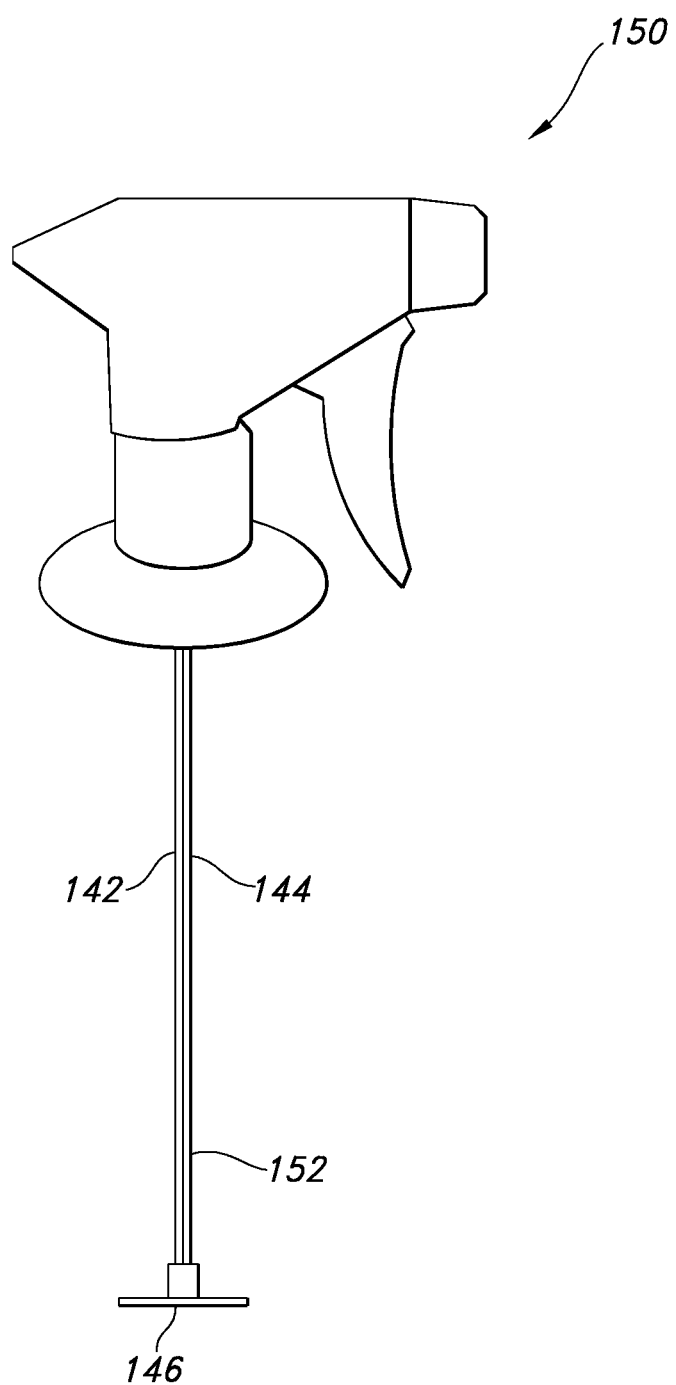
FIG. 3 is a side elevation view of a sprayer assembly including a passive product sensor circuit.

The inductive winding 140, conductors 142, 144, and resistive or capacitive element 146 may be completely or partially coated with a flexible, waterproof material such as Mylar® film by DuPont of Wilmington, Del. The inductive winding 140 may be oriented in a substantially planar configuration to conform to the product container base 134. Optionally, the inductive winding 140 can be integrally formed with the product container 104 during its manufacture. In one embodiment, the passive product sensor circuit 118 may be inserted into the product container 104 after the product container 104 is formed, as generally shown in FIG. 2. For example, the passive product sensor circuit 118 may be inserted into product container 104 by a user upon purchase of the product, and/or the passive product sensor circuit 118 may be integrated with a separable piece of the product container 104. As also shown in FIG. 3, the passive product sensor circuit 118 may form part of a sprayer assembly 150 for a spray bottle. In this embodiment, the conductors 142, 144 are located on opposing sides of the supply tube 152. The inductive winding 140 and resistive or capacitive element 146, which may be printed and then insulated using additional ink or coatings, can be positioned at the base 146 of the supply tube 150. As the level 148 of the conductive fluid decreases, the impedance of the passive product sensor circuit 118 will change. The change in impedance of the passive product sensor circuit 118 will affect the current measured in the primary coil 106 of the inductive reader 102. The microprocessor 112 can then evaluate the reflected impedance in the primary coil 106 for a given product to determine the quantity of product remaining. For example, the microprocessor 112 can reference the reflected impedance to the feedback of the passive product identification circuit 116 to establish a relative reflected impedance. Using the relative reflected impedance, the microprocessor 112 can access a reflected impedance table for that particular product type. The microprocessor 112 may use the reflected impedance table to determine the product amount corresponding to the reflected impedance recorded by microprocessor 112. The inductive reader 102 includes a low power transmitter 114 and antenna 115 to transmit the product amount and product type to a central hub 168. In the event that a product type and reflected impedance data are not included in the lookup table, then new data may be uploaded to the inductive reader 102 through a setup screen graphical user interface (GUI) accessed from the central hub 168. The inductive reader 102 may also include a predetermined identifier to distinguish the inductive reader 102 from other inductive readers. The identifier may be transmitted to the central hub 168 with the product information. These and other data transmissions may be accomplished through hard-wired networks, wireless technology, or other suitable communication system.

Figure 4:
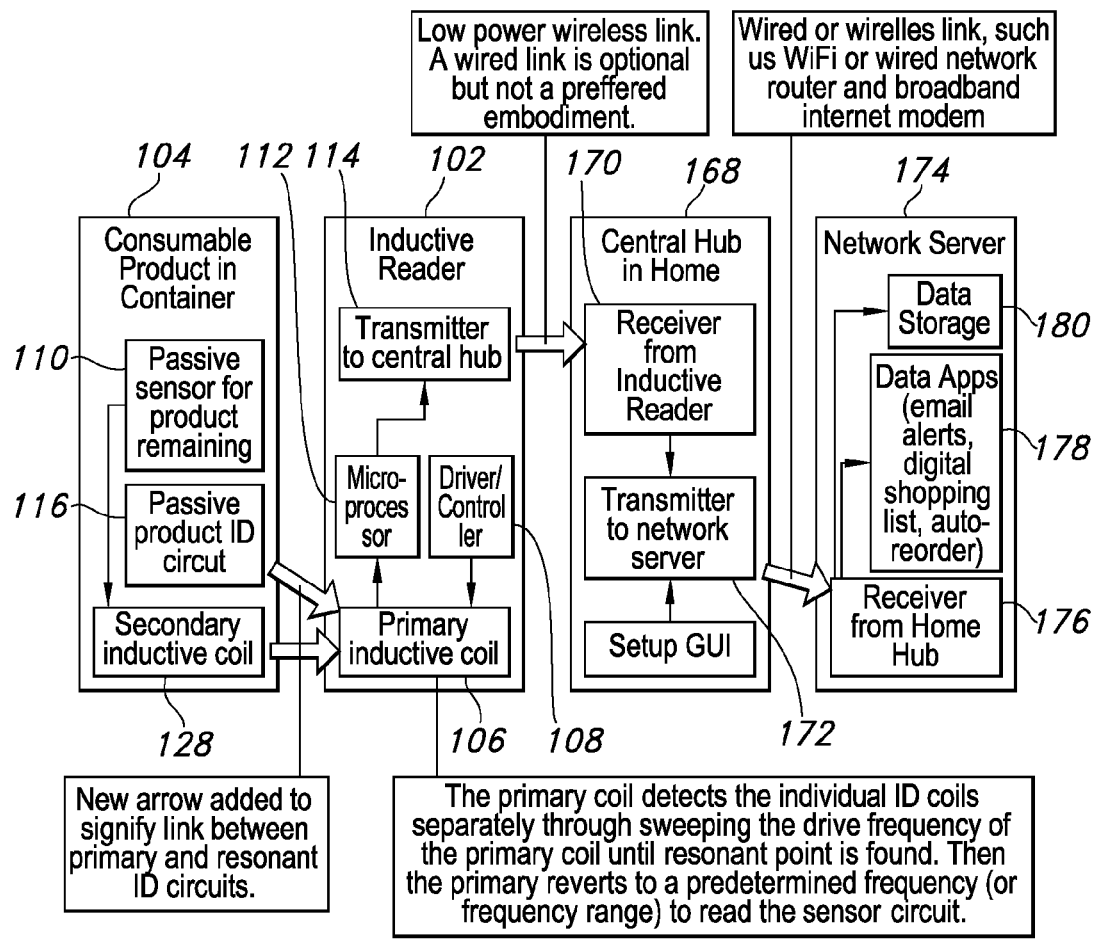
FIG. 4 is a block diagram of an inductive product monitoring system.

With reference to FIG. 4, the central hub 168 can include a receiver 170 to receive information relating to the product amount, the product type, the sensor type, the reference data and the unique inductive reader identifier from the transmitter 114. The receiver 170 can be connected to a low power transmitter 172, which transmits the product and reader information to a network server 174. The central hub 168 can be programmed through a setup screen to link unique user profile identifiers to the entire system or to individual inductive readers 102. As also shown in FIG. 4, a network server 174 includes a receiver 176, data applications 178 and data storage 180. The receiver 176 receives the product and user information from the transmitter 172. The information is transmitted to data storage 180, which may include a user account for each unique user profile. The data applications 178 can include software that processes the product amount to determine if a variety of actions should be taken. For example, the amount of product, the consumption rate, and the timing of upcoming store visits may be used to determine whether the product should be added to the shopping list. If the product should be added to the shopping list, an e-mail or text message alert may be sent to the user to indicate that the product is low, the product may be automatically added to a digital shopping list, or the product may be automatically reordered. If the product does not need to be added to the shopping list, the network server 174 may still update data storage 180 with the current levels of all products being monitored. This may also include information regarding product usage, budgeting, value shopping, meal and caloric intake planning, product service planning, and prescription tracking. This information may be retrievable through a webpage or any other information system suitable to the application.

The network described above may be a low power network. An example of a low power network is disclosed in U.S. application Ser. No. 12/572,296, entitled "Power System" filed Oct. 2, 2009 by Fells et al, now U.S. Pat. No. 8,446,046, the disclosure of which is incorporated by reference in its entirety. In addition, the secondary coils may be aligned with the primary coil 106 through any alignment device suitable to the application including but not limited to mechanical alignment systems and magnetic alignment systems. An example of a suitable alignment system is disclosed in U.S. application Ser. No. 12/390,178, entitled "Magnetic Positioning for Inductive Coupling" filed Feb. 20, 2009 by Baarman et al, now U.S. Pat. No. 8,766,484, the disclosure of which is incorporated by reference in its entirety.

Because the inductive reader 102 "reads" a product 104 periodically, for example when a product is replaced, a very low power sense circuit can trigger a ping or sweep to read the product 104 then update the hub 168, shutting down shortly thereafter. The addition of amplitude modulation allows one bit to be a reference while changing the amplitude of the remaining bits allows for additional combinations. Ranges can be established for sensors and identifiers along with bit positions and sensor classifications and reference frequency information to assure a proper and simple understanding of the returned values. Using multiple frequencies as bits, a resonant frequency can be used to represent a first binary value while the absence of a resonant frequency can represent a second binary value. This allows a very large sequence of possibilities as set forth in Part VII below. This identification method can be augmented utilizing fewer coils to get more possible combinations using more bit locations or frequencies than coils.

Figure 5:
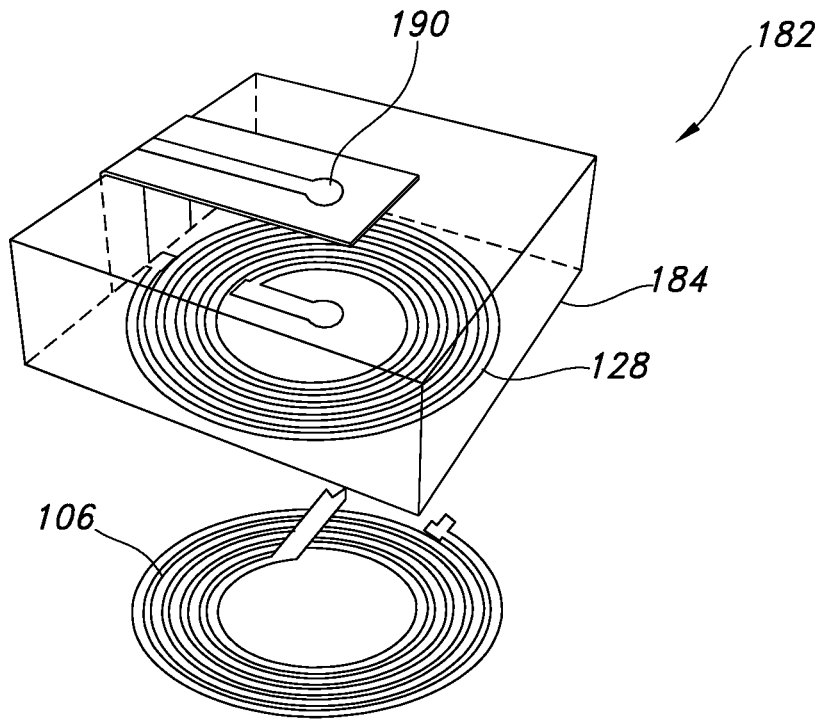
FIG. 5 is an exploded perspective view of a weight sensor circuit.
Figure 6:
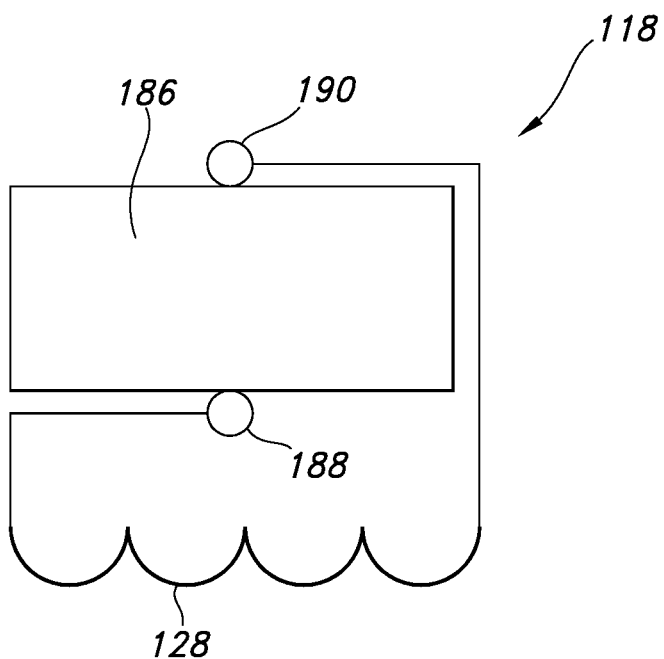
FIG. 6 is a circuit diagram of the weight sensor circuit of FIG. 5.
Figure 7:
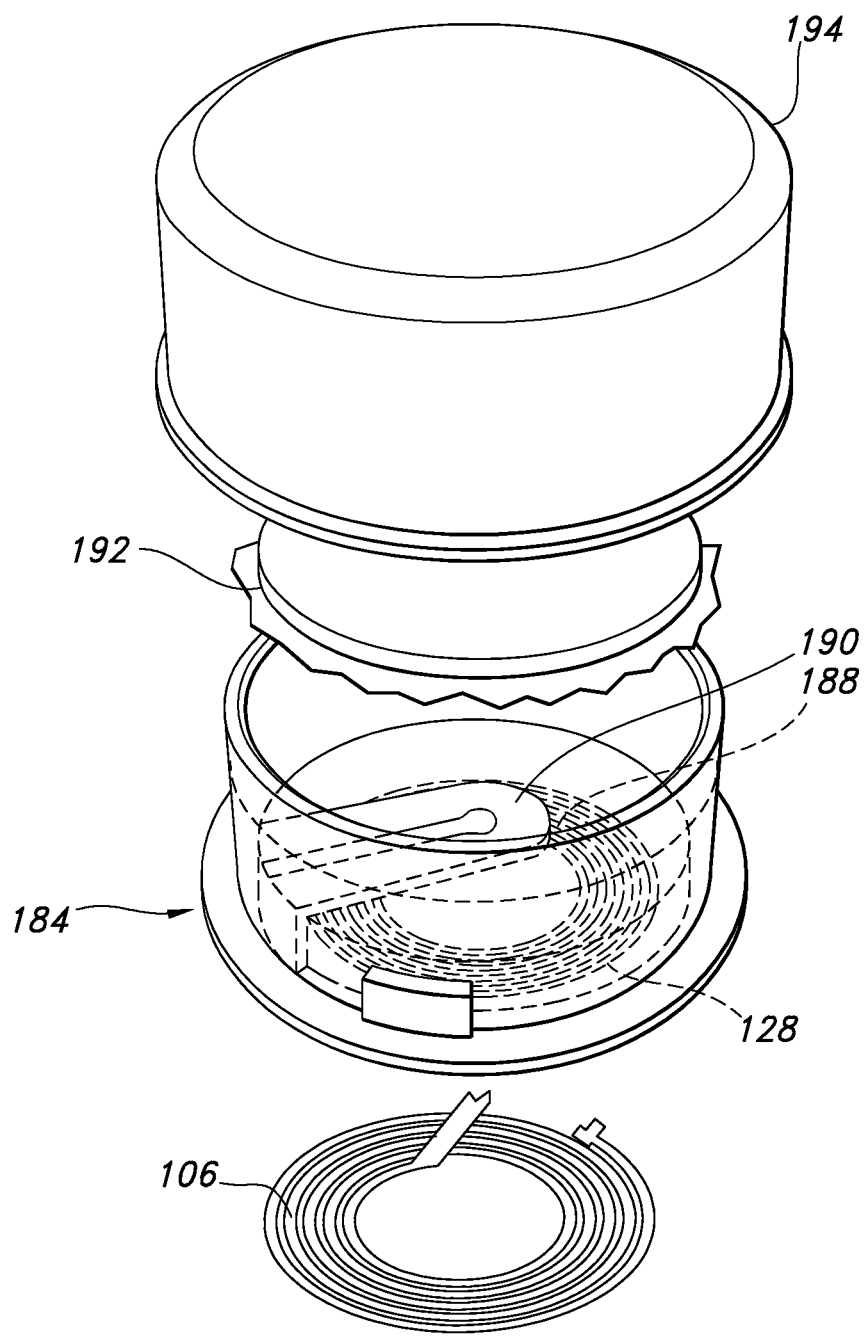
FIG. 7 is an exploded perspective view of a weight sensor circuit including a barrier membrane.
Figure 8:
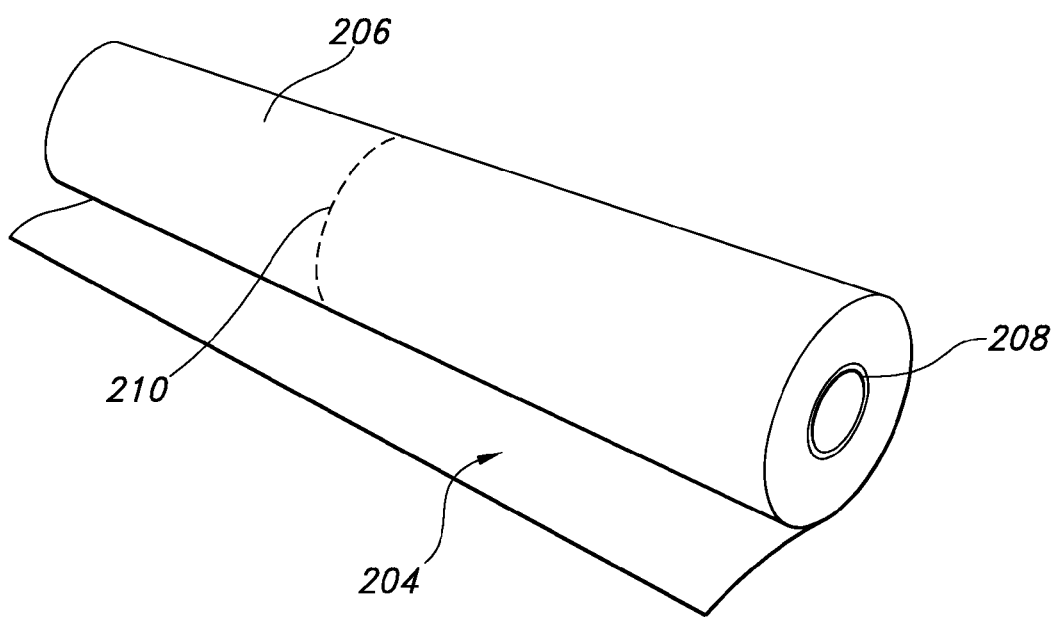
FIG. 8 is a perspective view of a rolled product including a passive product sensor circuit.

A product monitoring system constructed in accordance with another embodiment is illustrated in FIGS. 5-7 and generally designated 182. The product monitoring system 182 is similar to the product level sensor 100 set forth above, with the addition of a passive product sensor circuit 184 whose impedance varies as a function of the weight of a product.

More particularly, the product weight sensor 184 includes a spiral planar secondary coil 128 aligned with the primary coil 106 in the inductive reader 102. An electrically conductive compressible pad 186 is connected in parallel with the secondary coil 128. The pad 186 may be made of any flexible electrically conductive material, including but not limited to foam. The product level sensor circuit 118 can include a first electrical contact 188 located on one side of the pad 186 and a second electrical contact 190 located on the other side of the pad 186. The product weight sensor 184 may be integrally formed with product container 104 during its manufacture. Alternatively, the product weight sensor 184 may be inserted into the product container 104 after the product container 104 is formed. Further optionally, as shown in FIG. 5, the product weight sensor 184 may be located outside of product container 104 such that product container 104 is positioned on top of product weight sensor 184. As shown in FIG. 7, the product monitoring system 100 may include a barrier membrane 192 to prevent the product from directly contacting the product weight sensor 184. The product weight sensor 184 may also include an assembly cover 194.

When the product container 104 is empty, the impedance of the product level sensor circuit 118 is at an initial value. As product 148 is added to the product container 104, the total weight on the top surface of the pad 186 increases. As the pad 186 flexes under the weight of the added product 148, the two electrical contacts 188, 190 approach one another. As the contacts 188, 190 move closer to one another, the impedance of the product level sensor circuit 118 changes. As described above, the impedance of the product level sensor circuit 118 may be monitored by measuring current in the primary coil 106. The product amount, product type and unique inductive reader identifier may be transmitted to the central hub 168 and to the network server 174 substantially as set forth above. In a variation of this embodiment, the product level sensor circuit 118 can include a conductive membrane whose impedance varies as the membrane flexes under the weight of the added product 148. The varied impedance can correlate to diminished liquid quantities in a manner substantially as set forth above.

A product monitoring system constructed in accordance with another embodiment is illustrated in FIGS. 8-12 and generally designated 200. The product monitoring system 200 is similar to the product level sensor 100 set forth above, with the addition of a passive product sensor circuit 202 whose impedance varies as sheets are removed from a roll of sheet material 204.

Figure 9:
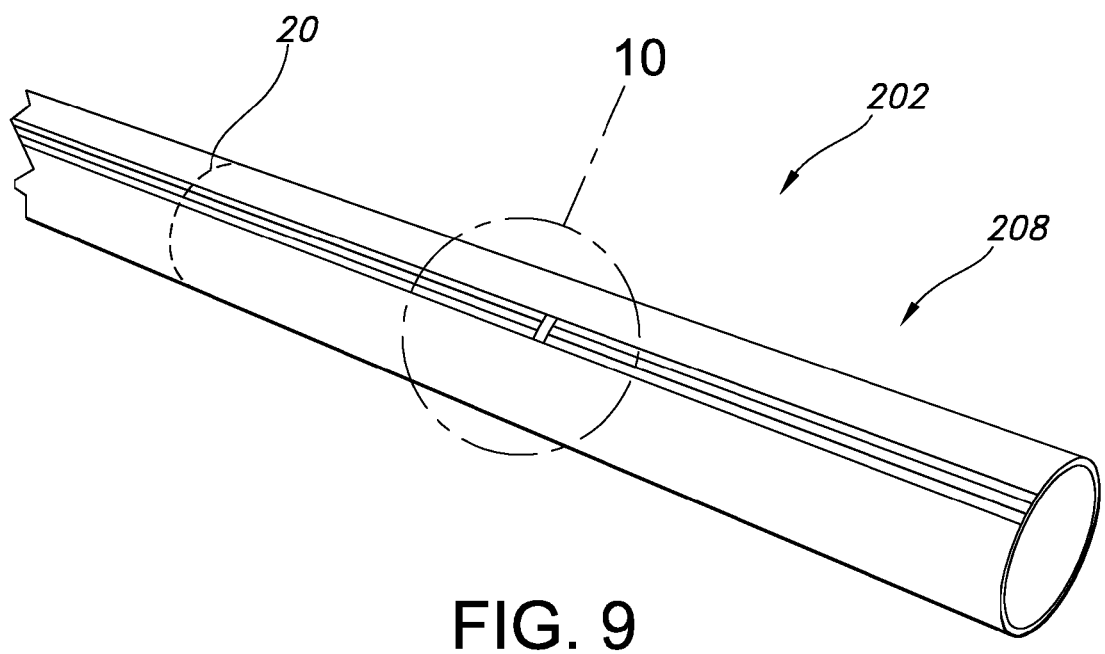
FIG. 9 is a perspective view of a roll form and a passive product sensor circuit.
Figure 10:
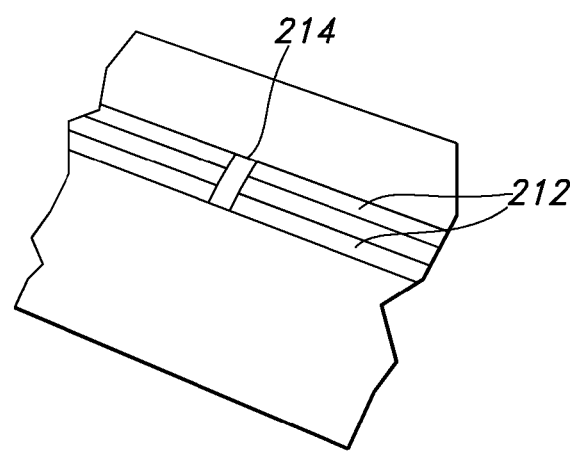
FIG. 10 is a close-up perspective view of the roll form and a passive product sensor circuit of FIG. 9.

The product roll 204 can include a rolled product 206, a roll form 208, and at least one perforation 210. The roll form 208 may be formed of paperboard or other suitable material. The perforation 210 allows for separation of the product roll 204 into smaller rolls. As shown in FIGS. 9-10, the rolled product sensor 202 is supported by the roll form 208 and includes first and second conductors 212 arranged in a substantially parallel orientation and extending the length of the roll form 208. At least one resistive or capacitive element 214 can connect the conductors 212 in each perforated section of product roll 204. As the product roll 204 is used and perforated sections are removed, the resistive or capacitive elements 214 connecting the conductors 212 for that perforated section are also removed from the circuit. The removal of resistive or capacitive elements 214 can cause the impedance on an inductive secondary 128 to change. As described with regard to the above embodiment, the impedance of the inductive secondary 128 may be monitored by an inductive reader 102 to determine a product quantity. The product amount, and optionally the product type and the unique inductive reader identifier, may be transmitted to the central hub 168 and to the network server 174 substantially as set forth above.

Figure 11:
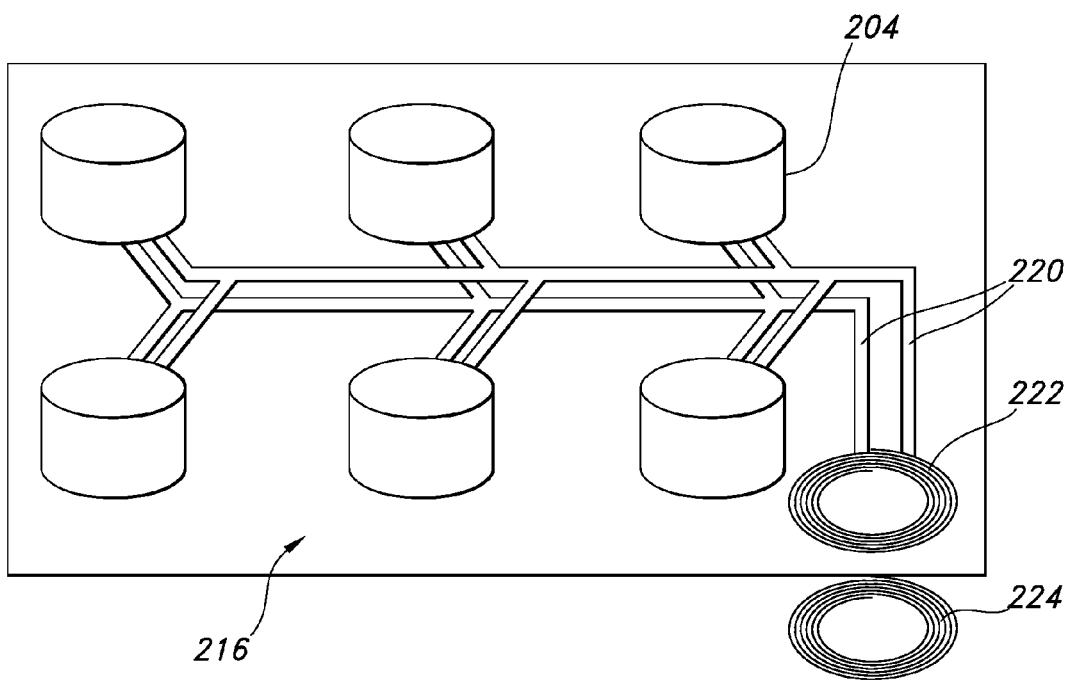
FIG. 11 is a perspective view of a rolled product tray and a passive product sensor circuit.

Referring now to FIG. 11, the product monitoring system 200 may also include a rolled product tray 216. The rolled product tray 216 can include six sockets 218 sized to receive a product roll 204. Each socket 218 can include first and second leads 220 for electrical connection to the first and second conductors 212 when a roll form 208 is received within a corresponding socket 218. The first and second leads 220 can be connected to a substantially planar secondary coil 222. The secondary coil 222 can be aligned with a primary coil 224 substantially as set forth above.

Figure 12:
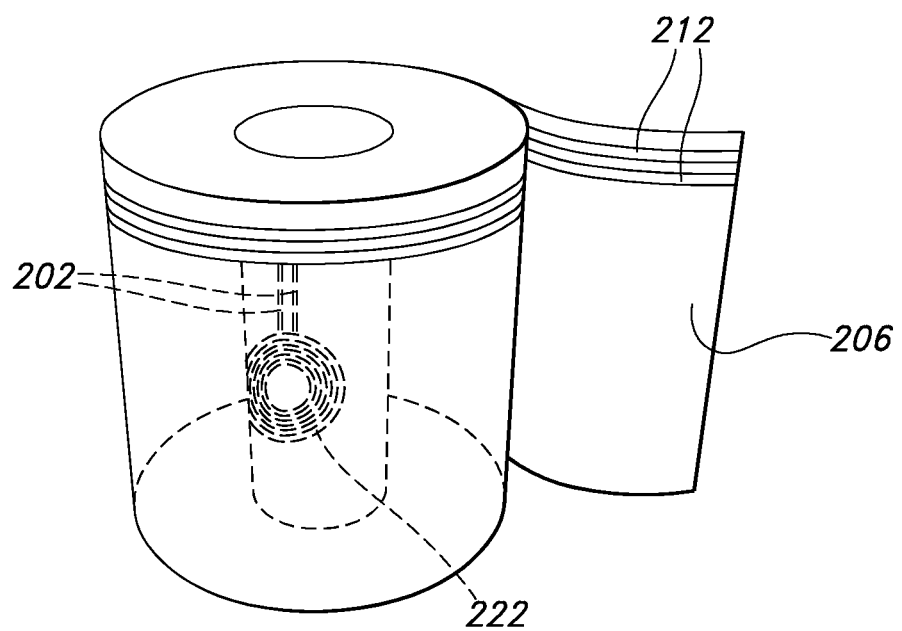
FIG. 12 is a perspective view of a rolled product including a curved inductive secondary.

A variation of this embodiment is shown in FIG. 12. In this variation, the passive product sensor circuit 202 may include conductors 212 that are integrated into the product or positioned on a face of the product 206. At least one resistive or capacitive element 214 optionally connects the conductors 212 on each individual sheet of the product 206. If the product is perforated in the axial direction to separate individual sheets, a predetermined number of resistive or capacitive elements 214 may be used per sheet of product. If the product is not perforated, a predetermined number of resistive or capacitive elements 214 may be used for a certain length of product. In this configuration, as product is used, the resistive or capacitive elements 214 may be removed from the circuit 202. As resistive or capacitive elements 214 are removed, the impedance of the circuit 202 can change. As also shown in FIG. 12, the primary coil 224 and the secondary coil 222 may be curved, substantially matching the curvature of the surface of roll form 208. This configuration can allow further optional placement of the secondary coil 222 on the inner or outer surface of roll form 208 and placement of the primary coil 224 on the inner or outer surface of a roll holding rack. A product roll 204 in accordance with this configuration may be connected to the rolled product tray 216 and the product amount may monitored substantially as set forth above. In this manner, rolled product monitoring systems in accordance with the embodiments of FIGS. 8 and 12 may be secured on the rolled product tray 216 of FIG. 11 at the same time. Optionally, the embodiments of FIGS. 8 and 12 may be combined such that the number of rolls in a stack and the number of stacks in a bulk package may be monitored.

II. Inductive Reader Systems

In a second aspect of the invention, localized clusters of inductive readers are positioned at various locations throughout a home, business or other location. The inductive readers are operative to determine both the identity of a product and the amount of product remaining. In some applications, the inductive readers can provide information to a user based on the historical use of a given product. For example, the inductive readers can provide nutritional consumption data and can generate a shopping list based on the remaining quantities of food supplies in a food pantry or elsewhere.

Figure 13:
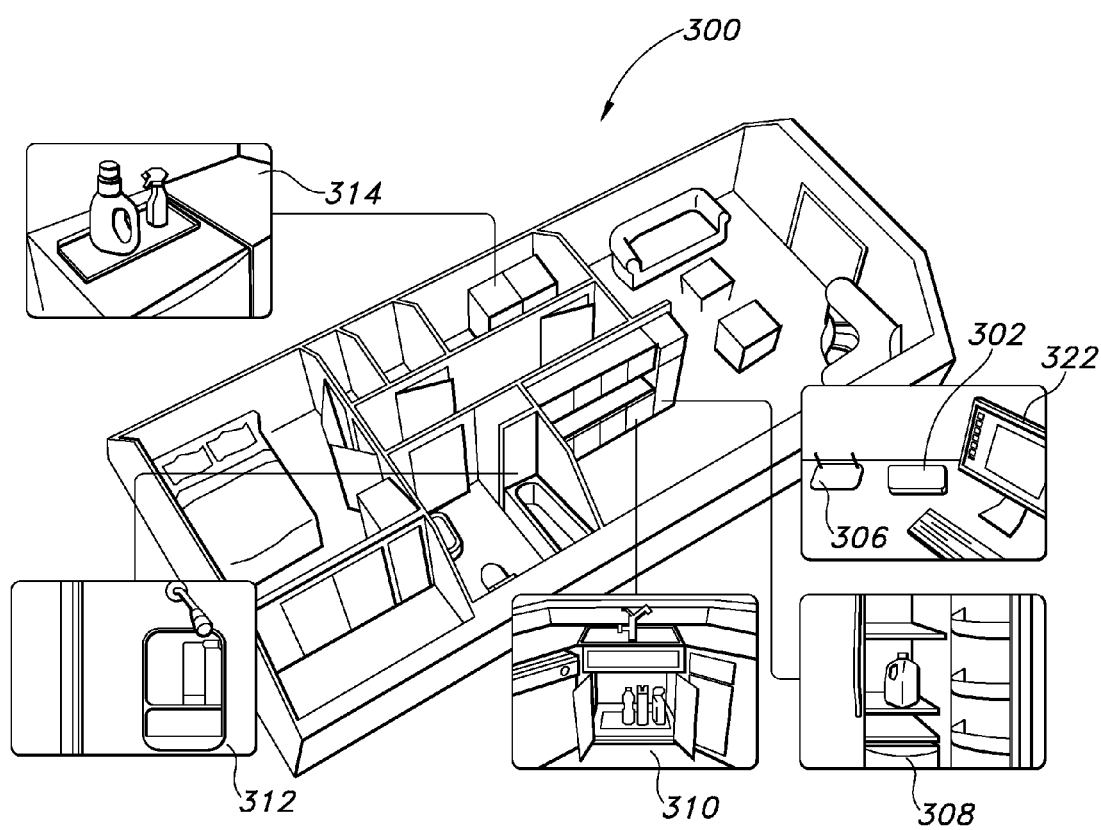
FIG. 13 is a perspective view of a system of inductive readers positioned in various locations throughout a home or business.
Figure 14:
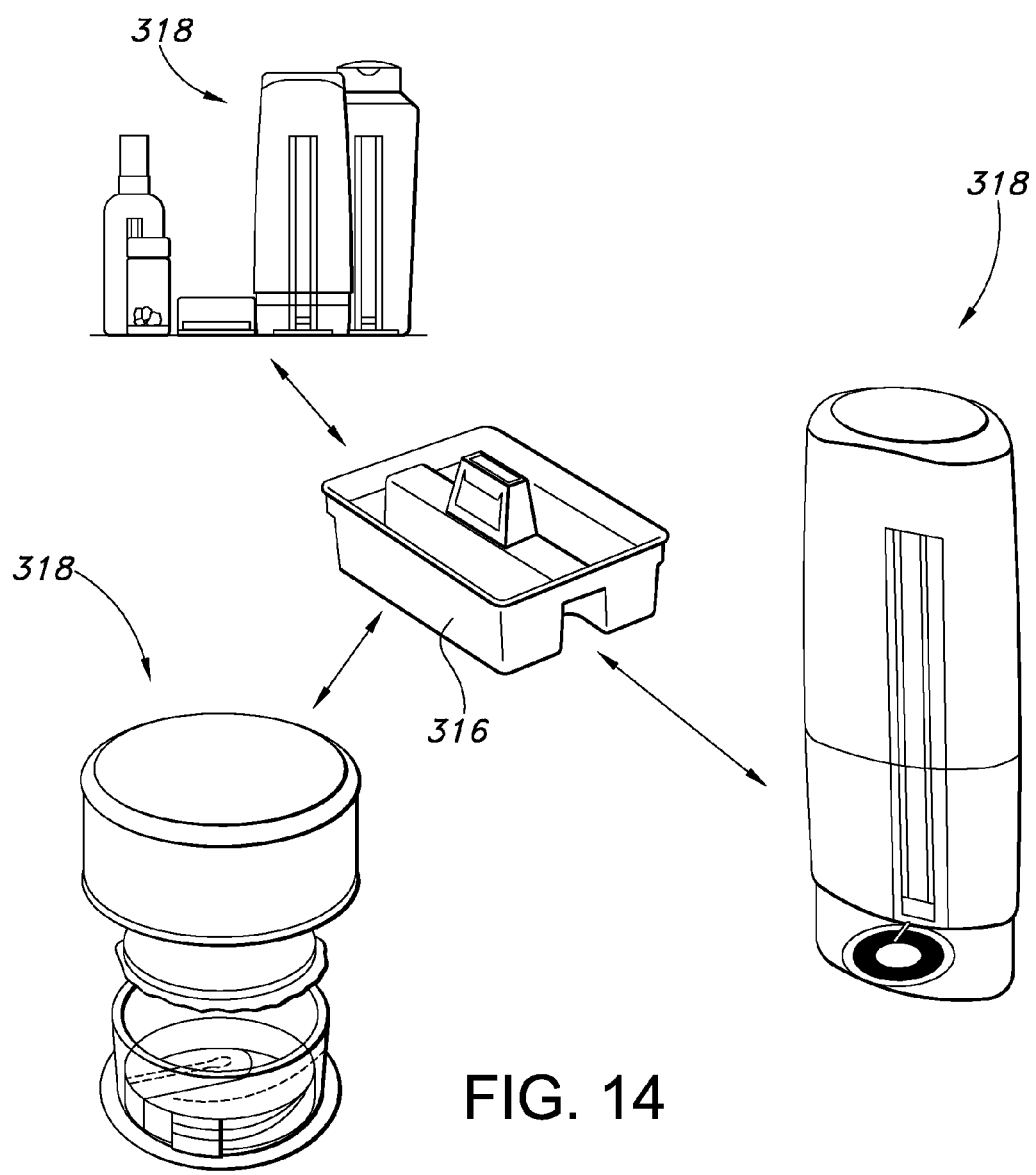
FIG. 14 is a perspective view of a carrying tote.
Figure 15:
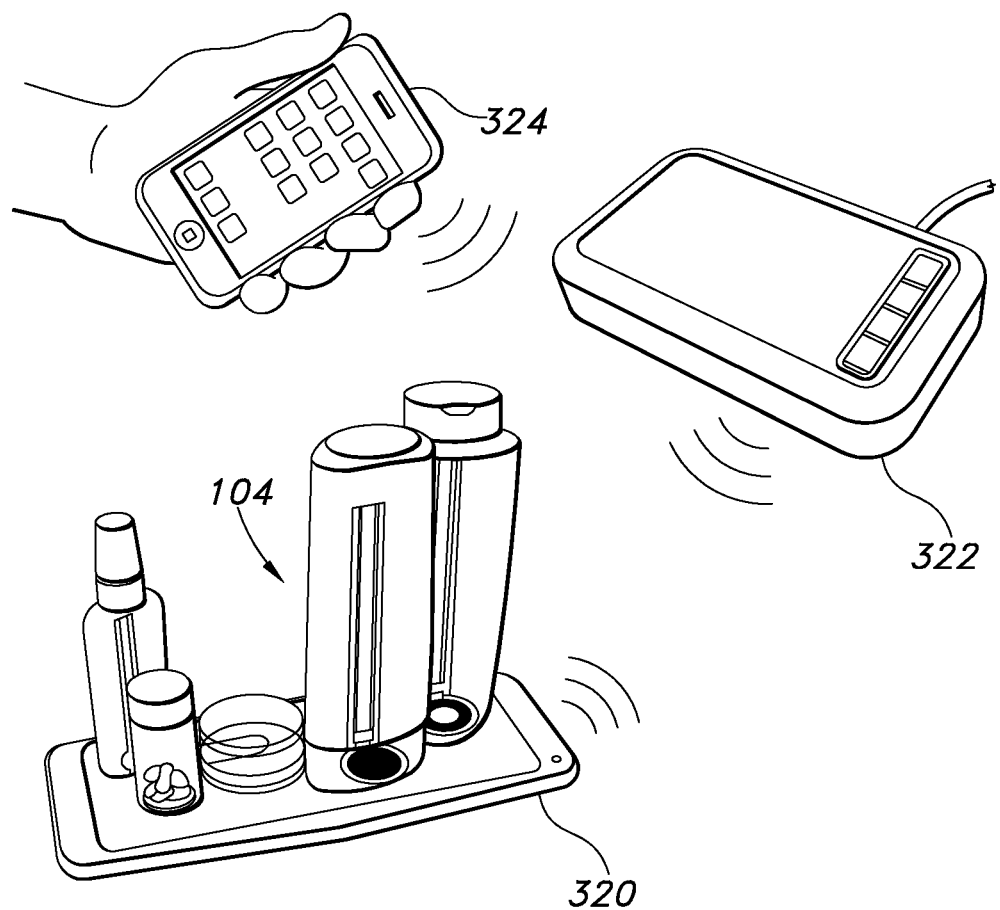
FIG. 15 is a perspective view of a product storage mat.

A system of inductive readers in accordance with one embodiment is illustrated in FIGS. 13-15 and generally designated 300. The system 300 includes localized clusters of inductive readers operating independently and transmitting their product identification, product amount and unique inductive reader identifier to a centralized hub 302. The centralized hub 302 can transmit aggregated product and user information to a network server 304 through any suitable device such as a Wi-Fi broadband router and modem 306.

The inductive readers may be in various locations throughout a home, a business or other location. Readers may be located in a refrigerator storage surface 308, in a cabinet storage surface 310, in a shower storage surface 312, in a laundry room storage surface 314, and in a tote 316 for reading a variety of products 318. Each reader may be represented by a unique profile identifier in the setup GUI for the central hub 302. As shown in FIG. 15, a portable storage mat 320 may be temporarily placed in a variety of locations. The storage mat 320 and any of the other inductive readers may include multiple primary coils 106 such that at least one primary coil 106 is sufficiently aligned with each product package to identify and determine the amount of each product. The secondary coils 128 in the product package may be aligned with the primary coils 106 using an alignment system substantially as set forth above. As also set forth above, the inductive readers may identify the product, determine the product amount, and transmit this information with an inductive reader identifier to the central hub 302. The central hub 302 may transmit the product and user information to a network server 304, which may transmit the information to a computer 322, a handheld electronic device 324, or a other network server through a broadband internet connection or any other communications architecture for transferring electronic data.

Localized clusters of inductive readers may also be used to monitor food storage locations and/or cooking appliances to determine the caloric intake or other nutritional data relating to the food consumed in a household. In this configuration, the data applications 178 noted in Part I above can include software that manipulate the product amounts to calculate the total calories consumed over a period of time, the average calories consumed over a period of time and/or other useful nutritional information. Data applications may also monitor a variety of other personal health indicators and home security, for example.

Figure 16:
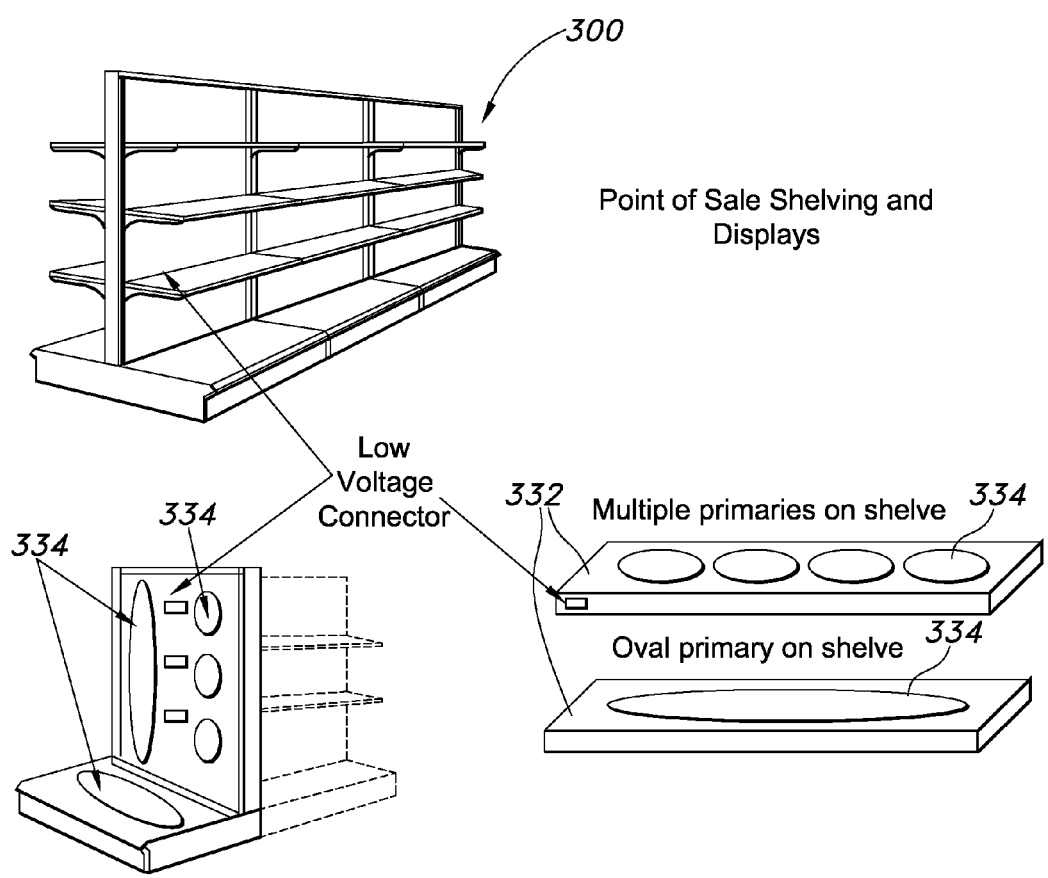
FIG. 16 is a perspective view of a point of sale display.
Figure 17:
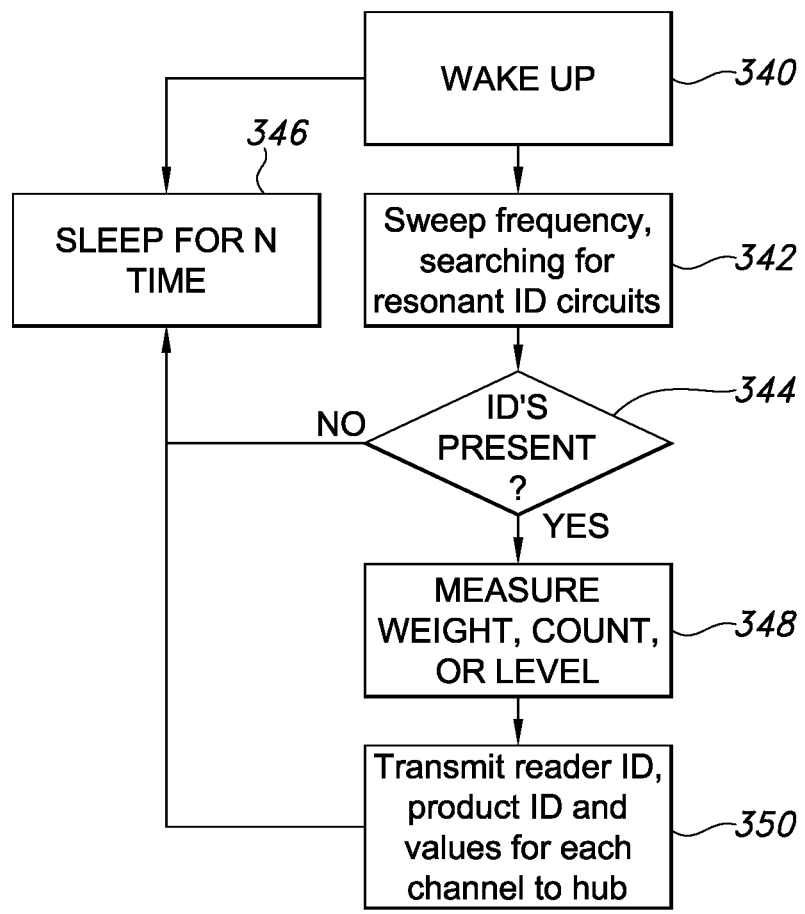
FIG. 17 is a flow chart for operation of an inductive reader.

In another variation as shown in FIG. 16, display units 330 in grocery stores, department stores or other similar businesses may be equipped with inductive readers 102. Data gathered by the inductive readers 102 regarding the number of products located on the display unit may be used to track inventory, drive active display signage or trigger reordering for the store's purchasing department. Optionally, the display unit 330 can include shelving and other conventional display surfaces 332, where the primary coil(s) 334 of the inductive reader 102 is positioned adjacent a surface of the display surface 332, for example, within the display shelving 332. As also illustrated in FIG. 15, the display unit 330 can include a single oval-shaped primary winding 334 extending vertically or horizontally beneath a surface of a display unit 330, or can include multiple primary coils 334 positioned beneath a surface of a shelving unit 330. The shelving units may themselves receive power inductively, or may receive power through a conventional mains connection.

In another embodiment, a product monitoring system for a point of sale display 332 includes an inductive reader 102 and a plurality of product containers 104 each optionally supported by the point of sale display. The inductive reader 102 can include a primary tank circuit, and each of the product containers 104 can include an impedance element. The inductive reader 102 can be adapted to detect a change in a characteristic of power in the primary tank circuit in response to (1) the addition of a product container including an impedance element to the point of sale display and/or (2) the removal of at least one of the plurality of product containers from the point of sale display. The characteristic of power can include one of voltage, current and phase. The plurality of product containers 104 can define a cumulative impedance, and the inductive reader 102 can be adapted to detect a change in the reflected cumulative impedance corresponding to a change in the characteristic of power in its primary tank circuit. For example, the inductive reader 102 can detect an increase in the cumulative reflected impedance in response to placement of a product container 104 (optionally among other product containers) in the vicinity of the inductive reader 102. The inductive reader 102 can also detect a decrease in the cumulative reflected impedance in response to removal of a product container 104 from the vicinity of the inductive reader 102. The impedance element can include a capacitive element, an inductive element or a resistive element for example. Optionally, the impedance element can form part of a secondary circuit 116, for example a passive identification circuit 116 having a secondary coil and a series capacitor. The impedance can be the same for each of the plurality of product containers 104, or can differ with respect to each other. The point of sale display can include a shelving unit or wall rack 332 or other device to support a plurality of product containers. The point of sale display can define a depth, width and/or height, and the primary tank circuit can include a primary coil 334 extending substantially along the respective depth, width and/or height of the point of sale display to simultaneously monitor products along one or more rows or columns. The inductive reader 102 can be adapted to transmit information based on the cumulative reflected impedance to a central hub 168. The central hub 168 can include a memory adapted to maintain historical product inventory levels as product containers 104 are added to or removed from the point of sale display. The product monitoring system can also be used in conjunction with a primary coil 624 and associated power supply 632 as set forth more fully in Part V below. For example, the product monitoring system can include a inductive reader 102 for monitoring product level inventory on a point of sale display 332 and a contactless power supply 624 for providing power to substantially only the leading product on a point of sale display 332.

The product monitoring system described above can be utilized across a wide range of applications. For example, a central hub 168, network server 174 or other data logger in communication with a network of inductive readers 102 can record point of sale inventory levels throughout a monitoring period, for example a 24 hour monitoring period. The recorded point of sale inventory levels can be used to trigger product re-stocking, particularly if point of sale inventory levels fall below a predetermined quantity. The recorded point of sale inventory levels can also be used to track periods where less than the desired number of product containers are on display at the point of sale. This information can be provided to the manufacturer, for example, who may be interested in knowing whether or not its products are continuously stocked on store shelves. The recorded point of sale inventory levels can also be used to track the sale of products according to their expiration dates, and can trigger the removal or discounting of products that have reached or are nearing expiration. The recorded point of sale inventory levels can include product quantity levels categorized by product identifier, inductive reader identifier, expiration date and/or shelving unit, for example. While described above in relation to product containers for the point of sale, the product monitoring system can also be utilized in other applications, including for example warehouse inventory, assembly plants, parcel processing, and can pertain to products apart from a container.

Additional embodiments include inductive readers 102 in combination with check-out terminals, laundry appliances, stoves and microwave appliances. For example, a check-out terminal can include an inductive reader 102, optionally to replace or augment a conventional bar-code reader. The inductive reader 102 can include one or more primary coils 106 operable at a plurality of frequencies to identify products based on the resonant frequency or the reflected impedance of one or more associated resonant circuits 120. The inductive reader can then identify an item in response to the resonant frequency of the resonant circuit approximately corresponding to one of the plurality of reader circuit operating frequencies. As a further benefit of the present invention, the primary coil can be utilized to disable a security tag. Alternatively, a washer and/or dryer unit can include an inductive reader to identify clothing having inductive identification circuits printed on a corresponding clothing tag. The present embodiment can also facilitate tracking of particular articles of clothing in combination with a central hub as described above.

One or more inductive readers 102 may also be used in combination with various other appliances or locations, including microwaves, cooking ranges, and kitchen countertops. To reiterate, an inductive reader can monitor and aggregate the nutritional value of food as it is removed from the pantry and/or refrigerator. For example, the system 300 can calculate periodic caloric consumption values for a given household. Alternatively, or in addition, the system 300 can assist in the preparation of a recipe. For example, a user can upload a recipe to an inductive reader associated with a stove with the aid of a passive identification circuit 116 affixed to the recipe label. A computer can then monitor the combination of ingredients and cooking times according to the recipe, providing instructions such as when and how much of a given ingredient to add. As ingredients are consumed, the computer can compile a list of groceries for replenishment.

A flow chart illustrating a product level sweep circuit for an inductive reader system 300 is shown in FIG. 16. The system begins in a wake state at step 340. At step 342, the system 300 sweeps each primary coil 334 for a product identification. When a resonant frequency is encountered, the level of current in the primary coil 334 can increase above a baseline current established by the feedback or average feedback of the product identification coils. The system then queries if there are product identifications present at step 344. If at step 344 there are no identified products within a vicinity of the primary coil 334, the network sleeps for a pre-determined amount of time at step 346. If there are product identifications present, the network determines the amount of each product remaining at step 348. The network will then transmit the product identifications, the amount of each product, and optionally a unique inductive reader identifier to the hub at step 350.

III. Product Container Heater Systems

According to a third aspect of the invention, a system for heating a product container is provided. The system can include a product container having a passive identification circuit and passive temperature sensing circuit whose impedance varies based on the temperature of the product container and/or its contents. The system can further include a contactless power supply adapted to monitor the reflected impedance of the passive identification circuit and the passive temperature sensing circuit. The product container can include any container for supporting a food item, a beverage item, an oil, a topical cream or other item in any form as desired. While described as pertaining to a product container, the embodiments can also be adapted for use with a portable appliance, such as a curling iron or a hair straightener as set forth more fully in Part IV.

Figure 18:
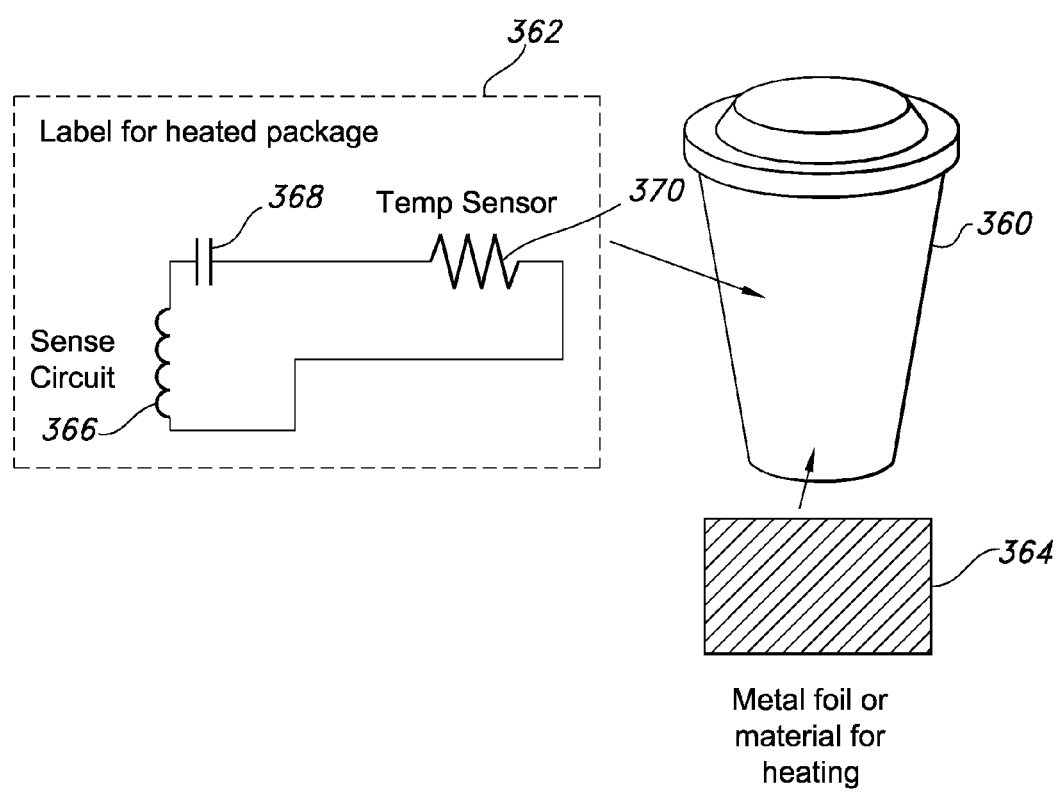
FIG. 18 is a circuit diagram of a printed temperature sensing circuit.

Referring now to FIG. 18, a container 360 is shown as including a temperature sensing circuit 362 and a ferromagnetic material 364. Though shown as a container for a heated beverage, the container 360 can be utilized in connection with food products, lotions, serums and therapy ointments, for example. In some embodiments, the container 360 itself can be formed of a ferromagnetic material 364, while in other embodiments a ferromagnetic material 364 can be applied to a surface of the container 360. The container 360 can also include one or more insulating materials, including, for example, a polystyrene foam material or a paperboard material, optionally substantially encompassing the ferromagnetic material 364. The insulating materials can also include a dielectric ink, such as an ELECTRODAG® dielectric ink by Henkel Corporation of Irving, Calif., to form a protective layer on one or more surfaces of the ferromagnetic material 364, the temperature sensing circuit 362, or both.

The temperature sensing circuit 362 can be formed on a flexible, non-conductive substrate, and can include an inductive element 366, a series resonant capacitor 368, and a series variable resistor 370. The inductive element 366 can include a printed trace winding, and the series resonant capacitor 368 can be selected to have a capacitance such that the temperature sensing circuit 362 includes a resonant frequency corresponding to a driving or operating frequency of a contactless power supply. The inductive element 366 and/or other printed conductive elements can be formed from Vor-ink™ by the Vorbeck Materials Corporation of Jessup, Md. The variable resister 370 can include a thermistor or other element having a resistance as a function of a temperature of the container 360 or its contents. The non-conducting substrate can be applied to an exterior surface of the container 360 using an adherent, for example a pressure-sensitive adhesive (PSA).

In the present embodiment, a contactless power supply provides power to the container 360 to at least indirectly and optionally directly heat the container contents. In particular, the contactless power supply can determine whether and to what extent additional heating is desired by sweeping through a predetermined range of frequencies while monitoring the reflected impedance of the temperature sensor circuit 360. Because the resistance of the thermistor 370 can vary greatly with temperature (generally more than standard resistors), the contactless power supply will experience variations in the current and/or voltage in the contactless power supply primary tank circuit across the range of operating frequencies. When the current in the primary tank circuit passes a threshold value, a controller in the contactless power supply is able to record the frequency at which the event occurred, and correlate that frequency to a temperature of the container 360 or its contents using a look-up table. When the temperature of the container 360 or its contents is determined to be less than the desired temperature, the contactless power supply can provide a suitable time varying voltage across the primary tank circuit to heat the ferromagnetic material 364 and the corresponding container contents.

Figure 19:
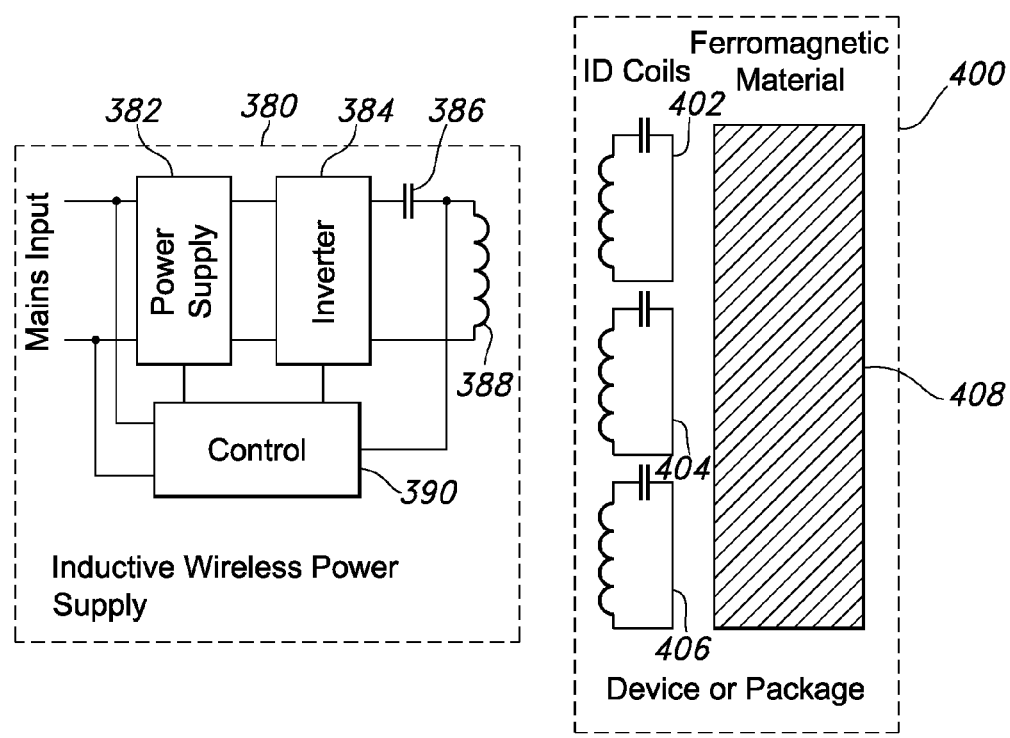
FIG. 19 is a circuit diagram of an inductive heater system.
Figure 20:
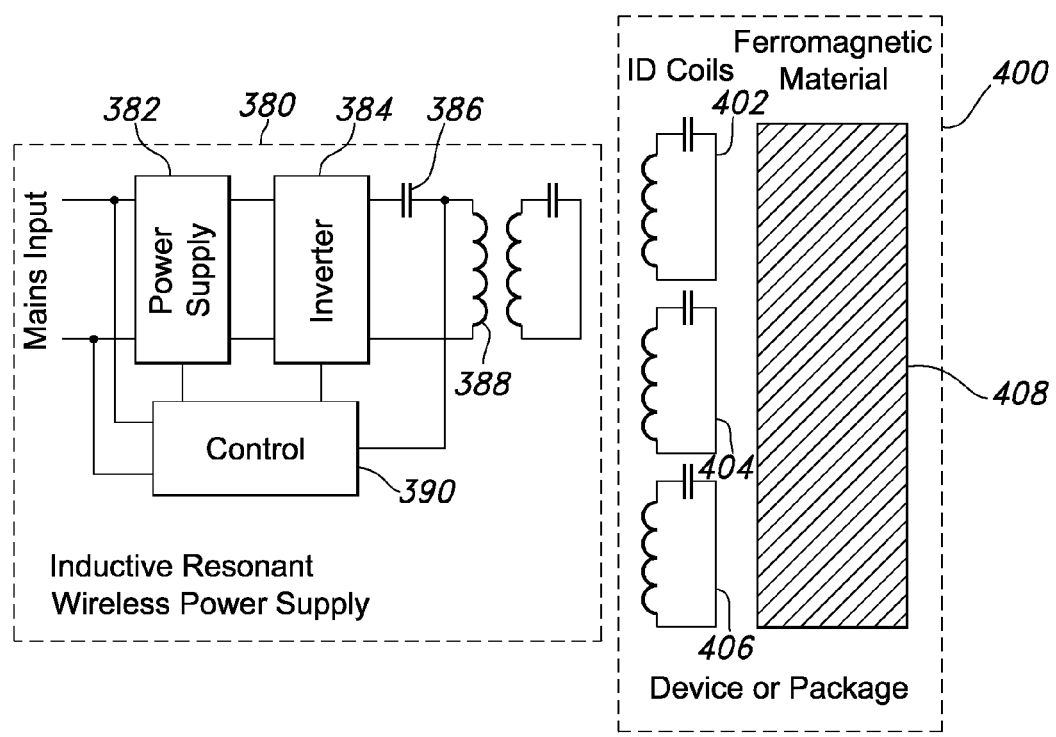
FIG. 20 is a circuit diagram of the inductive heater system of FIG. 19 including a re-resonator coil.

An inductive heating system for a product container or a portable device in accordance with another aspect of the invention is illustrated in FIG. 19-20. The inductive heating system includes a contactless power supply 380 and a product container 400. The contactless power supply 380 includes a power supply 382, an inverter 384 electrically coupled to the output of the power supply 382, and a tank circuit including a series capacitor 386 and primary coil 388. In addition, a controller 390 is electrically connected to a mains input, the power supply 382, the inverter 384, and the tank circuit for controlling a characteristic of the power applied to the primary coil 388. In particular, the controller 390 selectively controls the frequency at which power is generated in the primary coil 388. In operation, the contactless power supply 380 applies power to the primary coil 388 at an identification frequency and then evaluates the reflected impedance of the product container using a current or voltage sensor. If the product container 400 has a resonant frequency at the identification frequency, then the contactless power supply 380 can recover operating parameters from memory to directly or indirectly power a heater element within the product container 400.

In the present embodiment, the product container 400 includes three isolated resonant circuits 402, 404, 406 and a ferromagnetic material 408. The ferromagnetic material 408 can be in the form of a slab, strip, or coating on a surface of the product container 400. Alternatively, the product container 400 can itself be formed of a ferromagnetic material. The ferromagnetic material 408 may include a distinct currie-point temperature at which it no longer reacts to the inductive magnetic field, effectively placing imposing a maximum temperature on the device or package being heated. The selection of material and specific currie-point temperature is application specific and may be beneficial in situations where the product requires a specific temperature or in situations where the maximum temperature should be regulated for safety reasons. As described above, the contactless power supply 380 determines the identity of the product container 400 by sweeping through a predetermined range of frequencies while monitoring the current, voltage or phase in the primary coil 388. The isolated resonant circuits 402, 404, 406 in the product container 400 react differently to the contactless power supply 380 depending on the frequency applied to the primary coil 388. The different reactions of the resonant coils 402, 404, 406 cause varying current, voltage or phase in the primary coil 388. For example, when the current in the primary coil 388 exceeds a threshold value, or achieves a local maxima or other criteria, the controller 390 is able to record the frequency at which the event occurred. By sweeping through a range of frequencies, the contactless power supply 390 is able to determine and record an inductive identification profile optionally including the resonant frequencies of each of the isolated resonant circuits 402, 404, 406. The controller 390 is then able to translate the inductive identification profile into a unique device or package identification code as set forth in Part VII. The contactless power supply 380 then utilizes the identification code to provide power to the container 400 according to the specific needs of the container 400 and the contents therein. Power applied by the contactless power supply 380 can then induce eddy currents in the ferromagnetic strip 408 to heat the product container 380. As optionally shown in FIG. 20, the contactless power supply 380 can include an isolated re-resonator coil 392 that acts to shape, focus, redistribute or boost the inductive field strength when heating the product container 400 in order to increase the spatial freedom for alignment of the product container 400 and contactless power supply 380.

Figure 21:
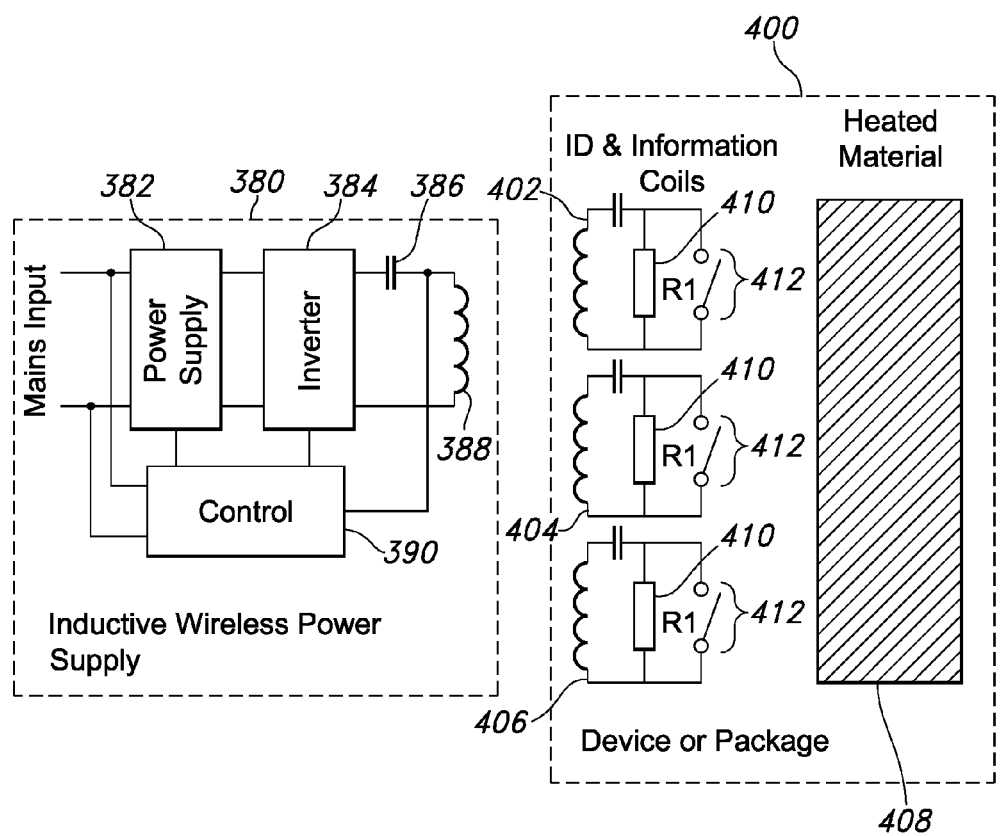
FIG. 21 is a circuit diagram of the inductive heater system of FIG. 19 including resonant circuits having resistive and bypass elements.
Figure 22:
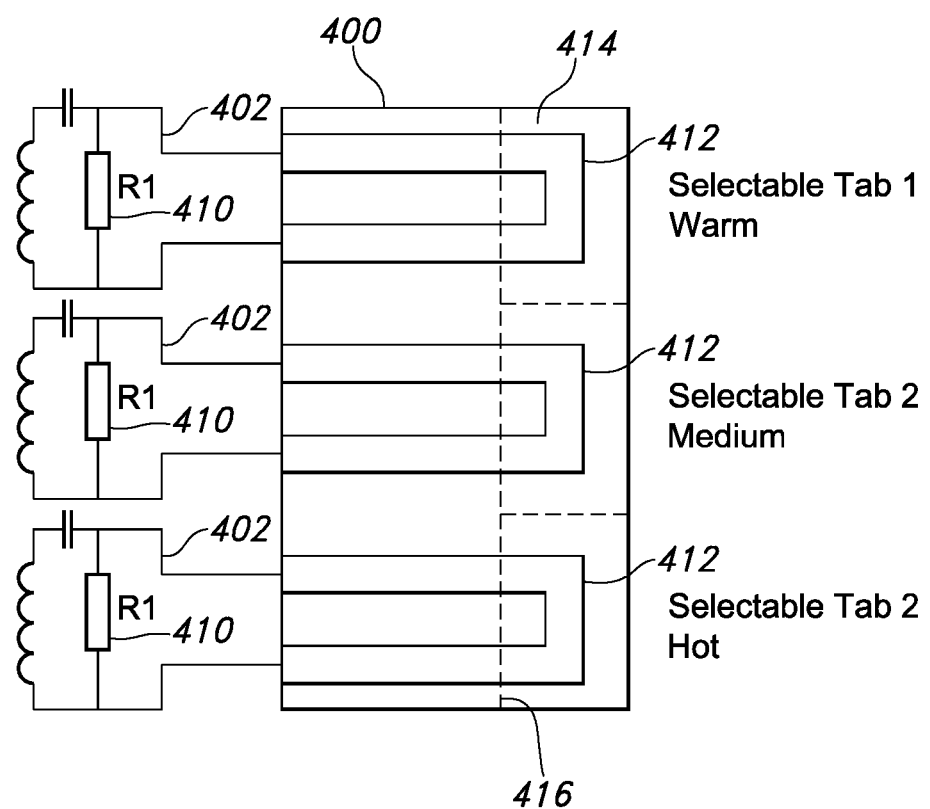
FIG. 22 is a circuit diagram of resonant circuits formed on a removable tear tab.

In another embodiment as shown in FIGS. 21-22, the isolated resonant circuits 402, 404, 406 each include a series resistive element 410 and a bypass element 412 to short the resistive element 410. The configuration of the resistive element 410 and the bypass element 412 may be set at manufacture or may be selectable by a vender or by an end-user of the product container 400. For example, physical switches may be employed to select the state of the bypass element 412. The physical switches may be push-buttons, a multi-pole slider switch, or a multi-pole rotary switch. Alternatively, the isolated resonant circuits 402, 404, 406 may be formed from conductive ink on a non-conducting substrate 414 forming a portion of the package 400, where the bypass element 412 is opened in response to the separation of a portion of the non-conducting substrate 414 from the remaining package 400. These can be sealed by another layer of protective ink, label or coating. In the event that the user desires to open one of the bypass elements 414, a user can tear off a designated portion of the package along a perforation 416. As shown below in Table 1, the state of the resonant circuits 402, 404, 406 can indicate the desired temperature of a food product within the product container 400, where "High" indicates the bypass element of the corresponding resonant circuit has been opened by the user:

TABLE 1

Selected Product Container Temperature

| Resonant Circuit 1 | Resonant Circuit 2 | Resonant Circuit 3 | Temperature |
| --- | --- | --- | --- |
| Low | Low | Low | Off |
| High | Low | Low | 100 |
| Low | High | Low | 140 |
| Low | Low | High | 180 |

Figure 23:
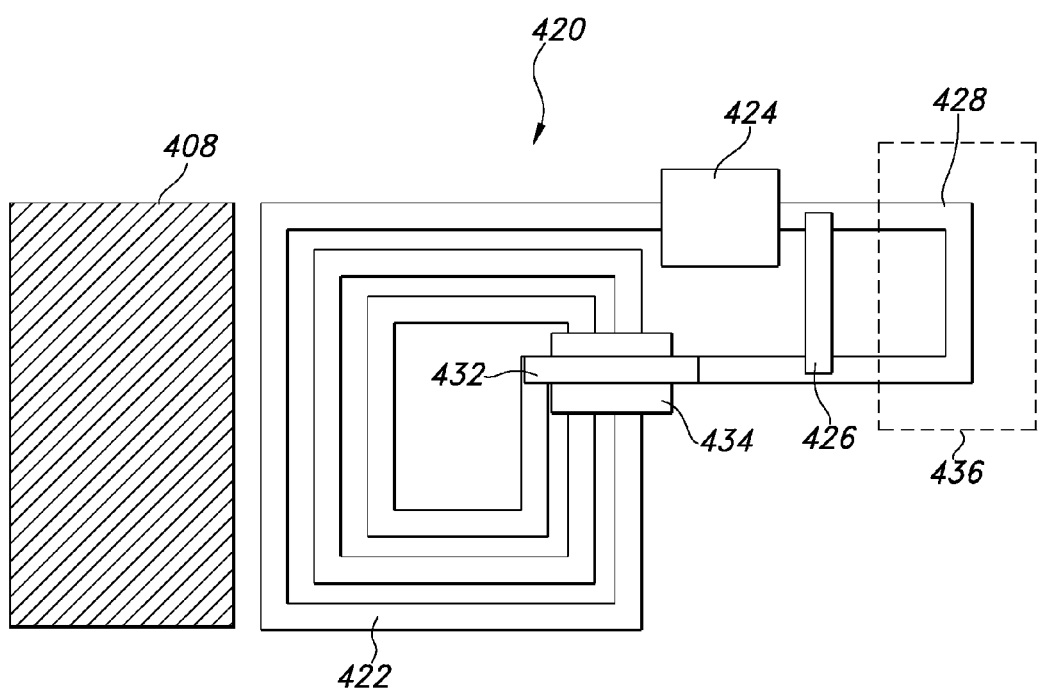
FIG. 23 is a diagram of a resonant circuit of FIG. 22 including a ferromagnetic heating element.
Figure 24:
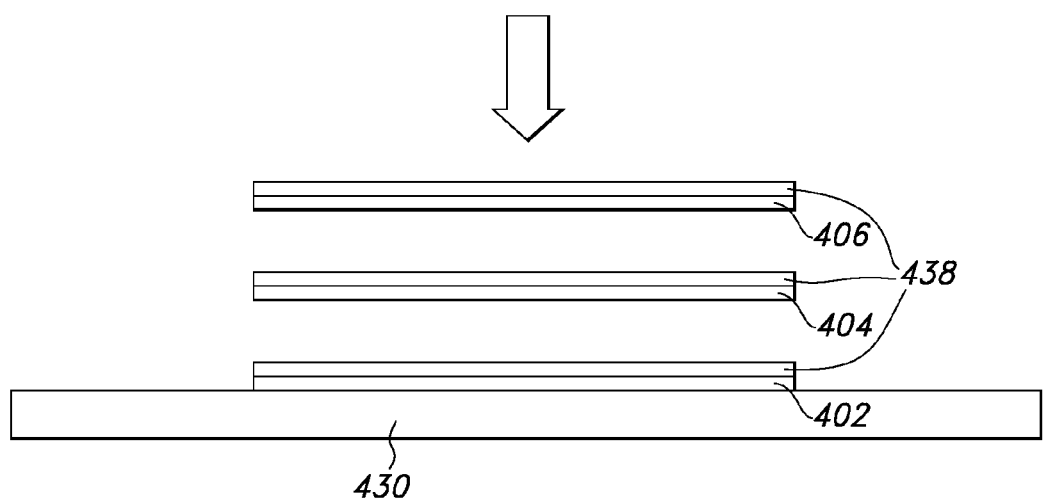
FIG. 24 is a side view of multiple layered resonant circuits.
Figure 25:
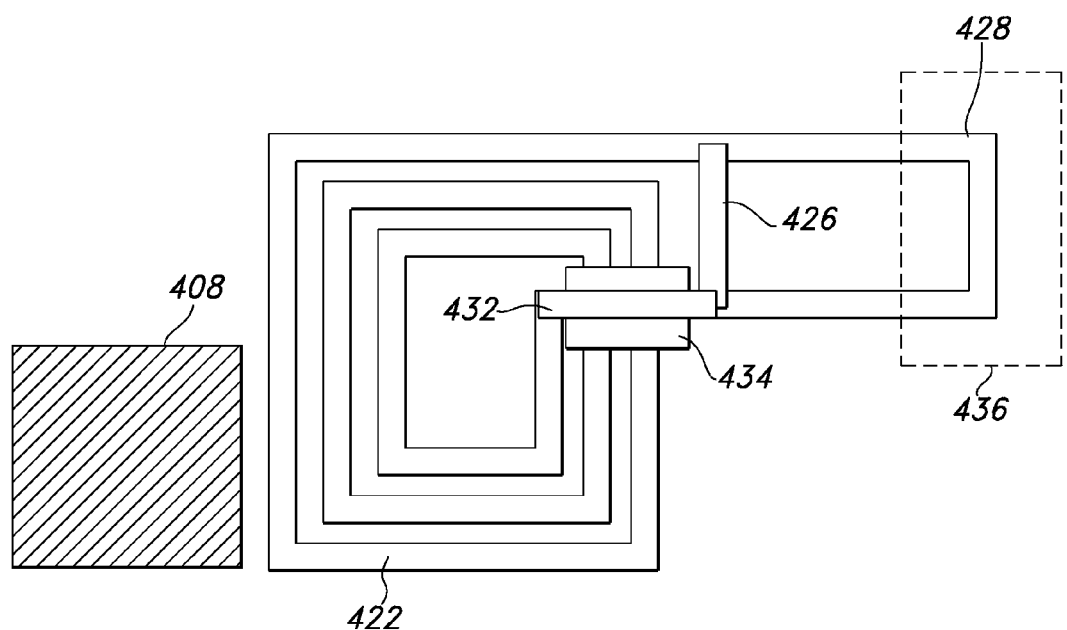
FIG. 25 is a diagram of a resonant circuit of FIG. 24 without a series resonant capacitor.
Figure 26:
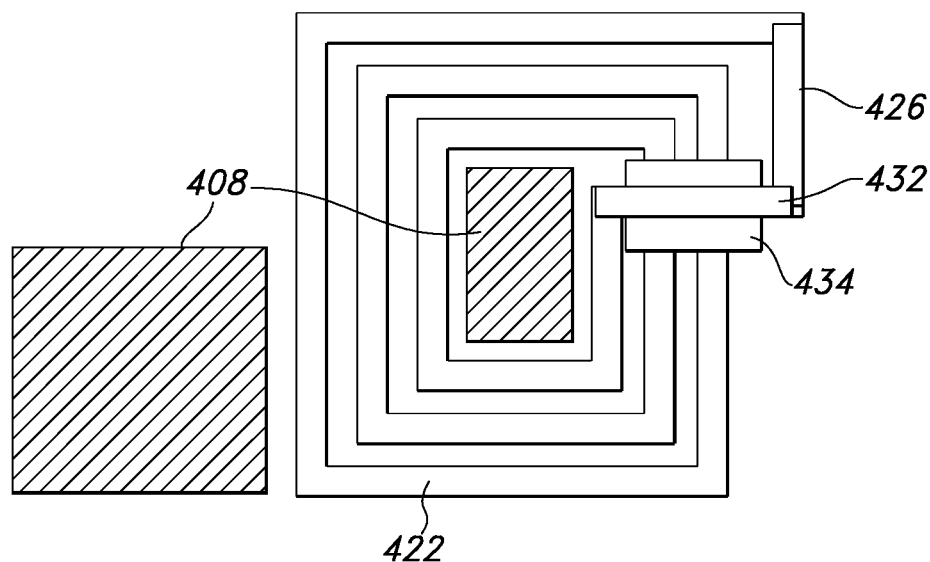
FIG. 26 is a diagram of a resonant circuit of FIG. 25 without a removable tear tab.
Figure 27:
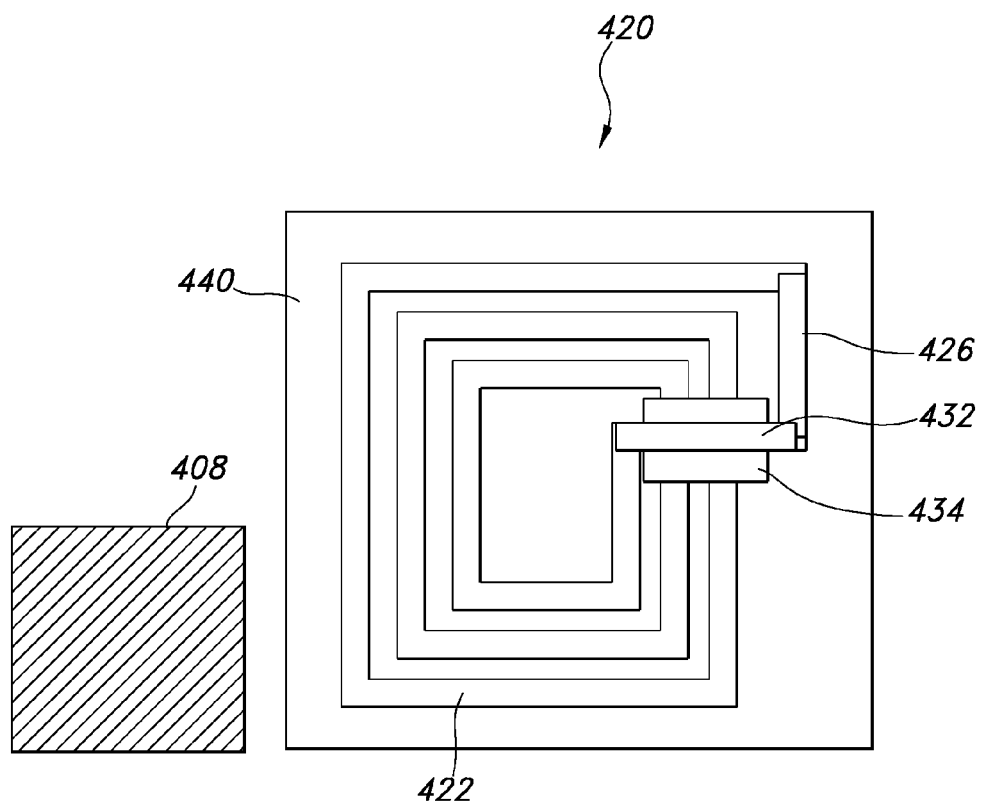
FIG. 27 is a diagram of a resonant circuit of FIG. 26 with printed shielding.

As optionally shown in FIG. 23, an isolated resonant circuit 420 can include a trace winding 422 formed on a non-conductive substrate 430, a printed ink capacitor 424, a carbon printed resistive element 426, a bypass element 428 formed on a perforated portion of the substrate 430, and a printed ink jumper 432 to interconnect end portions of the trace winding across a printed ink insulated layer 434. A portion of the substrate includes a tear tab 436, the removal of which opens the bypass element 428 to allow current to flow through the carbon printed resister 426, thus changing the reflected impedance of the isolated resonant circuit 420. In the manner as described above, the contactless power supply 380 can identify the product container 400 based on the resonant frequency or the reflected impedance of the isolated resonant circuit 420, and can provide inductive power to the heating element 408 based on the presence or absence of the tear tab 436 from the product container 400. This embodiment can be useful, for example, in providing the desired amount of heat to a food product, e.g., a can of soup, contained within the product container 400. The temperature may be initially set by the product ID and the selection may allow an offset to this base level. In addition, the isolated resonant circuits can overlie each other on a packaging material as shown in FIG. 24. As shown in FIG. 24, the isolated resonant circuits 402, 404, 406 are separated by corresponding layers of insulating ink 438. As optionally shown in FIG. 25, the isolated resonant circuit 420 does not include the optional printed ink resonant capacitor. Multiple resonant circuits can be printed within a small space utilizing insulator layers and multiple circuit layers. Moreover, the ferromagnetic material 408 can form a core, or can be used in conjunction with a separate ferromagnetic core, as shown in FIG. 26. In this embodiment, both the tear tab 436 and the printed ink capacitor 424 are omitted to illustrate their optional inclusion in the isolated resonant circuit 420. The isolated resonant circuit 420 of FIG. 27 can further include a printed shielding material 440 to enhance the inductive coupling between the isolated resonant circuit 440 and the primary coil 388. The shielding material can be utilized in combination with metal packages to isolate the coils from the metal package. For example, shielding inks can contain metal powders that can shield the coil from the metal package. The loading of non-conductive powder within these inks can impact the shielding properties along with the specific type of magnetic or metal properties.

Figure 28:
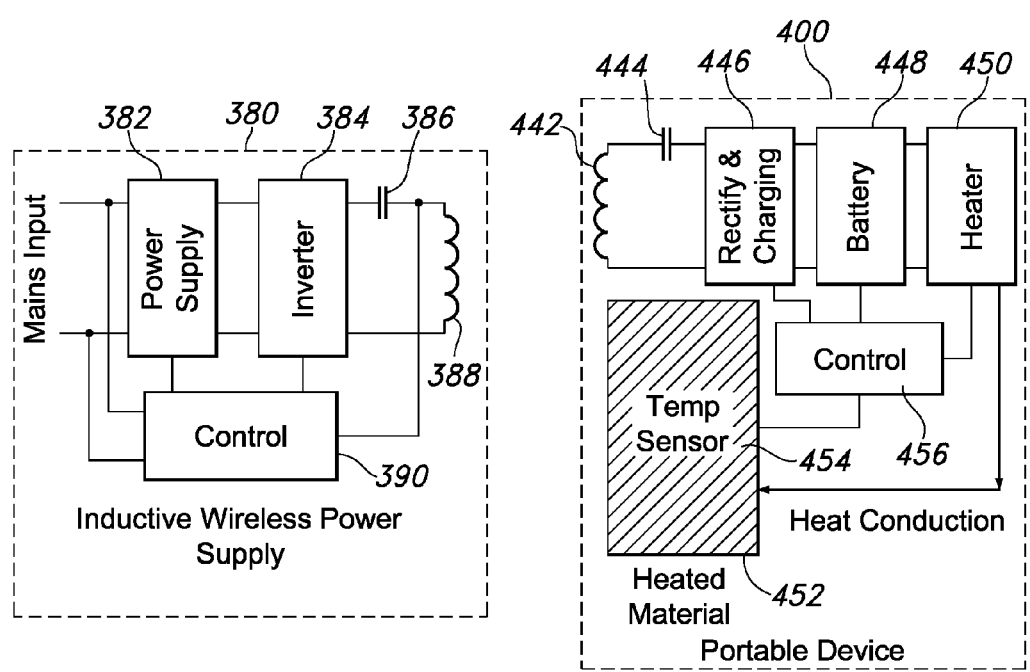
FIG. 28 is a diagram of a inductive heater system having a temperature sensor circuit.
Figure 29:
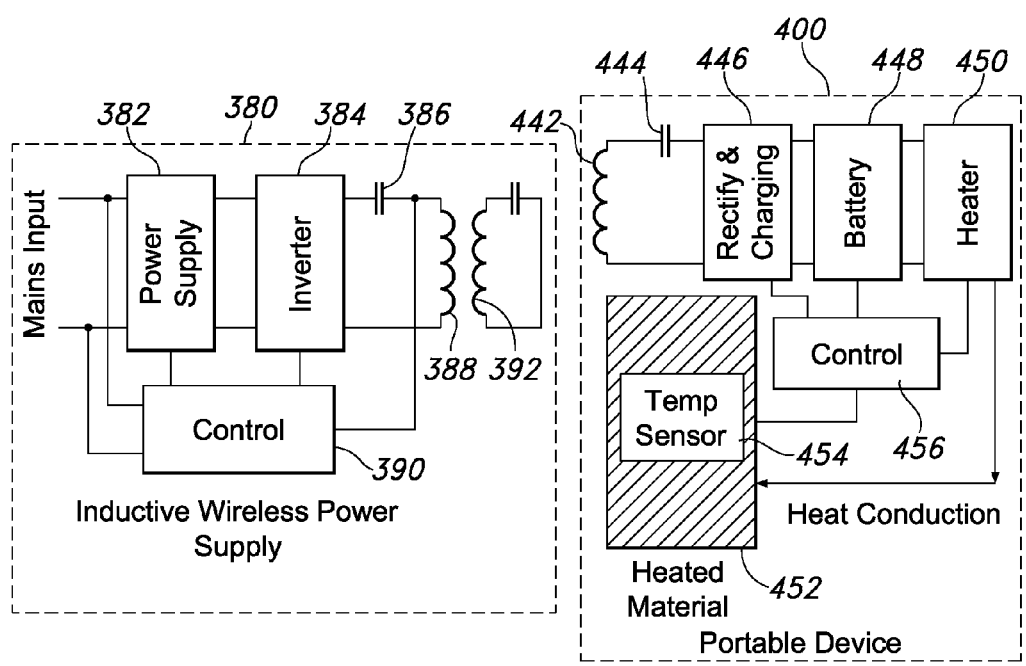
FIG. 29 is a diagram of the inductive heater system of FIG. 28 including a re-resonator circuit.

In another embodiment as shown in FIGS. 28-29, the contactless power supply 380 provides power to a portable device 400, for example a product container, to indirectly heat a surface of the portable device 400. In this embodiment, the portable device includes a secondary coil 442 and series resonant capacitor 444 to form a secondary tank circuit, a rectifying and charging sub-circuit 446 connected to the output of the secondary tank circuit, a battery 448 connected to the output of the rectifying and charging sub-circuit 446, a heater element 450 connected to the output of the battery 448, a heatable surface 452 to receive heat from the heating element 450 by conduction, a temperature sensor 454 to detect the temperature of the heatable surface 452 and having an output, and a controller 456 connected to the output of the temperature sensor 454. In this embodiment, the contactless power supply 380 does not directly heat a ferromagnetic material as discussed above in connection with FIGS. 18-21. Instead, the contactless power supply 380 provides power to the portable device 400 to charge the battery 448, which provides the corresponding power to operate the heater 450 and heatable surface 452. In this embodiment, the heater 450 can continue to operate when the device 400 is not in close proximity to the contactless power supply 380. As optionally shown in FIG. 29, the contactless power supply 380 can include an isolated re-resonator coil 392 that acts to shape, focus, redistribute or boost the inductive field strength when powering the device 400 in order to increase the spatial freedom for alignment of the device 400 and the contactless power supply 380. Additionally, charging and heating can occur simultaneously.

Figure 30:
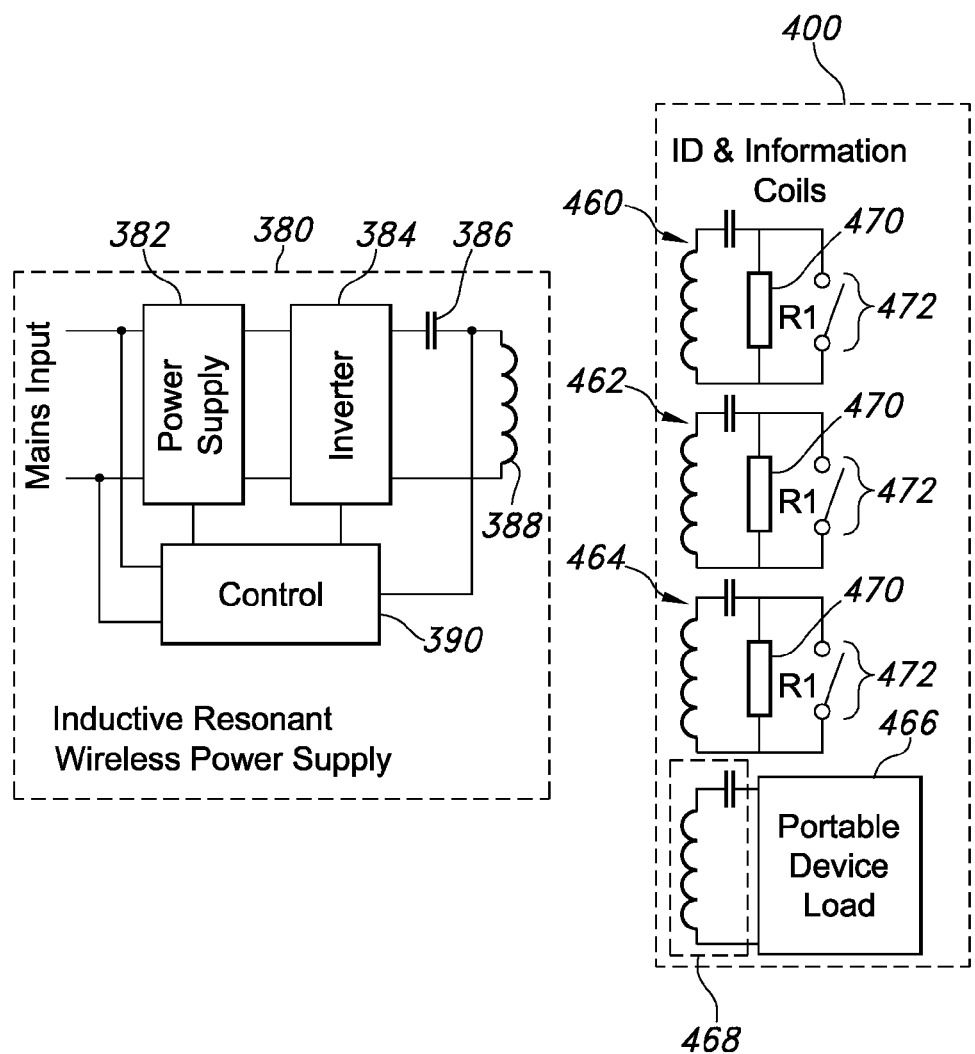
FIG. 30 is a diagram of an inductive heater system having a portable load device.
Figure 31:
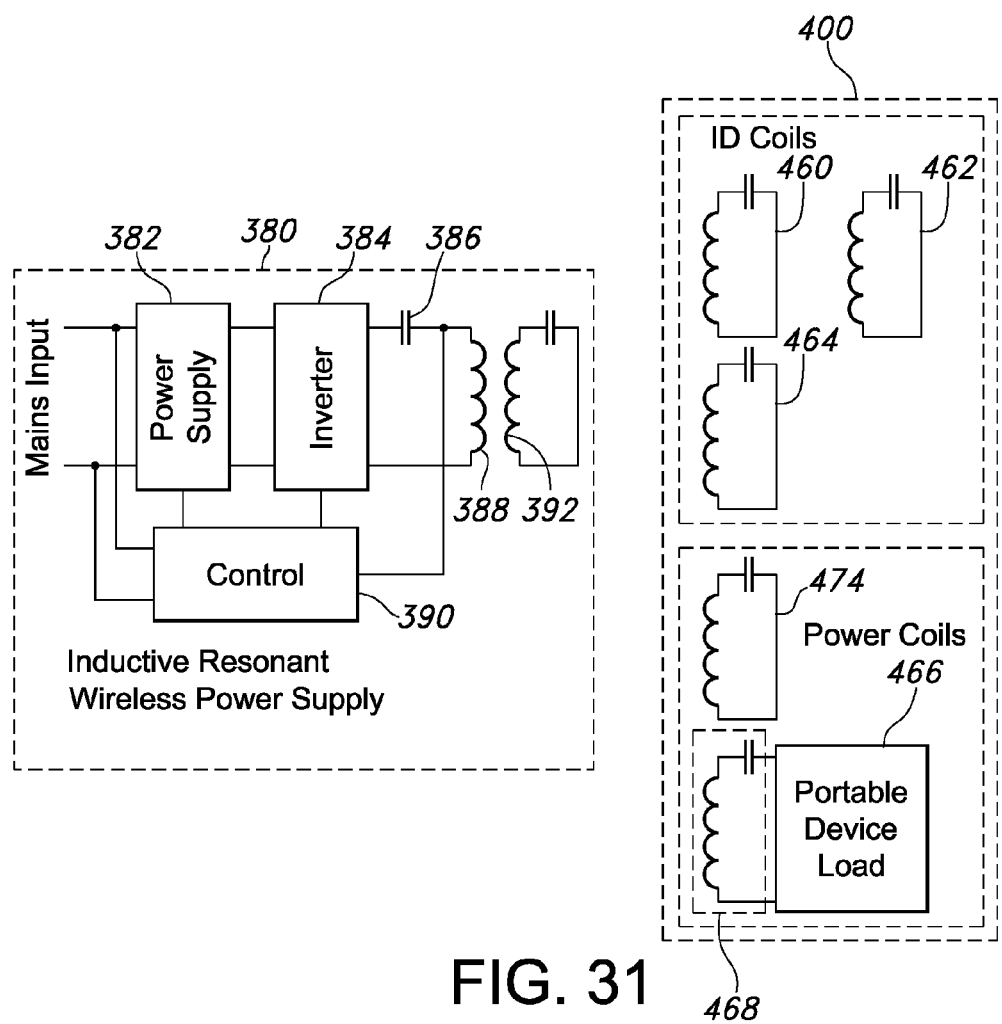
FIG. 31 is a diagram of the inductive heater system of FIG. 30 including first and second re-resonator circuits.

In another embodiment as shown in FIGS. 30-31, a portable device 400, for example a product container, includes three isolated resonant circuits 460, 462, 464 and a portable device load 466. In this embodiment, the contactless power supply 380 provides power to the portable load 466 using a secondary tank circuit 468 according to the reflected impedance of the isolated resonant circuits 460, 462, 464. As described above in connection with FIG. 21, each isolated resonant circuit 460, 462, 464 includes a resistive element 470 and a bypass element 472. When in a closed condition, the bypass element 472 effectively shorts the resistive element 470, effectively changing the impedance of the corresponding isolated resonant circuit. The contactless power supply 380 can then provide power to the remote device 400 based on the change in impedance of the isolated resonant circuit(s). For example, the state of the "n" number of resonant circuits 460, 462, 464 can indicate which of $2^n$ power levels should be applied to the portable device 400. As shown in Table 2 below, "0" indicates the bypass element of the corresponding resonant circuit is in a non-conducting state, and "1" indicates the bypass element of the corresponding resonant circuit is in a conducting state:

TABLE 2

| Selected Power Level | | | |
| --- | --- | --- | --- |
| Resonant Circuit 1 | Resonant Circuit 2 | Resonant Circuit 3 | Applied Power (mA) |
| 0 | 0 | 0 | 150 |
| 1 | 0 | 0 | 250 |
| 0 | 1 | 0 | 350 |
| 1 | 1 | 0 | 450 |
| 0 | 0 | 1 | 550 |
| 1 | 0 | 1 | 650 |
| 0 | 1 | 1 | 750 |
| 1 | 1 | 1 | 850 |

Once desired the power level is selected, which can include the operating frequency, amplitude, duty cycle, pulse width, phase or other characteristic of power in the primary coil 388, the contactless power supply 380 provides power to the portable device 400 to heat a surface of the portable device substantially as described above in connection with FIGS. 28-29. As optionally shown in FIG. 31, the contactless power supply 380 can include an isolated re-resonator circuit 392 that acts to shape, focus, redistribute or boost the inductive field strength when heating the remote device 400 in order to increase the spatial freedom for alignment of the remote device 400 and contactless power supply 380. In like manner, the remote device 400 can include a re-resonator circuit 474, shown as a series resonant circuit, to enhance reception of the inductive field generated by the contactless power supply 380.

Figure 32:
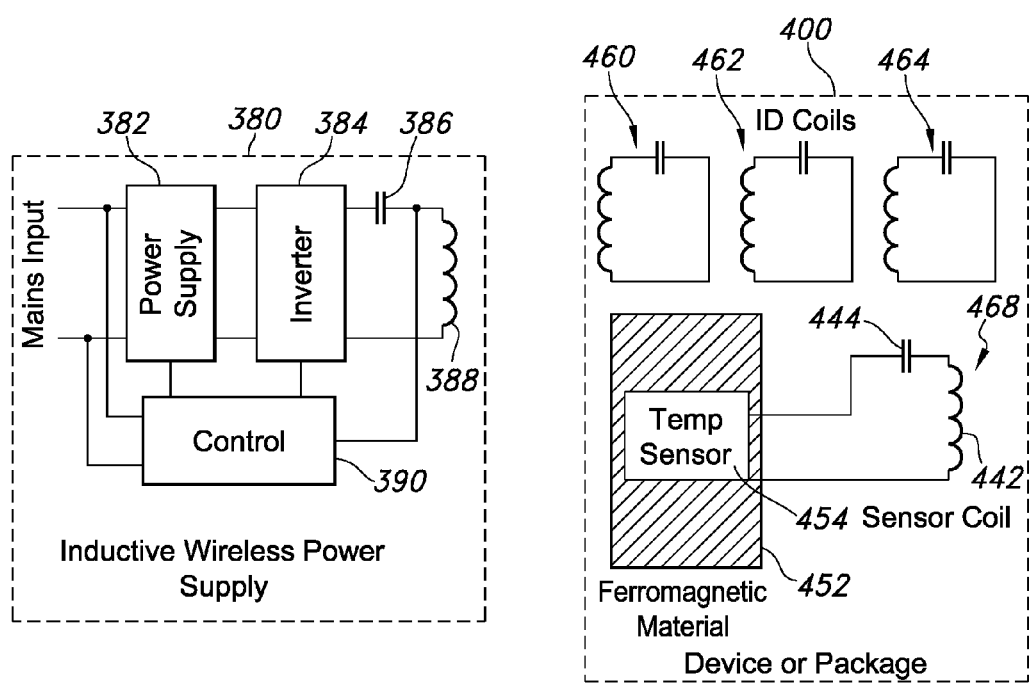
FIG. 32 is a diagram of an inductive heater system having a temperature sensor circuit.
Figure 33:
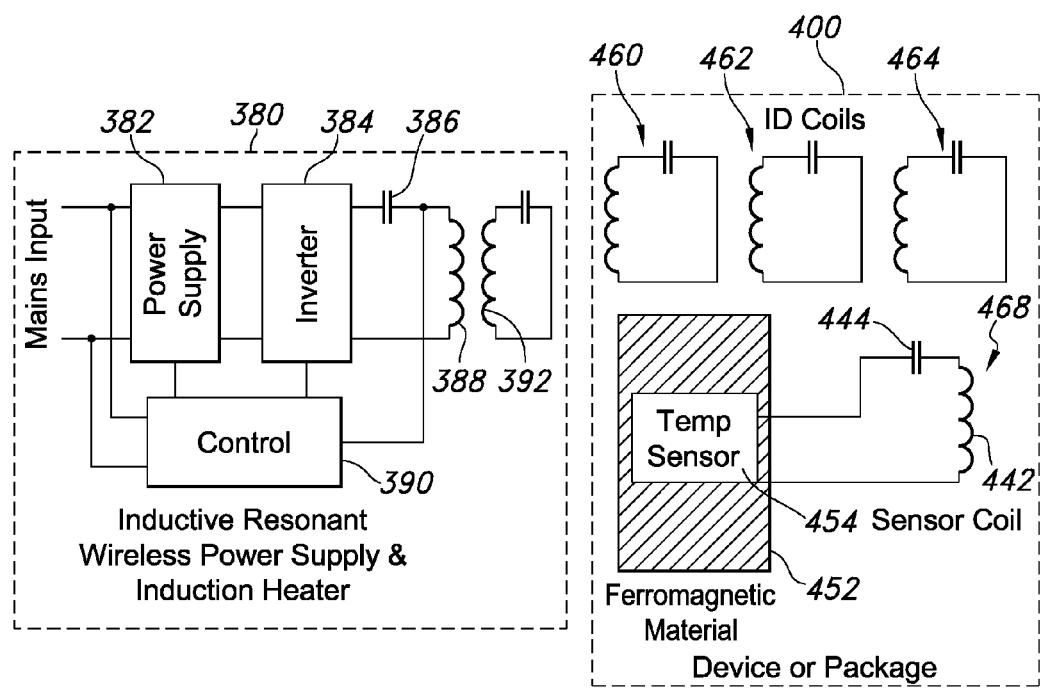
FIG. 33 is a diagram of the inductive heater system of FIG. 32 including a re-resonator circuit.

In another embodiment as shown in FIGS. 32-33, the remote device or product container 400 includes a resonant temperature sensor circuit 468. In this embodiment, the resonant temperature sensor circuit 468 includes a secondary coil 442, a series capacitor 444, and a temperature sensor 454. The temperature sensor can include a thermocouple, an analog to digital converter connected to the output of the thermocouple, and a variable impedance element connected to the output of the analog to digital converter. In operation, a change in the temperature of the ferromagnetic material 452 results in a change in the impedance of the resonant temperature sensor circuit 468. In this embodiment, the contactless power supply 380 is operable to detect a change in the reflected impedance of the resonant temperature sensor circuit 468, identify the corresponding change in temperature of the ferromagnetic material 452, and adjust the power output, if necessary. As optionally shown in FIG. 33, the contactless power supply 380 can include an isolated re-resonator circuit 392 that acts to shape, focus, redistribute or boost the inductive field strength when heating the remote device 400 in order to increase the spatial freedom for alignment of the remote device 400 and contactless power supply 380.

Figure 75:
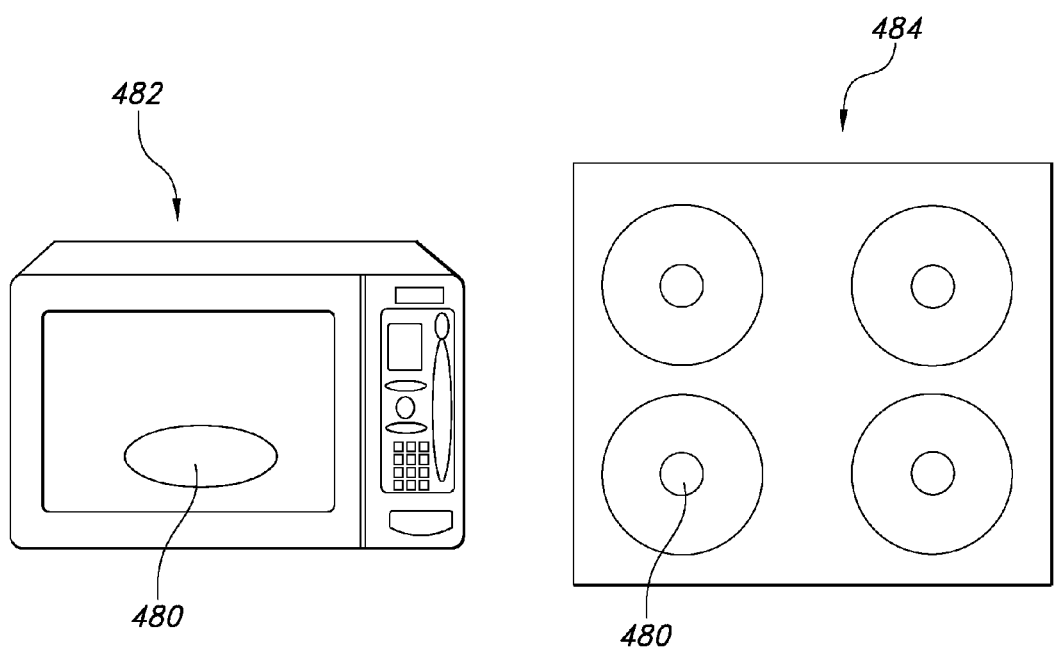
FIG. 75 are schematic diagrams of kitchen appliances including wireless power readers.

In another embodiment as shown in FIG. 75, the resonant temperature circuit 468 is contained within a food item. As set forth in connection with FIGS. 32-33 above, the resonant temperature circuit 468 can include a thermocouple, an analog to digital converter connected to the output of the thermocouple, and a variable impedance element connected to the output of the analog to digital converter. In operation, a change in the temperature of the food item can result in a change in the impedance of the resonant temperature sensor circuit 468. In this embodiment, a wireless power reader coil 480 is operable to detect a change in the reflected impedance of the resonant temperature sensor circuit 468 and identify the corresponding change in temperature of the food item. In some embodiments, the food item can be heated according to the wireless power systems and methods set forth above in connection with FIGS. 18-33. In other embodiments, the food item can be heated according to conventional methods. For example, the wireless power reader coil 480 can form part of a microwave oven 482 and/or a stove top 484, for example a gas range or an electric range. As the food approaches the desired temperature, the wireless power reader coil 480 can provide an output to a controller associated with the microwave and/or stove. In this regard, the microwave or stove controller can shut-off operation of the microwave or stove to prevent overcooking of the food item. Addition, the controller can monitor the output of the resonant temperature sensor circuit 468 to prevent against undercooking the food item. While the resonant temperature sensor circuit 468 is described above as directly monitoring the temperature of the food item, in some applications it can be desirable to indirectly monitor the temperature of the food item. For example, the resonant temperature sensor circuit 468 can also monitor the temperature of the baking pan, frying pan, pot, etc., alone or in combination with the temperature of the food item contained therein. In these and other applications, it can also be desirable to provide microwave shielding to potentially isolate the resonant temperature circuit 468 from microwaves or other electromagnetic radiation that might otherwise interfere with operation of the wireless power reader coil 480, for example.

IV. Portable Device Heater Systems

In another aspect of the invention, a system for providing a source of wireless power to a portable heating appliance is illustrated in FIGS. 34-37 and generally designated 500. The system generally includes a contactless power supply 510 adapted to provide power to the portable appliance 520 based on its specific power needs.

Figure 34:
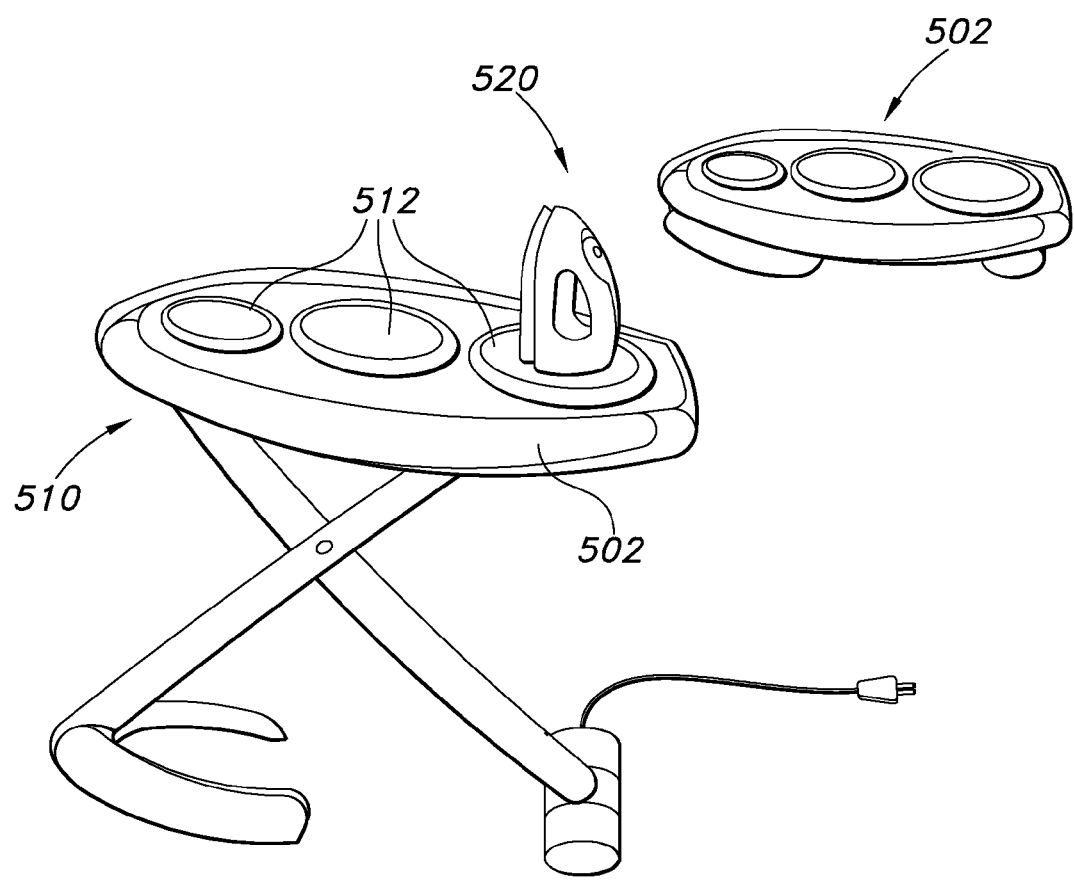
FIG. 34 is an illustration of a cordless iron and ironing board including a contactless power supply.
Figure 35:
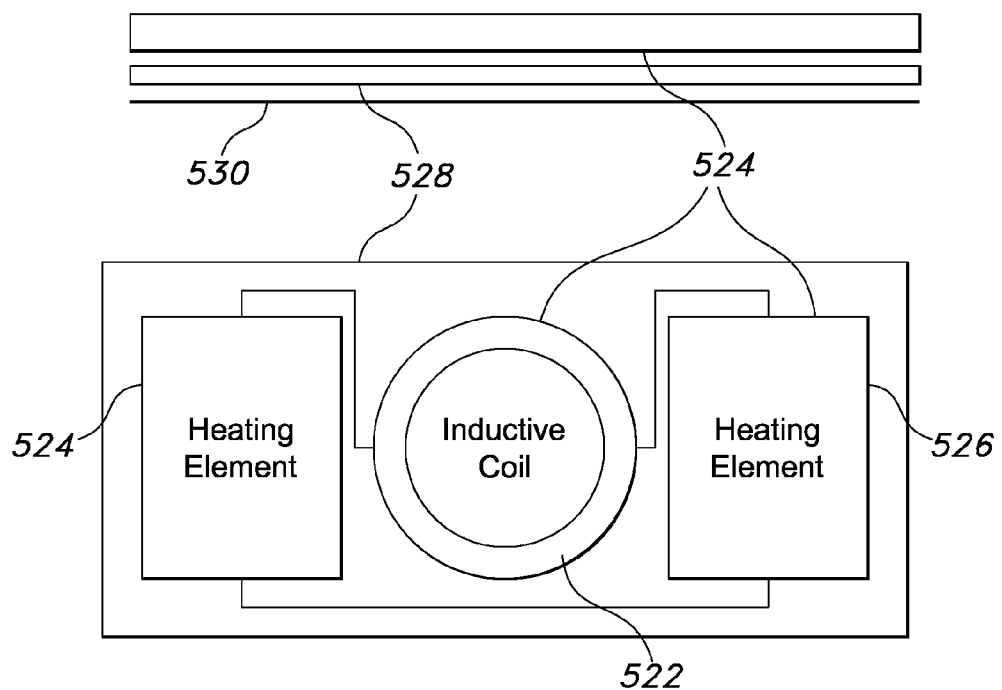
FIG. 35 is a diagram of the contactless power supply of FIG. 34.

In one embodiment as shown in FIGS. 34-35, the contactless power supply 510 is supported by a stowable ironing board 502 to provide power to a cordless clothes iron 520. The contactless power supply 510 can include one or more primary coils 512 to inductively couple with a secondary coil 522 contained within the cordless iron 520. The iron 520 can include one or more heating elements 524, 526 electrically connected to the output of the secondary coil 522. A ceramic heating substrate 528 can be positioned between a non-stick surface 530, for example a Teflon® material by DuPont of Wilmington, Del., and the one or more heating elements 524, 526. The iron 520 can also include a ferromagnetic heating element substantially as set forth in FIG. 18 above. For example, heating the ferromagnetic material while charging an internal battery can allow that stored energy to later be used with the heating elements 524, 526 when the device is removed from the contactless power supply 510.

Figure 36:
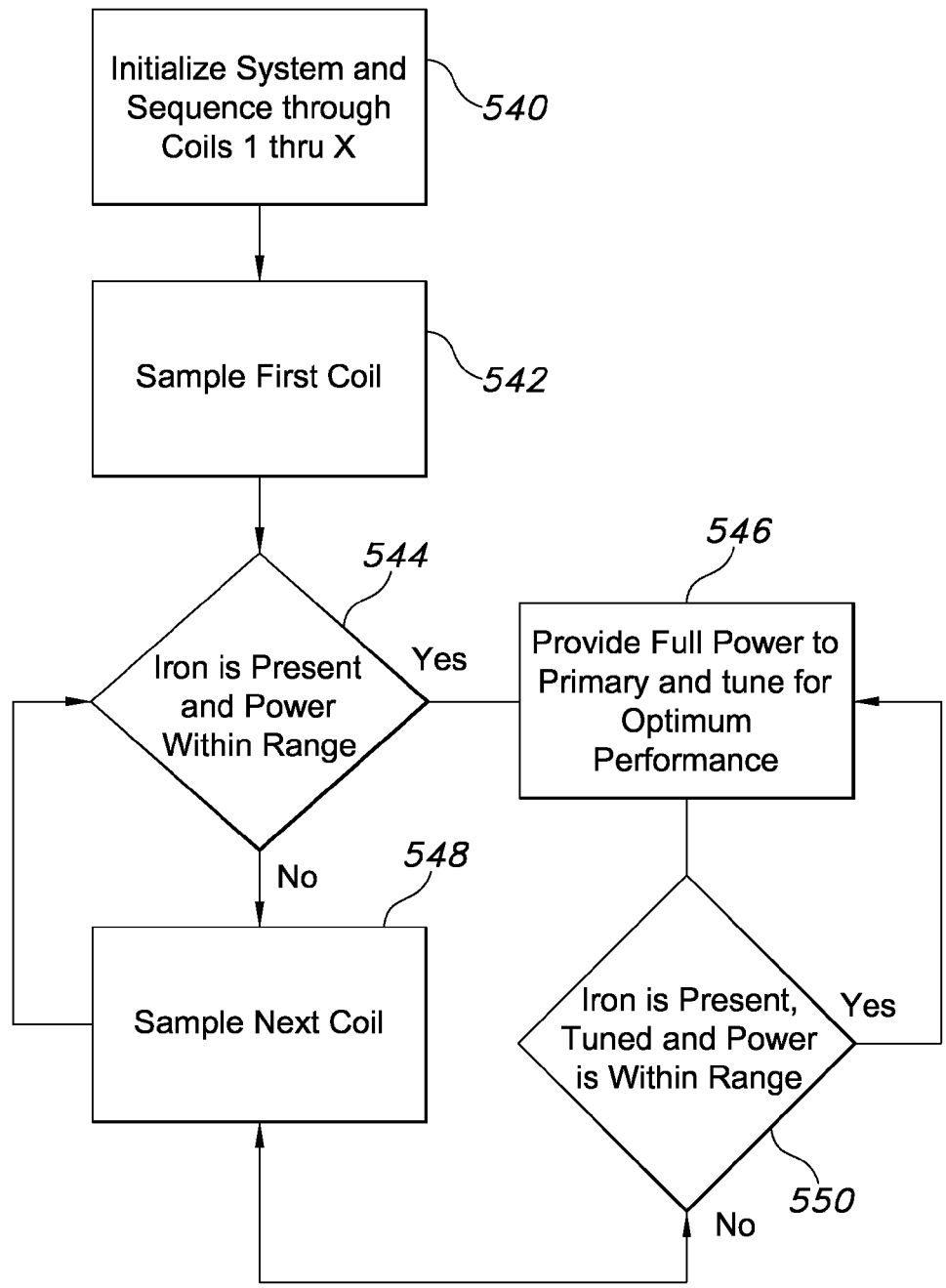
FIG. 36 is a first process flow chart for operation of the contactless power supply of FIG. 34.
Figure 37:
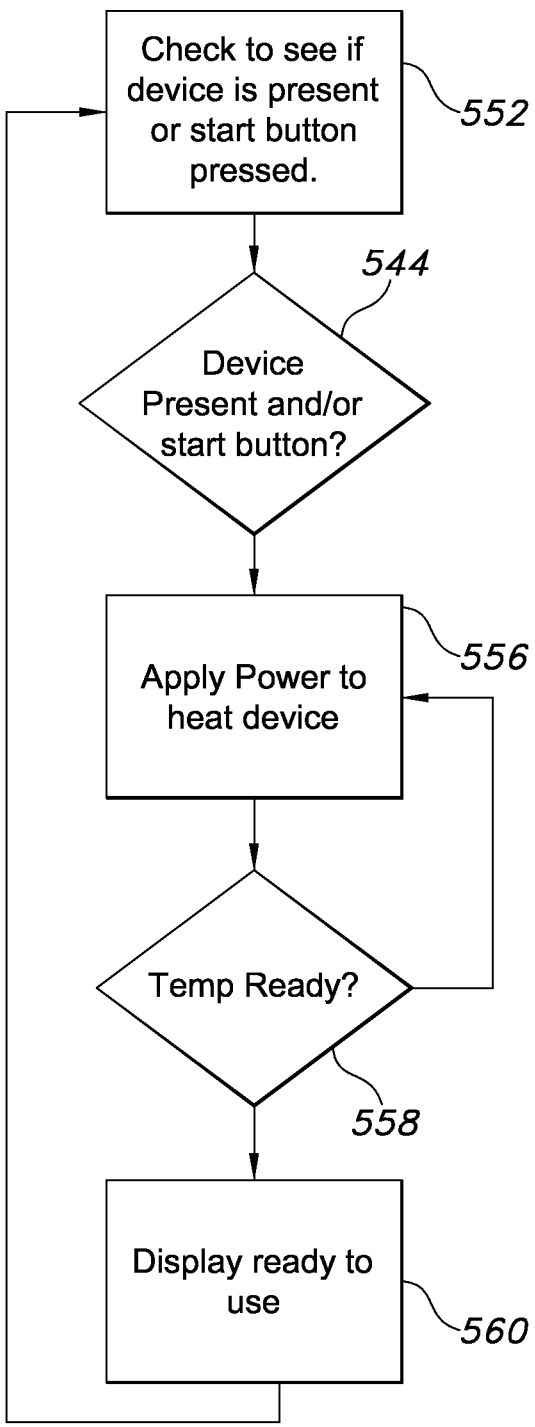
FIG. 37 is a second process flow chart for operation of the contactless power supply of FIG. 35.

Operation of the contactless power supply 510 can be understood with reference to FIGS. 36-37. The contactless power supply 510 can be used to heat, power, charge batteries and/or read the identifiers and sensors as set forth in Parts I-III above. For example, one method for operating the contactless power supply 510 includes initializing the system at step 540 and driving the first primary coil at step 542. At step 544, the contactless power supply 510 can determine whether a cordless iron or other portable device is adjacent the first primary coil 512 substantially as described above in connection with FIGS. 19-20. If an iron 510 is present, the power supply 510 can provide power to the first primary coil 512 at step 546. If at decision step 544 the iron 520 is not present, the power supply 510 can drive the second primary coil 514 at step 548. If the iron is proximate the second primary coil 514, the power supply 510 can provide power to the second primary coil 514 at step 550. If, however, the iron is not present, the power supply 510 samples the next primary coil in the same manner. Accordingly, the contactless power supply 510 can sample each primary coil associated with the ironing board 502 in sequence to provide power to only those primary coils proximate the cordless iron 540. As also shown in FIG. 37, the contactless power supply 510 can first evaluate whether the portable device 520, or in the present case, an iron, is proximate the contactless power supply. If at step 554 a start button is depressed by a user or the iron 520 is proximate the contactless power supply 510, the contactless power supply applies power to the desired primary coil 512 to heat the ironing surface of the cordless iron 540. At decision step 556, the power supply 510 can determine whether the ironing surface is ready for use (e.g., at the desired temperature) substantially as described above in connection with FIGS. 28-29. If the ironing surface is not ready for use, the process repeats itself at step 556. If, however, the ironing surface is ready for use, a display on either the ironing board 510 or the iron 520 provides a visual or audible indication to a user that the iron is ready for use, as shown in process step 560.

Figure 38:
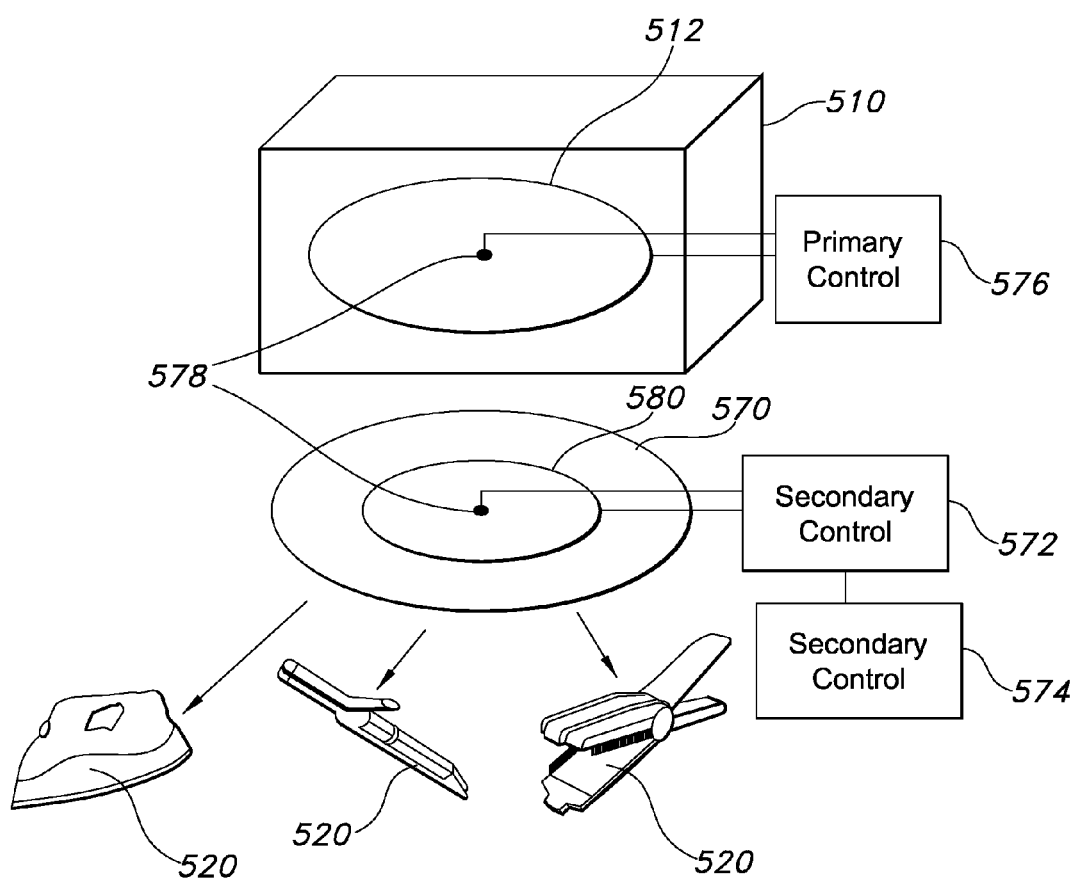
FIG. 38 is an illustration of an inductive heating system for a portable device.
Figure 39:
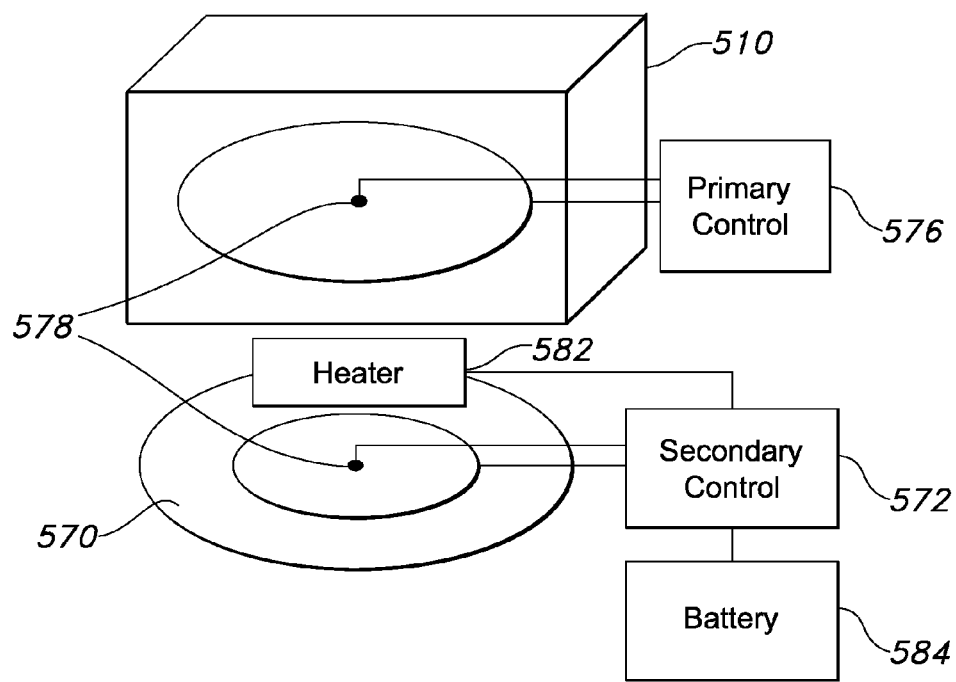
FIG. 39 is an illustration of the inductive heating system of FIG. 38 including a secondary control unit to simultaneously energize a heating material and recharge a battery.
Figure 40:
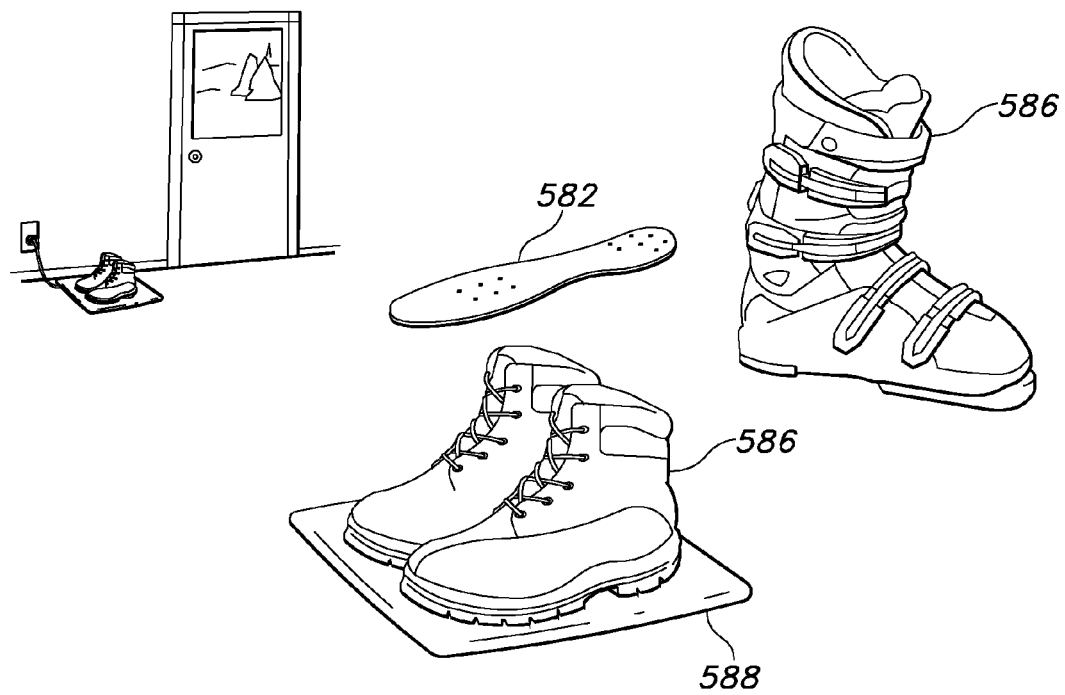
FIG. 40 is an illustration of a heating system for an article of footwear.
Figure 41:
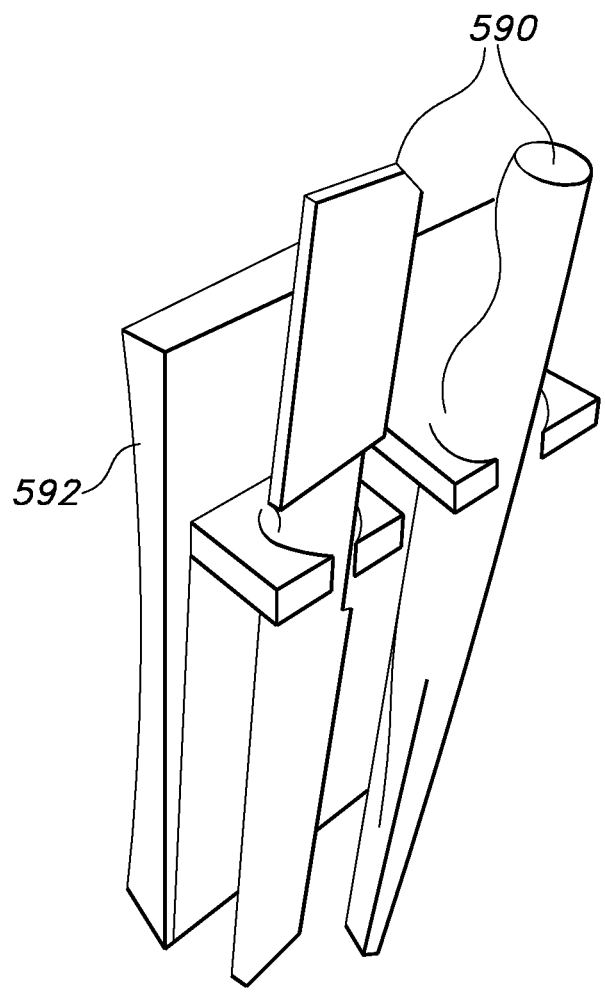
FIG. 41 is an illustration of a heating system for a hair straightener and curling iron.
Figure 42:
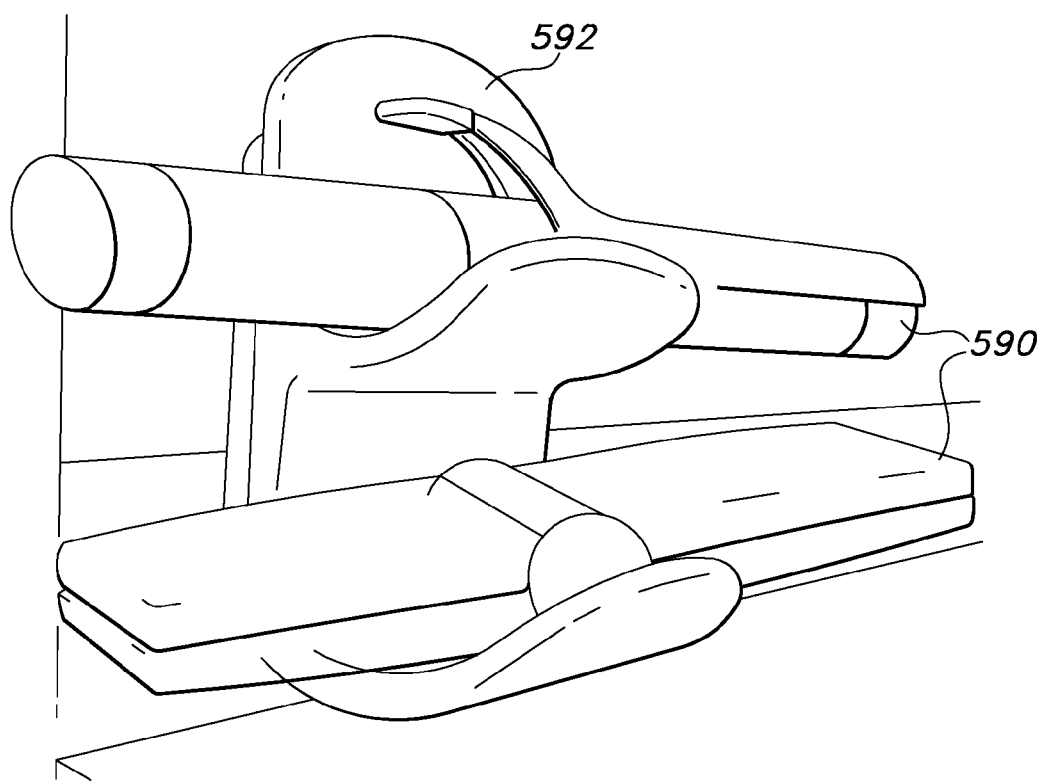
FIG. 42 is an illustration of a heating system for a hair straightener and curling iron according to an alternative embodiment.
Figure 43:
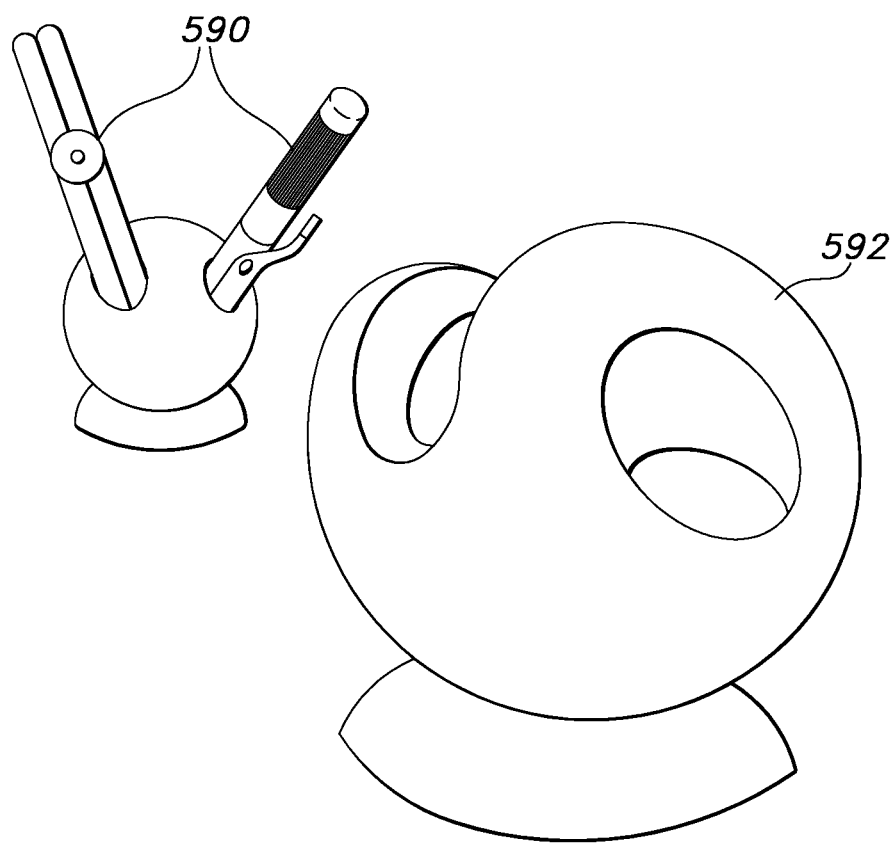
FIG. 43 is an illustration of a heating system for a hair straightener and curling iron according to an alternative embodiment.

As noted in Part III above, the contactless power supply can provide power to a portable device based on the identity of the portable device and/or based on the state of one or more isolated resonant circuits. To reiterate, in some embodiments the portable device 520 can include a ferromagnetic material 570 that is directly energized by a primary coil 512 of the contactless power supply 510 as shown in FIG. 38. In other embodiments, the portable device 520 can alternatively include a heater element 572 electrically connected to the output of a battery 584 which itself is powered by a secondary coil 580 coupled to the primary coil 512 of the contactless power supply 510 as shown in FIG. 39. In these embodiments, the contactless power supply 510 indirectly heats a ferromagnetic material 570 to generate heat while simultaneously providing power to a secondary coil 580 within the portable device 520. The contactless power supply 510 can also read the data back from sensors and selection switches as described above. As shown in FIG. 40, the heating element 582 can include all or a portion of an article of footwear such as a boot-insert. When the heating element 582 is placed into the article of footwear 586, the heating element 582 heats up when proximate a contactless power supply mat 588 to accelerate the drying of the article of footwear 586. As also shown in FIGS. 41-43, the contactless power supply 510 can be utilized to heat hair styling irons 590. The contactless power supply 510 can be incorporated into a variety of device holding racks 592 to identify and to provide power to the hair styling irons 590 substantially as set forth above.

To reiterate, a heating appliance system 500 can include a contactless power supply 510 and a portable heating device 520. The contactless power supply 510 can include a primary coil 512 and the portable heating device 520 can include a secondary coil 522 electrically connected to a battery. The portable heating device 520 can further include a ferromagnetic heating element 524 and an exposed surface 530, where the ferromagnetic heating element 524 is electrically connected to the output of the battery. A heating substrate 528 can be positioned between the exposed surface 530 and the heating element 524, where the contactless power supply heats the ferromagnetic material while simultaneously charging the battery. Energy from the battery can also be utilized to heat the ferromagnetic heating element 524. The portable heating device 520 can further include a passive identification circuit defining an inductive identification profile and optionally includes the secondary coil 522.

V. Product Alignment Systems

Figure 44:
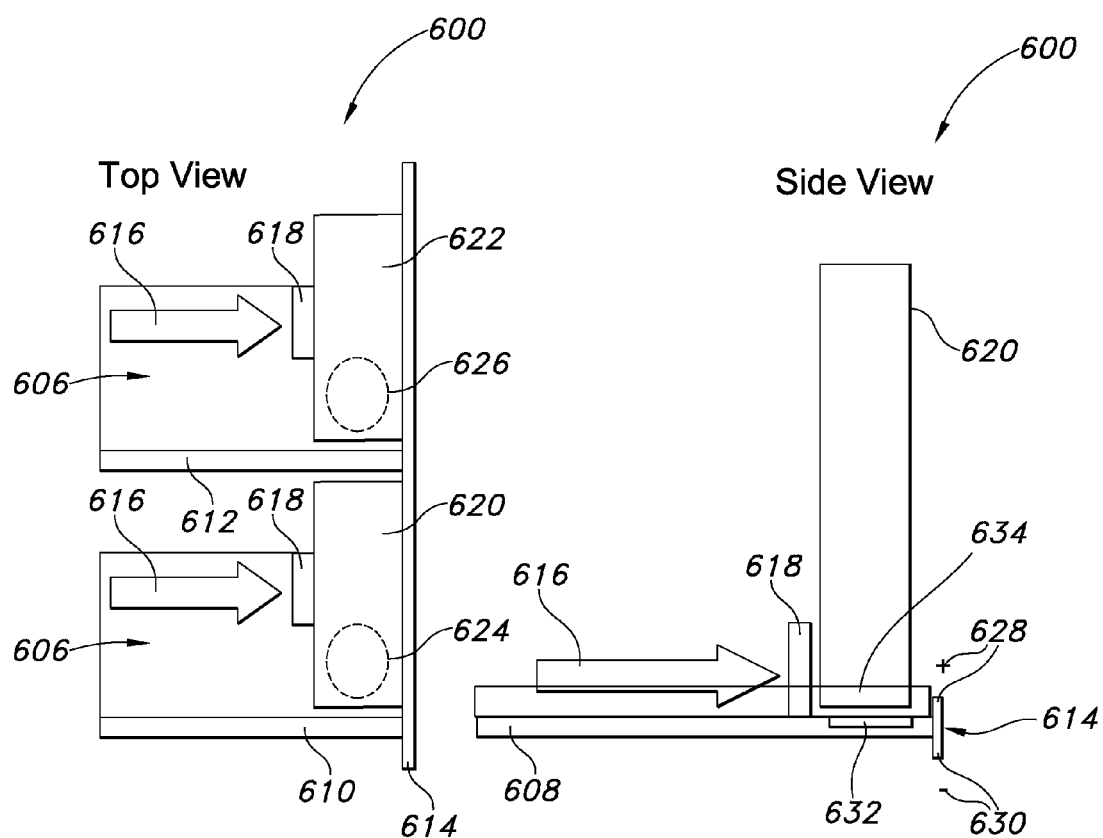
FIG. 44 are top and side views of a product alignment system.
Figure 45:
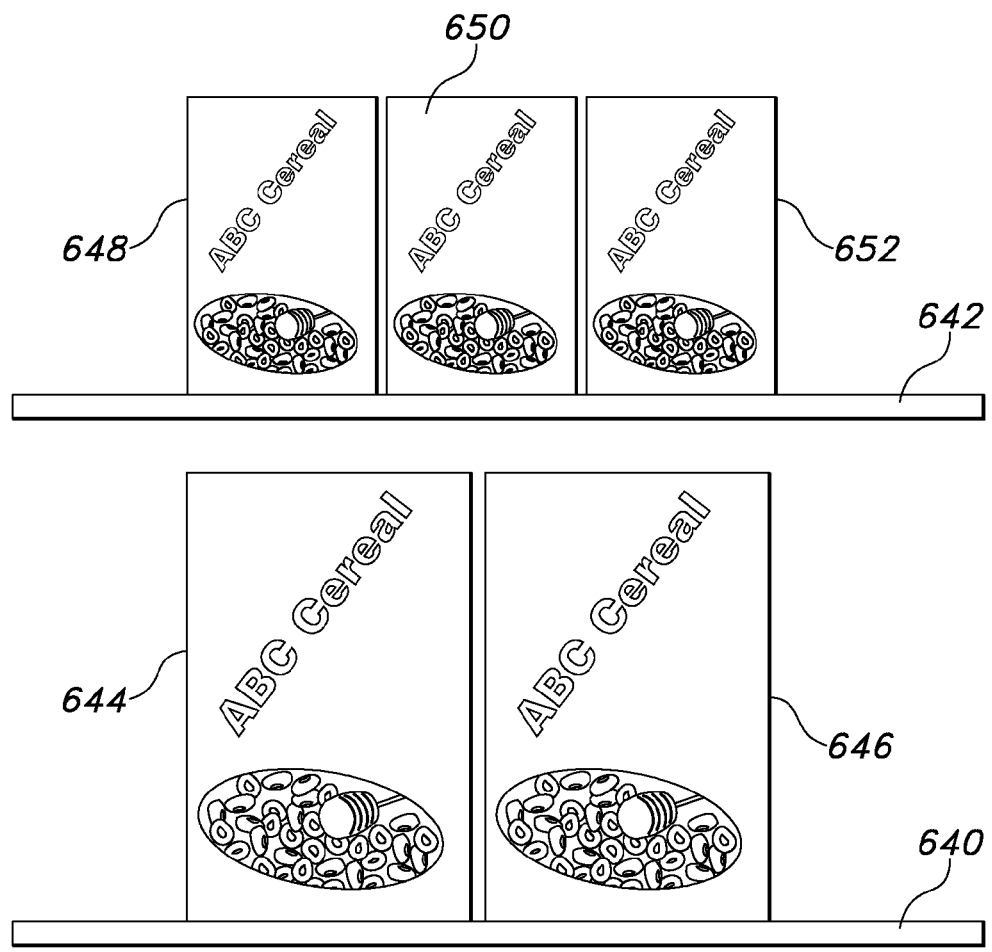
FIG. 45 is a first front view of the product alignment system of FIG. 44.
Figure 46:
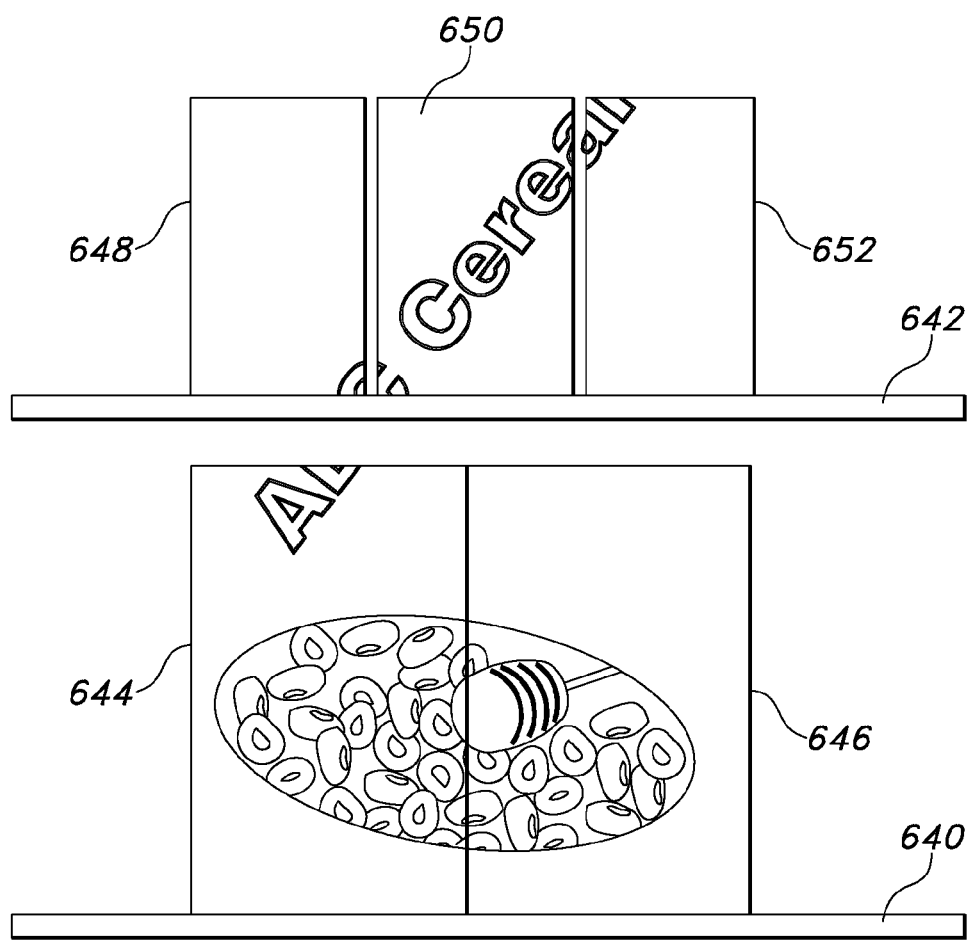
FIG. 46 is a second front view of the product alignment system of FIG. 44.

According to another aspect of the invention, a product alignment system is illustrated in FIGS. 44-46 and generally designated 600. As disclosed below, the product alignment system 600 can improve the coupling coefficient between a primary coil in a display surface and a secondary coil in a product or product package.

Referring now to FIG. 44, the product alignment system 600 includes a display surface 606 and a plurality of products or product containers 620, 622. The display surface 606 can support multiple rows with each row being defined by an elongate and optionally downwardly sloped supporting member or shelf 608, laterally spaced, upwardly extending guide rails 610, 612, and a transverse, upwardly-extending lip 614 forward of the lead products 620, 622. Each row can include a spring 616 and a transverse guide plate 618 for advancing the products 620, 622 toward a forward portion of the display surface 602 as the lead product is removed from each row 604, 606. Alternatively, or in combination, each product 620, 622 can be gravity fed toward a forward portion of the display rack as the lead product is removed, in which instance the spring 616 and guide plate 618 may or may not be provided.

As also shown in FIG. 44, the display surface 606 includes first and second primary coils 624, 626. The first and second primary coils 624, 626 can include horizontally disposed coils each received within a corresponding annular recess in the display surface 606. Optionally, each primary coil 624, 626 is disposed in the forwardmost portion of a row to underlie, and to provide power to, the lead product in each row. In addition, each primary coil 624, 626 can include an associated power supply 632 electrically connected to first and second conducting strips 628, 630 that extend lengthwise along or within the upwardly-extending lip 614. A weight activated sensor in the forwardmost portion of each row can detect the presence or absence of a lead product, and thereby activate or otherwise initiate operation of the corresponding power supply. The products 620, 622 can each include a secondary coil 634, 636, optionally including a printed trace winding and a printed secondary tank circuit.

As each lead product is removed from a corresponding row, the spring 616 and guide plate 618 advance the forwardmost product to a position overlying the primary coils 624, 626, thereby improving the coupling coefficient between the primary coils 624, 626 and the secondary coils 634, 636. Optionally, the secondary coil associated with the lead product will consistently or nearly consistently overlie a primary coil in the display surface 606. In this respect, the product alignment system 600 will advance products to a position that is visible and easily accessible to consumers, while simultaneously providing a source of wireless power to one or more product LEDs, OLEDs, LCD displays, speakers, batteries or other devices associated with the lead product or its packaging. In addition, the product alignment system 600 can ensure each lead product is sufficiently charged prior to purchase, and can assist in the identification, tracking and reordering of such products as set forth above.

The present embodiment can be further understood with reference to FIGS. 45-46, in which the product alignment system 600 includes first and second parallel display surfaces 640, 642 spaced apart from each other. Each display surface 640, 642 can include a primary coil at a forward portion of the display surface underlying each lead product. For example, a primary coil can be disposed in the forwardmost portion of the display surface to underlie, and to provide power to, substantially only a lead product, e.g., the forwardmost item or items on the display surfaces. The display surfaces 640, 642 can constitute display shelving or end caps common in retail and grocery stores. The display surfaces 640, 642 can support multiple items, including products, product containers and/or product displays. For example, the lower display surface 640 can include first and second items 644, 646, and the upper display surface 646 can include third, fourth and fifth items 648, 650, 652. Each item can include one or more internal or external energy storage devices, such as a battery or a capacitor. Alternatively, these items can include products not normally associated with an energy storage device. For example, the items can include a collection of differently sized or uniformly sized cereal products.

As noted above in connection with FIG. 46, each primary coil 624, 626 can provide power to a secondary coil 634 associated with the corresponding lead item. The secondary coil 634 can include any circuit adapted to receive wireless power. For example, the secondary coil 634 can include printed tank circuits formed on a flexible, non-conductive substrate including a pressure sensitive adhesive or PSA. As such, the secondary coil 634 can be formed on a low-profile sticker including first and second electrical contacts for connection to the product or product packaging.

The product or product packaging 620 can utilize the power transferred to the secondary circuit in any number of ways. For example, the secondary coil 634 can provide power to a load across a rectifying LED, a battery, a speaker circuit, and/or a sequence of LEDs, OLEDs, LCD screens or e-ink displays. Control of the corresponding device, whether it be a battery, LED, speaker, e-ink display, or other device, can be accomplished using multiple isolated resonant circuits in the manner described in Part VI below. Alternatively, control of the corresponding loads can be accomplished with only a single secondary coil in combination with one or more microcontroller-controlled switches to divert power among different loads.

Referring again to FIGS. 45-46, the power supply 632 can control at least one aspect of a product or product packaging. For example, in a first state, each package, shown as a cereal box, can include an e-ink graphic. In FIG. 45, the e-ink graphic is proportionally sized to be coextensive with the forward surface of each cereal box. Thus, the graphic is repeated five times, or once for each leading box of cereal. As shown in FIG. 46, however, the e-ink graphic for each box of cereal can change in response to the power supply 632. For example, the display surface for a cereal box can each include only a portion of the original graphic, such that the entire graphic is proportioned to fit just entirely over the display surface on five boxes of cereal. In addition to resizing, the graphics can animate or illuminate, including the entire graphic or only portions thereof. In this manner, packaging graphics can be changed while the product remains on the display surface, the graphics optionally being uploaded using the contactless power supply. In addition, the e-ink graphics can be used to automatically reconfigure product packaging or signage to correspond to a sale or a season, or can automatically reconfigure product packaging or signage based on any number of other possible factors. The present embodiment is suitable to generate a visual output to promote or otherwise draw attention to a package or packages at the point of sale, optionally in conjunction with the printed speaker circuit, identification circuit, and other embodiments discussed more fully in Part VI below.

To reiterate, the product alignment system 600 can include a shelving unit 606 to slideably support a plurality of packages 620, 622, a product pusher 616 supported by the shelving unit and adapted to urge the plurality of packages 620, 622 toward a forward portion of the shelving unit 606, and a primary coil 624 supported by the forward portion of the shelving unit 606 to generate a time varying electromagnetic field. The primary coil 624 can define a central axis generally perpendicular to the shelving unit upper surface. A guide plate 618 can bias the plurality of packages 620, 622 toward an upward extending lip 614 in the forward portion of the shelving unit. Each of the packages can also define a base for supporting a secondary coil 624 electrically connected to a load. A corresponding method for controlling a product alignment system can include providing a shelf including a primary coil 624, 626, providing a product supported by the shelf and having a secondary coil connected to a load, aligning the secondary coil to overlie the primary coil, and driving the primary coil with a time varying current to provide a source of wireless power to the load. As noted above, the load can include one of an LED, an e-ink display, an LCD display, an electroluminescent display, an electrostatic speaker or a battery, for example. The method can further include driving the primary coil with an operating frequency that corresponds to the resonant frequency of the secondary coil.

VI. Inductive Product and Product Packaging Systems

According to another aspect of the invention, a system for providing a source of wireless power to one or more loads associated with product packaging is provided. The system can include a product container having a secondary tank circuit directly or indirectly coupled to one or more visual elements, speaker elements or both.

Figure 47:
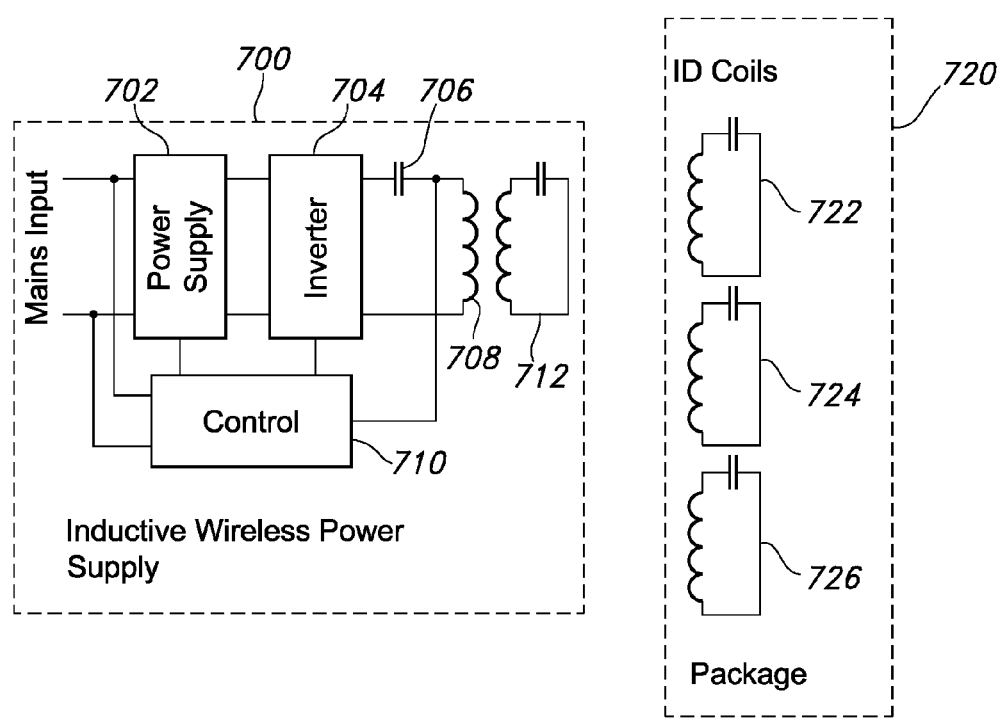
FIG. 47 is a circuit diagram of a point of sale display system.

Referring now to FIG. 47, the system includes a contactless power supply 700 associated with a display surface to actively respond to a secondary circuit associated with a nearby product and/or product packaging 720. As explained above in connection with the inductive heating system disclosed in Parts III-IV, the contactless power supply 700 is operable to identify the package 720 and/or its contents through passive inductive communication. Upon identification and authentication, the contactless power supply 700 can provide power to the package 720 according to a predetermined profile. Alternatively, upon identification and authentication, the contactless power supply 700 can switch from a passive communications mode to an active communications mode where it provides power according to a data signal sent by the secondary circuit within the product or product container 720. Where described in connection with a product, the present invention can also be utilized in connection with its packaging. Similarly, where described below in connection with packaging, the present invention can be utilized in connection with the product itself.

Referring again to FIG. 47, the contactless power supply 700 includes a power supply 702, an inverter 704 electrically coupled to the output of the power supply 702, and a tank circuit including a series capacitor 706 and primary coil 708. In addition, a controller 710 is electrically connected to a mains input, the power supply 702, the inverter 704, and tank circuit for controlling a characteristic of the power applied to the primary coil 708. In one embodiment, the controller 710 selectively controls the frequency at which power is generated in the primary coil 708. In other embodiments, the controller selectively controls the phase, amplitude, duty cycle, pulse width and/or other characteristic of the time-varying current in the primary coil. In operation, the contactless power supply 700 applies power to the primary coil 708 at an identification frequency and then evaluates the reflected impedance in the primary tank circuit using a current sensor or a voltage sensor, for example. If the product container 720 has a resonant frequency at the operating frequency, the contactless power supply 700 can recover operating parameters from memory to provide power to the product container 720 according to a predetermined profile. In addition, the contactless power supply 700 can optionally include an isolated re-resonator coil 712 that acts to shape, focus, redistribute or boost the inductive field strength when inductively coupled with the product container 720 in order to increase the spatial freedom for alignment of the product container 720 and the contactless power supply 700.

As also shown in FIG. 47, the product container 720 includes three isolated resonant circuits 722, 724, 726. As described above, the contactless power supply 700 determines the identity of the product container 720 by sweeping through a predetermined range of operating frequencies while monitoring the current in the primary coil 708. When the current in the primary coil 708 passes a threshold value, or achieves a local maxima or other criteria, the controller 710 is able to record the frequency at which the event occurred. By sweeping through a range of frequencies, the contactless power supply 702 is able to determine and record the resonant frequencies of each of the isolated resonant circuits 722, 724, 726. The presence or absence of a resonant frequency may be considered data bits. The controller 710 is then able to translate those frequencies into a unique device or package identification code. The identification code may be binary or a series of selections within the predefined resonant identifier placeholders. The contactless power supply 700 then utilizes the identification code to provide power to the container 720 according to the specific needs of the container 720 and the contents therein. For example, power applied by the contactless power supply 700 can be utilized to illuminate one or more LEDs, LCD displays, or e-ink displays on the product or package exterior, in which case a fixed power output can be applied. A microprocessor for controlling the display, sound and other functions may also be included in the packaging. Alternatively, power applied by the contactless power supply 700 can be utilized to charge a rechargeable battery or capacitor contained within the product. In this case, the contactless power supply 700 can provide a variable amount of power based on the resonant frequency or the reflected impedance of a secondary circuit associated with the product or product package 720. In this example, power is used to top-off the rechargeable battery prior to removal of the item from the point of sale display. In still another example, the point of sale display may include a package containing an electronic device such as a music player or a hand-held global position system device. These types of devices can be recharged according to specific power needs and can receive data from the contactless power supply 700. For example, the latest operating system can be inductively uploaded to the device while still within its packing or on the point of sale display. Alternatively, the contactless power supply 700 can upload other forms of media, including songs, photos, games, videos or maps.

Figure 48:
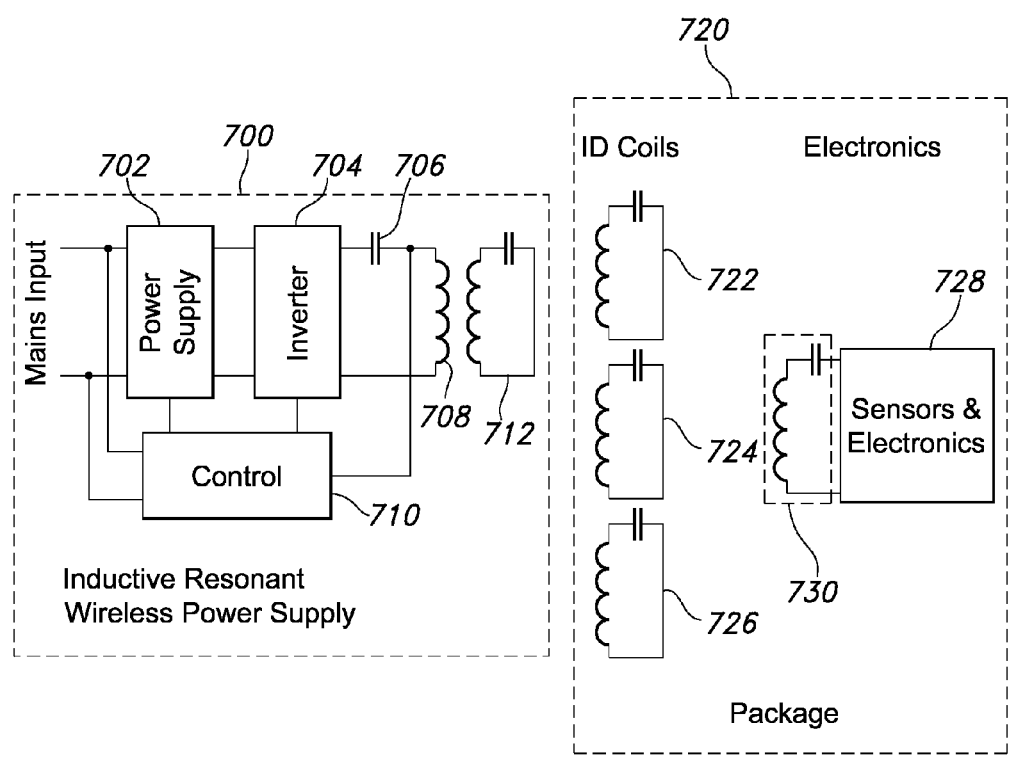
FIG. 48 is a diagram of the point of sale display system of FIG. 47 including a sensor and electronics circuit.
Figure 49:
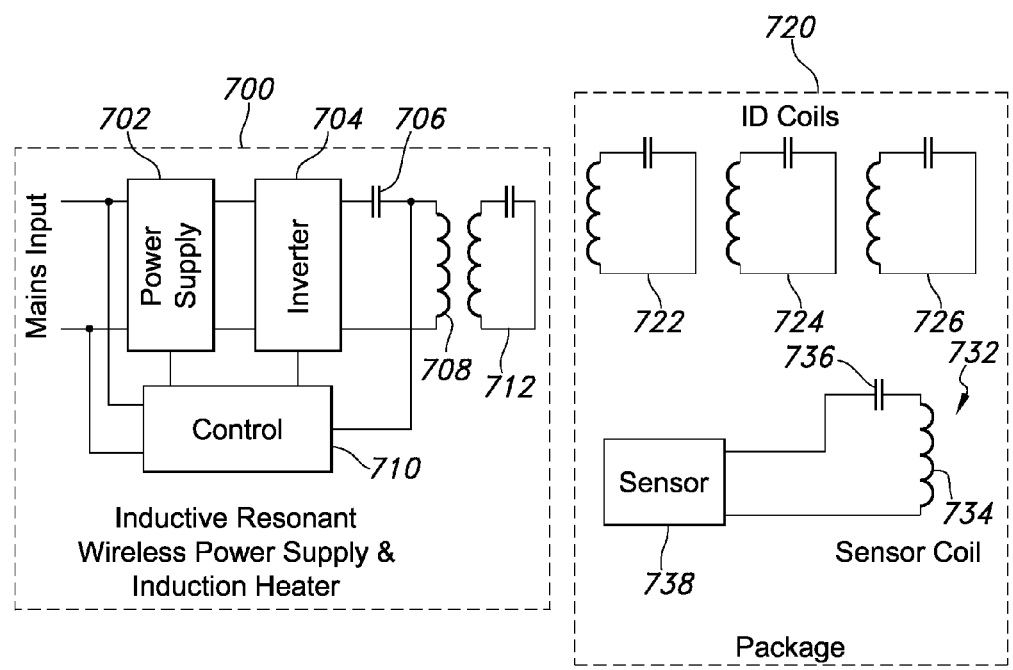
FIG. 49 is a diagram of the point of sale display system of FIG. 47 including a sensor circuit.

In another embodiment as shown in FIG. 48, the product or product packaging 720 includes three isolated resonant circuits 722, 724, 726, a secondary tank circuit 730 and an active electronics load 728. In this embodiment, the contactless power supply 700 identifies the product according to the reflected impedance of the isolated resonant circuits 722, 724, 726 substantially as described above in connection with FIG. 47. The contactless power supply 700 then uses the corresponding identification code to provide power to the active electronic load 728 in the product or product package 720 at rates appropriate for the product or product package 720. As alternatively shown in FIG. 49, the product or product packaging 720 includes a sensor circuit 732. In this embodiment, the sensor circuit 732 includes a secondary coil 734, a series capacitor 736, and a sensor 738 including a variable impedance element. In operation, a variation in the sensor output results in a change in the impedance of the sensor circuit 732. The contactless power supply 700 is operable to detect a change in the reflected impedance of the sensor circuit 732, and is further operable to adjust the power output. As also shown in FIG. 49, the contactless power supply 700 can include an isolated re-resonator circuit 712, for example an LC circuit, that acts to shape, focus, redistribute or boost the inductive field strength when inductively coupled with the package 720 in order to increase the spatial freedom for alignment of the package 720 and contactless power supply 700.

Figure 50:
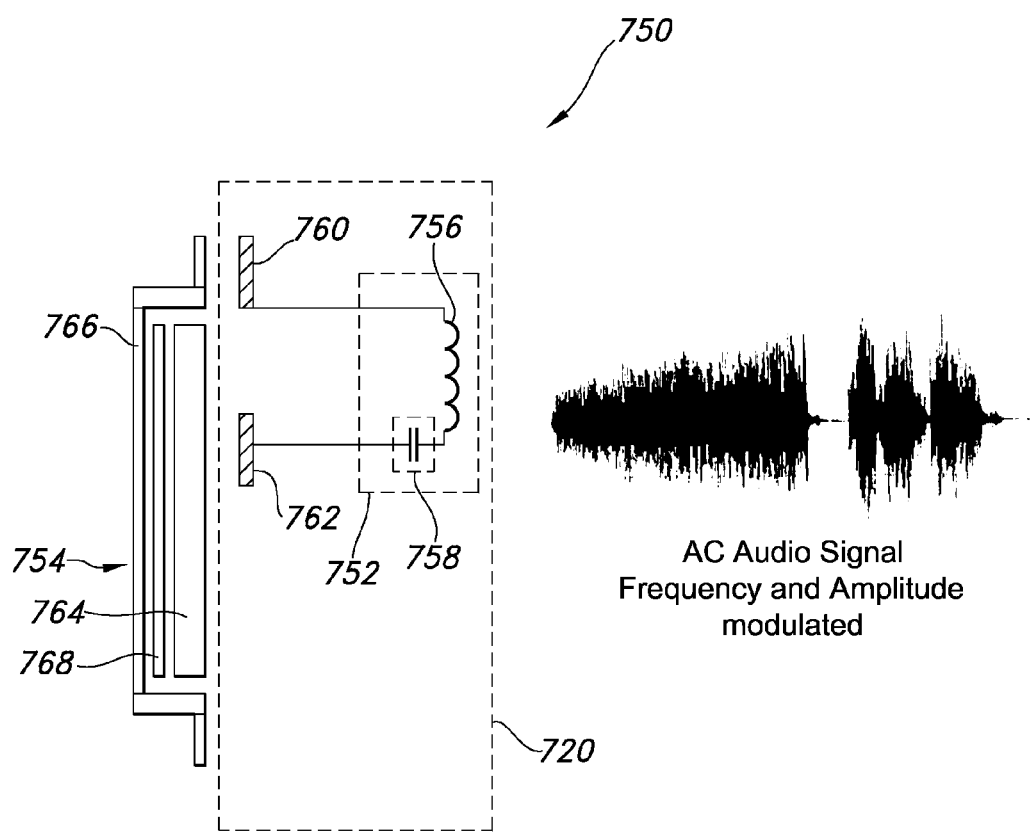
FIG. 50 is a schematic view of a printed speaker circuit.

In another embodiment, the product or product container can include a printed speaker circuit 750 including a low-profile electrostatic speaker drivable by the contactless power supply 700. Referring now to FIG. 50, the printed speaker circuit 750 includes a secondary tank circuit 752 and an electrostatic speaker 754 electrically connected to the secondary tank circuit 752. The secondary tank circuit 752 includes an inductive element 756 and a series resonant capacitor 758. The inductive element 756 can include printed trace winding, and the series resonant capacitor 758 can be selected such that the secondary tank circuit 752 includes a resonant frequency corresponding to the driving or operating frequency of a contactless power supply 700. The secondary tank circuit 750 can be formed on a flexible, non-conducting substrate applied to an exterior surface of a product 720, optionally using a pressure sensitive adhesive. The secondary tank circuit 752 can further include first and second electrical contacts 760, 762, optionally in direct electrical contact with portions of the electrostatic speaker 754.

The electrostatic speaker 754 includes a supportive conductive plate 764, a thin conductive membrane 766 spaced apart from the supportive conductive plate 764, and an insulator 768 disposed therebetween. The supportive conductive plate 764 is an electrically conductive stationary member connectable to the first electrical contact 760 of the secondary tank circuit 752. The thin conductive membrane 766 is a flexible membrane having a conductive coating suitable to hold an electrostatic charge. The thin conductive membrane 766 is electrically connected to a second electrical contact 762 of the secondary tank circuit 752. As also shown in FIG. 50, the insulator 768 separates the supportive conductive plate 764 from the spaced apart conductive membrane 766, and is coextensive with the supportive conductive plate 764.

In operation, a contactless power supply induces a frequency and/or amplitude modulated waveform in the secondary tank circuit 752 to drive the electrostatic speaker 754. The waveform, applied across the first and second electrical contacts 760, 762 as a time varying voltage, drives the supportive conductive plate 764, which variably attracts or repels the charged membrane 766, causing the membrane 766 to move toward or away from the supportive conductive plate 764. Movement of the conductive membrane 766 generates a sound according to the frequency and/or amplitude modulated waveform. Optionally, the speaker can include a second supportive conductive plate spaced apart from the thin conductive membrane 766 opposite the first supportive conductive plate 764 and electrically coupled to the second electrical contact 762. In addition, an energy storage device such as a battery or a capacitor can be electrically connected between the secondary tank circuit 752 and the speaker 754, the battery or capacitor being operable to power a drive circuit (not shown) for the speaker 754.

In use, the speaker circuit 754 can be positioned in any location on or within a corresponding package suitable to receive wireless power from a contactless power supply. The contactless power supply can be associated with a point of sale display substantially as described in Part V above. In this example, the contactless power supply induces the AC audio signal in the secondary tank circuit 752 when the package 720 is at the forwardmost portion of the display. As a result, the speaker 752 generates an audible output to promote or otherwise draw attention to the package 720 at the point of sale.

Figure 51:
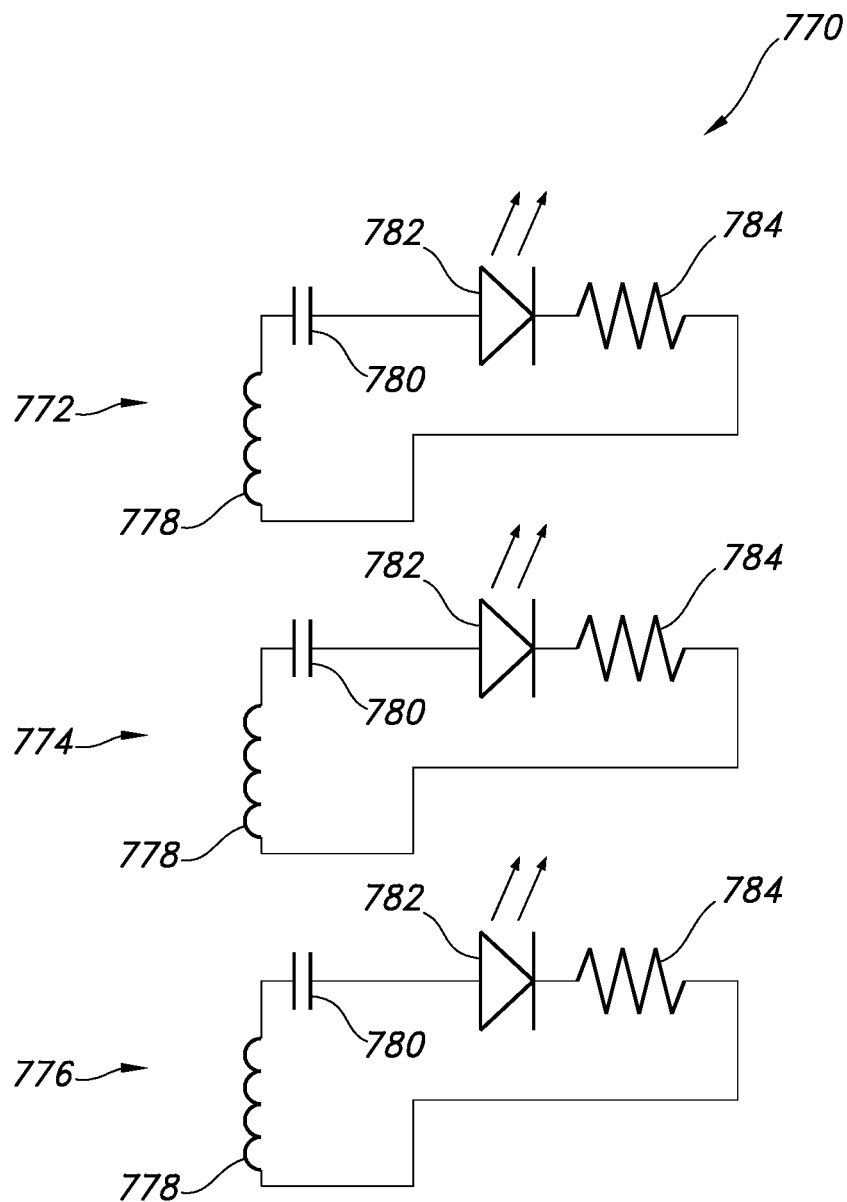
FIG. 51 is a schematic view of a multi-coil, multi-frequency tuned circuit.
Figure 52:
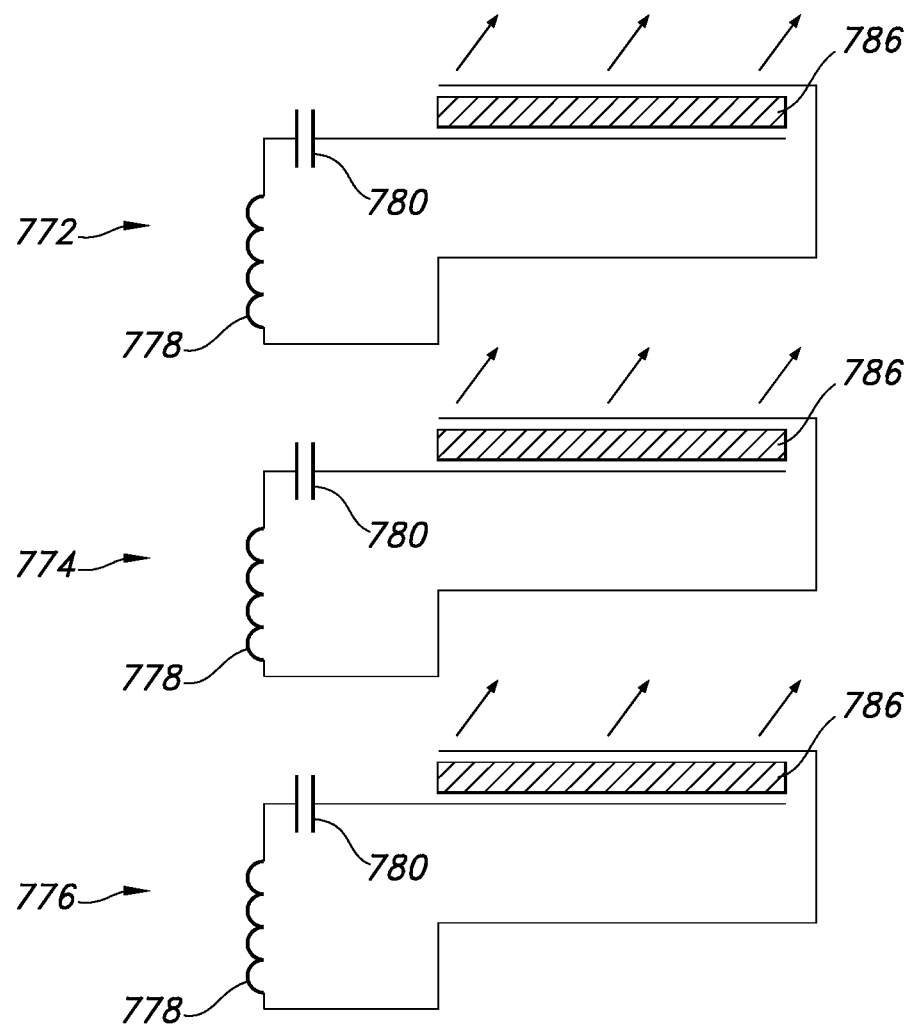
FIG. 52 is a schematic view of the multi-coil, multi-frequency tuned circuit of FIG. 51 including an LCD output.

In another embodiment, the product or product container 720 can include a multi-coil, multi-frequency tuned circuit as shown in FIGS. 51-52 and generally designated 770. The tuned circuit 770 includes multiple printed circuits each being tuned to resonate at a corresponding operating frequency. The tuned circuit 770 can be used to illuminate a sequence of LEDs associated with a product, product packaging or a point of sale display.

Referring now to FIG. 51, the three-coil three-frequency tuned circuit 770 includes first, second and third printed circuits 772, 774, 776. Each printed circuit includes an inductive element 778, a series resonant capacitor 780, an LED 782 and a series resistive load 784. The inductive element 778 can include a printed trace winding or windings substantially as described above. The series resonant capacitor 780 can be selected such that each printed circuit 772, 774, 776 includes a resonant frequency corresponding to a driving or operating frequency of a contactless power supply. The resonant frequency of each printed circuit can differ from each other, for example, to allow sequential illumination of each LED 782 as the contactless power supply operating frequency varies. Though described as including an LED, each printed circuit can alternatively include an electroluminescent display, an e-ink display, an LCD display 786, or any other suitable display. The three-coil three-frequency tuned circuit 770 can be formed on a flexible, non-conducting substrate applied to an exterior surface of a product using an adherent, for example a pressure sensitive adhesive.

Figure 53:
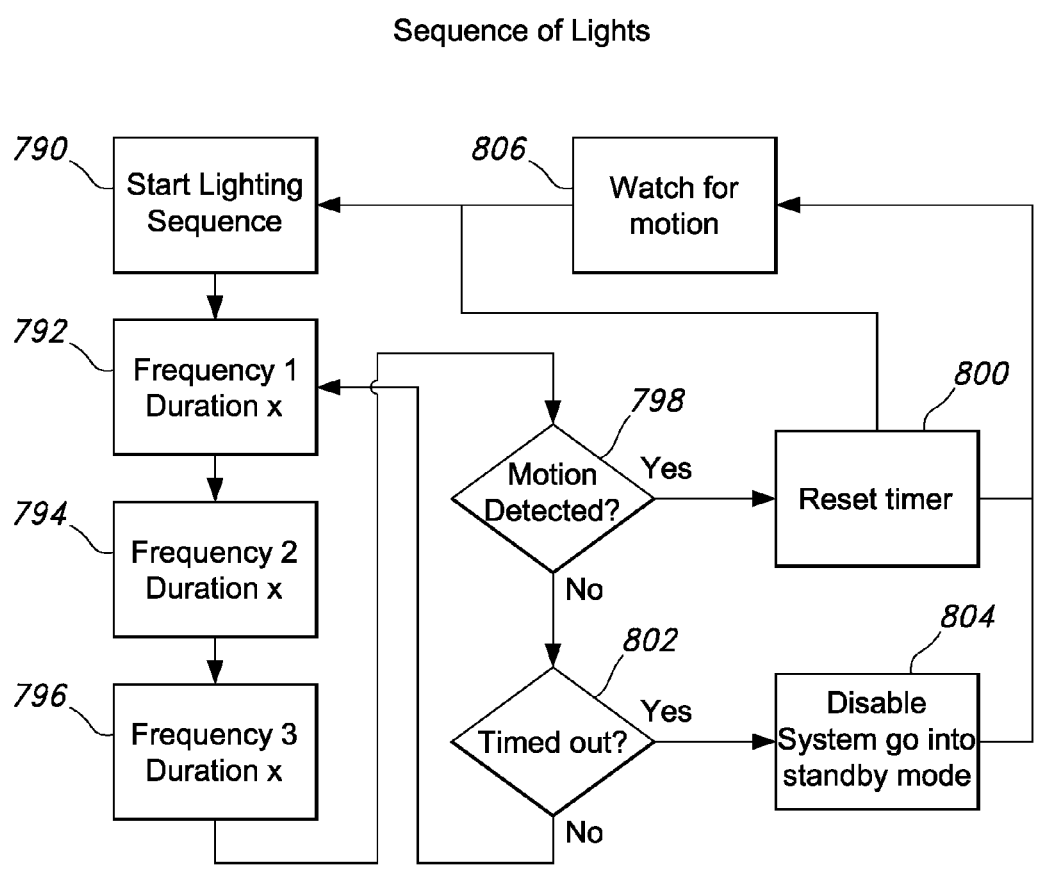
FIG. 53 is a flow diagram illustrating operation of a contactless power supply for the multi-coil multi-frequency tuned circuit of FIGS. 51-52.

FIG. 53 includes a flow chart illustrating the operation of a contactless power supply 700 in connection with the multi-coil multi-frequency tuned circuit 770 of FIGS. 51-52. The sequence commences at step 790, and at step 792 the contactless power supply 700 drives a primary tank circuit at a first operating frequency and for a first duration. At step 794, the contactless power supply drives the primary tank circuit at a second operating frequency and for a second duration. At step 796, the contactless power supply drives the primary tank circuit at a third operating frequency and for a third duration. It should be noted that while the respective first, second and third operating frequencies will normally differ from one another, the first, second and third durations may remain substantially identical to each other (represented in FIG. 53 as "x"). In addition, the first, second and third operating frequencies will normally correspond to the resonant frequencies of the first, second and third printed circuits 772, 774, 776. At the respective resonant frequencies, the corresponding LED will illuminate in response to a resulting increase in power transfer between the contactless power supply and the corresponding printed circuit 772, 774, 776.

Returning again to FIG. 53, at decision step 798 the contactless power supply determines whether motion is detected proximate the product, optionally using passive infrared motion sensors or other suitable device. If at step 798 motion is detected, the sequence proceeds to step 800 and a timer is reset, and steps 790, 792, 794 and 796 are repeated. If, however, at step 798 motion is not detected, the contactless power supply determines at step 802 if the timer has expired. If the timer has not expired, the contactless power supply repeats steps 792, 794 and 796 to illuminate the first, second and third LEDs. If, however, the timer has in fact expired and no further motion is detected, the contactless power supply will enter a standby mode at step 804 and monitor for motion at step 806. If motion is detected at step 806, the sequence will repeat itself at step 790.

While the multi-coil multi-frequency tuned circuit is described above as relating to LEDs, the multi-coil multi-frequency tuned circuit can alternatively relate to LCDs, electroluminescent display, e-ink displays or other suitable displays. In addition, the inherent resistance of each inductive element 778 can eliminate the need for a resister in the printed circuit 772, 774, 776, while the selection or tuning of the inductive element can likewise eliminate the need for a tuning capacitor 780. At the point of sale, the LEDs generate a visual output to promote or otherwise draw attention to a package or packages, optionally in conjunction with the printed speaker circuit or other embodiments as disclosed herein.

Figure 54:
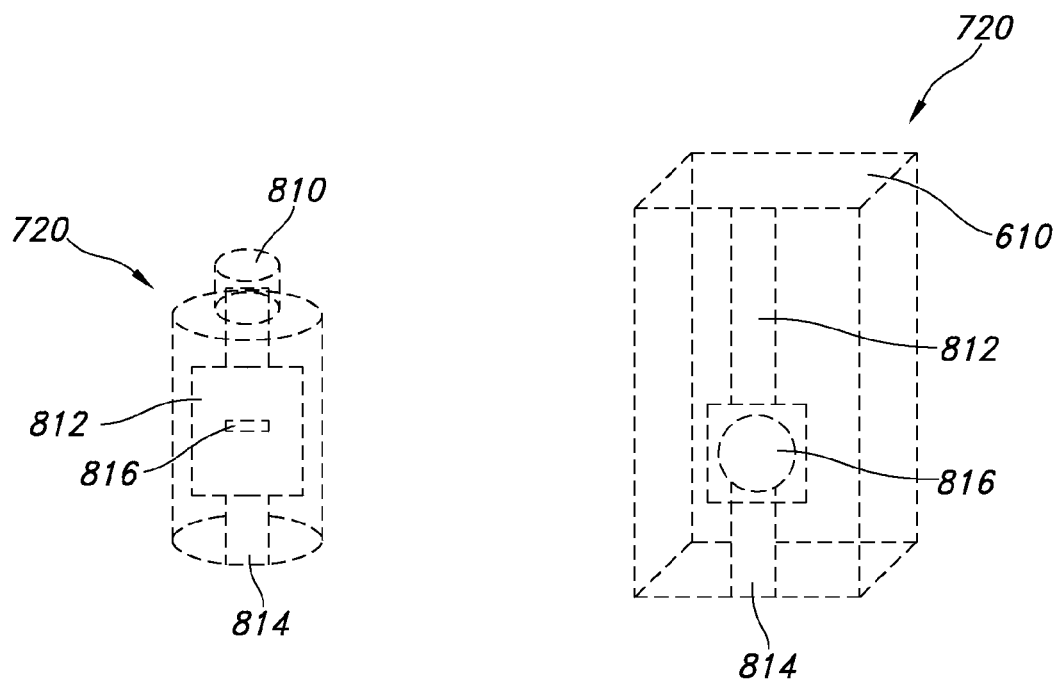
FIG. 54 is a perspective view of a point of sale system including multiple sensors.

In another embodiment as shown in FIG. 54, the product container 720 includes a cap or lid 810, wherein removal of the cap or lid 810 is detected by a contactless power supply 700 positioned within a display surface. In this embodiment, the product container 720 includes a series resonant circuit formed of conductive ink on a non-conducting substrate 812, where the substrate extends across a portion of the cap or lid 810 and a portion of the product container 720. The series resonant circuit includes a resistive element and a switch, where the switch is operable to short the resistive element when closed. The cap or lid 810, once removed from the product container 720, opens the switch. The resulting change in impedance of the series resonant circuit is detected by the contactless power supply 700 to indicate removal of the cap or lid from the product container 720. In addition, multiple series resonant circuits may be combined in a single product container 720. For example, product container 720 can include first and second pressure sensors 814, 816 in addition to the perforated tab as described above. In this example as shown in FIG. 54, a first pressure sensor 814 is located at the base of the product container 720 to indicate depletion of the product container contents, and a second pressure sensor 816 is located on the surface of the product container 720 in a location that is intended to be gripped by a user. Actuation of the pressure sensors 814, 816 operate to vary the impedance of one or more series resonant circuits, which is detected by the contactless power supply 700 substantially as set forth above.

Figure 55:
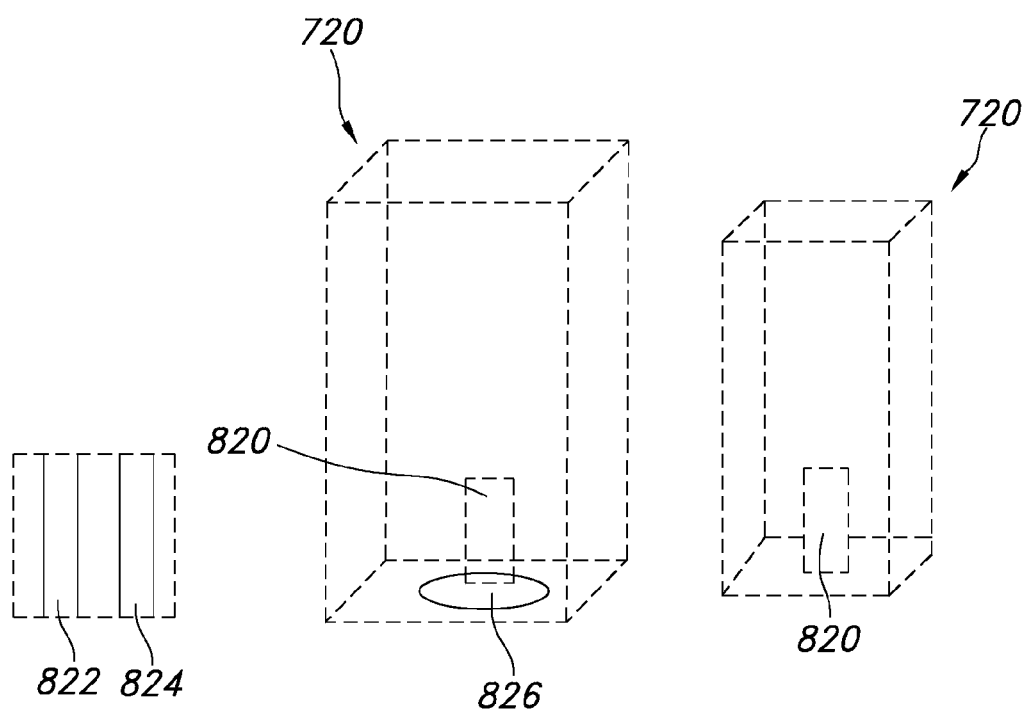
FIG. 55 is a perspective view of a product or product container including printed conductive contacts.
Figure 56:
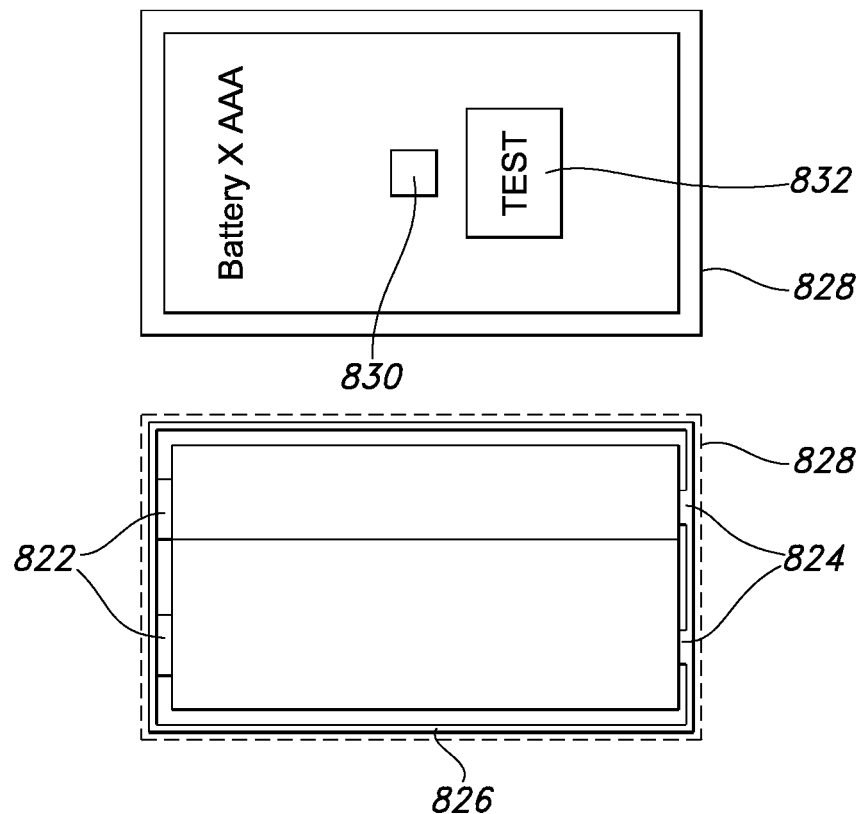
FIG. 56 is a first diagram of the battery container of FIG. 55.
Figure 57:
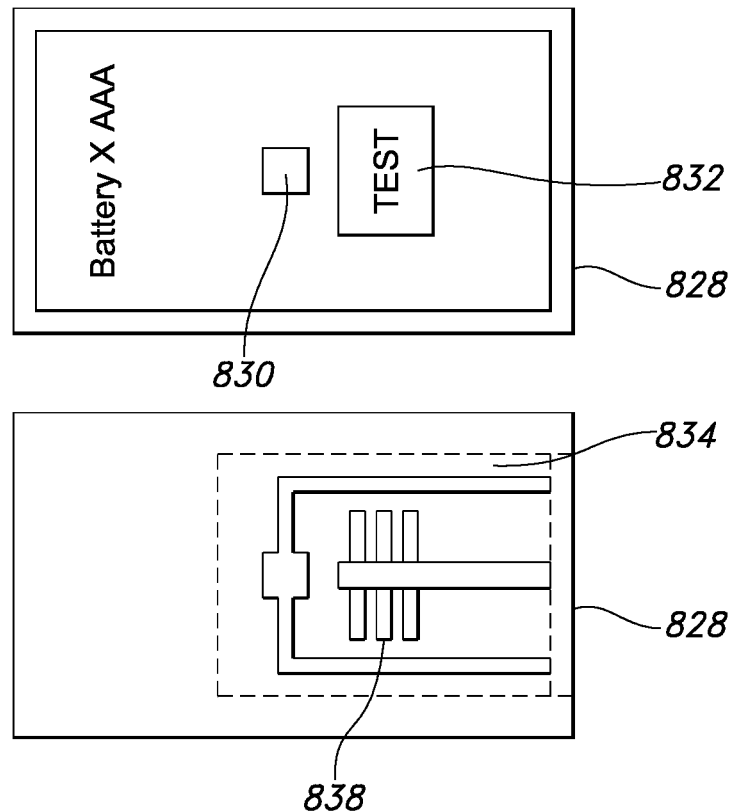
FIG. 57 is a second diagram of the battery container of FIG. 55.

In another embodiment as shown in FIGS. 55-57, the product container 720 contains a paperboard tab 820 including first and second conductive contacts 822, 824 and a secondary coil 826 whose output is conditioned before being provided to the first and second conductive contacts 822, 824. As shown in FIGS. 56-57, the conductive contacts 822, 824 can be arranged within a battery container 828 such that a rechargeable battery can be positioned between the first and second conductive contacts 822, 824. In this respect, the contactless power supply 700 is operable to recharge a battery contained within a product or product packaging 720 prior to its removal from the point of sale display. As shown in FIGS. 56-57, the product container 720 can include a pressure sensitive switch 832 within an over-label 834 which actuates a battery test circuit when pressed. An LED 832 or other suitable low-power visual, audible, or haptic feedback element may be employed to indicate the battery charge status when the pressure switch 832 is depressed. Once the over-label 834 is depressed by a user, a conductive trace 838 printed on the underside of the over-label 834 closes the battery test circuit, which then illuminates the LED 830 on the package exterior. Accordingly, the point of sale display system provides power to recharge the battery contained within a product or product container, and also provides a visual indication to the user of the charge status of the corresponding internal battery.

Figure 58:
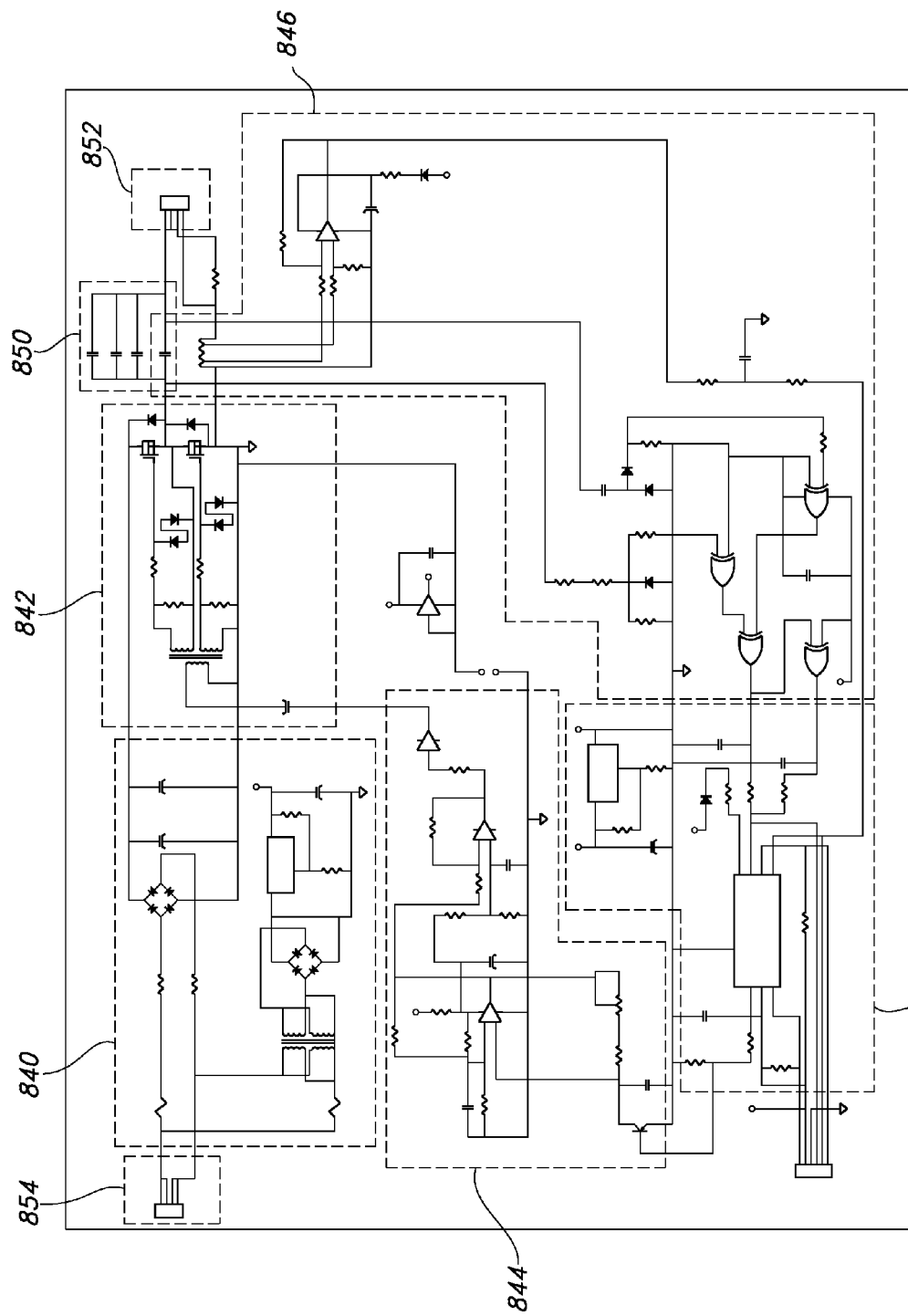
FIG. 58 is a circuit diagram of a microcontroller-controlled contactless power supply.

Another embodiment of the contactless power supply 700 for supplying power to a product or product container 720 is shown in FIG. 58. The contactless power supply 700 may include a power supply 840, inverter 842, inverter driver 844, sensors 846, and controller 848. Further, the inverter 842 and sensors 846 may be connected to a resonant capacitor 850 and a primary coil connector 852. The primary coil connector 852 may be connected to a primary coil (not shown). The resonant capacitor 850 and primary coil may form a tank circuit similar to the resonant capacitor 706 and primary coil 708 described above with regard to FIG. 47. The inverter 842 may provide an output signal for driving the resonant capacitor 850 and primary coil for inductively coupling with a remote device, and the inverter driver 844 may include circuitry for providing an interface between the controller 848 and the inverter 842. Accordingly, through the inverter driver 844, the controller 848 may control the output of the inverter 842 and parameters of the inductive coupling with the remote device. The controller 848 may include a processor and related interface circuitry for receiving sensor information from the sensors 846 and controlling the inverter 842. The controller 848 may control the output of the inverter 842 based on the sensor information received from the sensors 846. In some embodiments, the controller 848 may also interface with external components using a connector to transmit information or send control signals. In the current embodiment, the sensors 846 may include current sensor circuitry and voltage sensor circuitry for measuring characteristics of the inverter 842 output, resonant capacitor 850, and primary coil 852. For example, the sensors 846 may measure the current through the primary coil 852. In another example, the sensors 846 may indicate the phase difference between (1) the voltage output from the inverter 842 and (2) the voltage between the resonant capacitor 850 and the primary coil 852. The power supply 840 of the current embodiment may receive power from the mains input 854 and supply power to the contactless power supply 700. The controller 848, inverter driver 844, inverter 842, and sensors 846 may each receive suitable power from the power supply 840. For example, the controller 848 may receive substantially 5 VDC and the inverter 842 may receive another voltage for transferring power to a remote device. An additional example of a low voltage distribution system is disclosed in U.S. application Ser. No. 12/791,560, entitled "Wireless Power Distribution and Control System" filed Jun. 1, 2010 by Baarman, now U.S. Pat. No. 8,618,770, the disclosure of which is incorporated by reference in its entirety.

In the above embodiments, the electronic circuitry may be constructed on printed circuit board material using discrete components or chips. Alternatively, the circuitry may be constructed from conductive ink printed on a paper, plastic or other suitable substrate. In addition, resistive, capacitive and inductive components may also be printed on the substrate so that conventional discrete components are reduced or entirely eliminated from the circuit.

VII. Product and Product Package Identification

According to a seventh aspect of the invention, systems and methods for the wireless identifications of one or more products are provided.

Figure 59:
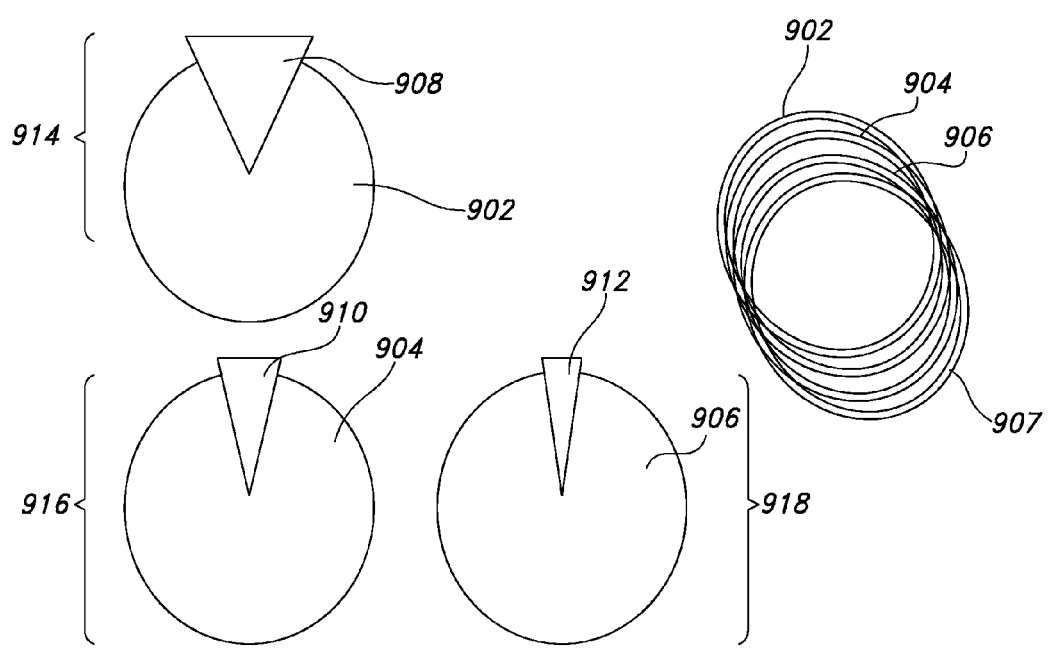
FIG. 59 are schematic views of a multi-winding shielded identification circuit.

In one embodiment, a multi-winding shielded identification circuit is illustrated in FIG. 59 and generally designated 900. As disclosed below, the multi-winding shielded identification circuit 900 is operable to identify and/or authenticate a product or product container when used in combination with a contactless power supply optionally associated with a point of sale display. Upon identification and authentication, the contactless power supply can provide power to the product or product container according to a predetermined profile. Alternatively, the contactless power supply can switch from a passive communications mode to an active communications mode where it provides power according to a data signal sent by the multi-winding shielded identification circuit 900.

Referring now to FIG. 59, the multi-winding shielded identification circuit 900 includes first, second and third identification windings 902, 904, 906 and corresponding first, second and third printed shielding 908, 910, 912. The identification windings 902, 904, 906 can be generally co-planar and formed on a non-conducting substrate in side-by-side orientation. Alternatively, the windings 902, 904, 906 can be formed on a non-conductive substrate in overlapping alignment. In the above orientations, the first printed shielding 908 partially encompasses the first printed or trace winding 902, and the second and third printed shieldings 910, 912 partially encompass the second and third trace windings 904, 906, respectively. The printed shieldings 908, 910, 912 vary in at least one characteristic among each other. For example, the first printed shielding 908 can encompass a first surface area of the first trace winding 902, the second printed shielding 910 can encompass a second surface area of the second trace winding 904, and the third printed shielding 912 can encompass a third surface area of the third trace winding 906, where the first, second and third surface areas are successively smaller. In this regard, each winding and shielding combination 914, 916, 918 will generate a distinct reflected impedance when subject to a given magnetic flux, particularly where the windings, shieldings and coupling coefficients are otherwise identical. In other words, each printed shielding 908, 910, 912 limits the electromagnetic exposure of the corresponding windings 902, 904, 906 to varying degrees, thereby bringing out the individual response in each pairing. The printed shielding layers 908, 910, 912 can optionally be formed of any suitable material, including for example an ELECTRODAG® dielectric ink by Henkel Corporation of Irving, Calif. The printed shielding layers can create a limited field exposure window for each corresponding winding 902, 904, 906 to effectively decouple each winding 902, 904, 906. As a result, the printed shielding layers can enhance identification patter of each of winding, even among secondary windings having similar or identical resonant frequencies.

As noted above, the multi-winding shielded identification circuit 900 can be used in combination with a contactless power supply to identify and/or authenticate a corresponding product or product package. For example, the contactless power supply can determine the identity of the product or product container by sweeping through a predetermined range of frequencies while monitoring the reflected impedance of the multi-winding shielded identification circuit 900. That is, the isolated winding-shielding pairings 914, 916, 918 in the identification circuit 900 react differently to the contactless power supply depending on the operating or driving frequency of the contactless power supply primary tank circuit. As a result, the isolated winding-shielding pairings can cause variations in the current or voltage in the primary tank circuit across the range of operating frequencies. For example, the isolated winding-shielding pairings can cause variations in the peak voltage or current through the primary tank circuit. When the voltage or current in the primary tank circuit passes a threshold value, a controller in the contactless power supply is able to record the frequency at which the event occurred. By sweeping through a range of frequencies, the contactless power supply is able to determine and record the resonant frequencies of each of the isolated winding-shielding pairings. The controller can then translate those frequencies into a unique device or package identification code. The contactless power supply can utilize the identification code associated with the multi-winding shielded identification circuit 900 to provide power to the product and/or product package according to the specific needs of the product and/or product package. For example, power applied by a contactless power supply can be utilized to illuminate one or more LEDs, LCD displays, or e-ink displays on the product or package exterior, in which case a fixed power output can be applied. A microprocessor for controlling the display, sound and other functions may also be included in the product packaging. Alternatively, power applied by a contactless power supply can be utilized to charge a rechargeable battery or capacitor contained within the product. In this case, the contactless power supply can provide a variable amount of power based on the reflected impedance of the multi-winding shielded identification circuit 900 associated with the product or product package. In this example, power is used to top-off the rechargeable battery prior to removal of the item from the point of sale display.

In another embodiment, a method for generating a unique identification code based on the reflected impedance of a passive identification circuit is provided. A suitable identification circuit can include any circuit having two or more resonant frequencies. For example, a suitable identification circuit can include the multi-winding shielded identification circuit 900. Alternatively, a suitable identification circuit can include any of the identification circuits disclosed in Parts I-VI and VIII.

In the identification and authentication of a product or product container, an inductive reader 102 can sweep through a range of operating frequencies. That is, an inductive reader 102 can drive a primary tank circuit at a plurality of operating frequencies while monitoring the primary tank circuit voltage, current and/or phase. For example, an inductive reader can sweep through a range of frequencies from 120 kHz to 300 kHz while monitoring the primary tank circuit voltage, current and/or phase to identify a resonant frequency of the identification circuit. This frequency range of 180 kHz can be broken into n equally spaced intervals, where n is dependent on how accurately the identification circuit is tuned. For example, n can be equal 3 to indicate three 60 kHz intervals or "bins" between 120 kHz and 300 kHz.

In the present example, each bin is represented by a binary value corresponding to the presence or absence of a resonant frequency. The resonant frequency can correspond to current or voltage in excess of a threshold value, a local current or voltage maxima or other criteria. When the inductive reader 102 identifies a resonant frequency in a given bin, the bin is represented in binary terms by a 1. When the inductive reader 102 does not identify a resonant frequency in a given bin, the bin is represented in binary terms by a 0. For an identification circuit having k number of isolated resonant circuits (and at least k number of resonant frequencies), the number of possible identification codes is represented by the following formula:

$$\frac{n!}{(n-k)!k!}$$

In this example, the identification circuit includes two isolated resonant circuits (k=2) each having a resonant frequency in one of three bins between 120 kHz and 300 kHz (n=3). According to the above formula, there are three possible identification codes: 110 (bins 1 and 2), 101 (bins 1 and 3), and 011 (bins 2 and 3). This assumes no bin will be occupied by two isolated resonant circuits, and that each isolated resonant circuit will occupy at least one bin.

In order to maximize the number of possible identification codes, each bin can be assigned a prime number according to Table 3 below. The x-axis values (2, 3, 5, . . . n) represent a prime number and the y-axis values (1, 2, 3, . . . m) represent a bin:

TABLE 3

| | \multicolumn{8}{c}{Identification Code Key} | |
|---|---|---|---|---|---|---|---|---|---|
| | 2 | 3 | 5 | 7 | 11 | 13 | 17 | 19 | . . . $n^{th}$ prime |
| 1 | $2^1$ | $3^1$ | $5^1$ | $7^1$ | $11^1$ | $13^1$ | $17^1$ | $19^1$ | $n^1$ |
| 2 | $2^2$ | $3^2$ | $5^2$ | $7^2$ | $11^2$ | $13^2$ | $17^2$ | $19^2$ | $n^2$ |
| 3 | $2^3$ | $3^3$ | $5^3$ | $7^3$ | $11^3$ | $13^3$ | $17^3$ | $19^3$ | $n^3$ |
| 4 | $2^4$ | $3^4$ | $5^4$ | $7^4$ | $11^4$ | $13^4$ | $17^4$ | $19^4$ | $n^4$ |
| 5 | $2^5$ | $3^5$ | $5^5$ | $7^5$ | $11^5$ | $13^5$ | $17^5$ | $19^5$ | $n^5$ |
| 6 | $2^6$ | $3^6$ | $5^6$ | $7^6$ | $11^6$ | $13^6$ | $17^6$ | $19^6$ | $n^6$ |
| 7 | $2^7$ | $3^7$ | $5^7$ | $7^7$ | $11^7$ | $13^7$ | $17^7$ | $19^7$ | $n^7$ |
| 8 | $2^8$ | $3^8$ | $5^8$ | $7^8$ | $11^8$ | $13^8$ | $17^8$ | $19^8$ | $n^8$ |
| 9 | $2^9$ | $3^9$ | $5^9$ | $7^9$ | $11^9$ | $13^9$ | $17^9$ | $19^9$ | $n^9$ |
| 10 | $2^{10}$ | $3^{10}$ | $5^{10}$ | $7^{10}$ | $11^{10}$ | $13^{10}$ | $17^{10}$ | $19^{10}$ | $n^{10}$ |
| . . . | | | | | | | | | |
| $m^{th}$ row | $2^m$ | $3^m$ | $5^m$ | $7^m$ | $11^m$ | $13^m$ | $17^m$ | $19^m$ | $n^m$ |

If bins 1 and 2 were determined to be filled as disclosed above, and for a key of 3-11-5, the product of each prime number raised to the corresponding bin integer is: $3^1 \times 11^2 \times 5^0 = 363$, where 363 represents the unique identifier. No other combination produces this numeric identifier because 363 has one unique prime factorization. This unique identifier can now be assigned as an identification number for a specific product. If however bins 1 and 3 were determined to be filled, and for the same key, the product of each prime number raised to the corresponding bin is: $3^1 \times 11^0 \times 5^3 = 375$, where 375 represents the unique identifier.

The unique identifier can be decomposed into the corresponding bins (a, b, c) with prior knowledge of the key (3-11-5) by the following formula: unique identifier=$3^a \times 11^b \times 5^c$. In particular, by running through each keyed prime number assigned to m bins, the numeric identification codes 363 and 375 can be factored down to each corresponding prime factorization. As a result, one can deduce or "back out" those identification circuit bins that are filled. In addition, an additional key can be assigned to an passive identification circuit 116 having the same filled bins, thus increasing the number of available identifiers. For example, a passive identification circuit 116 filling bins 1 and 2 can achieve a unique identifier of 640 with a key of 5-7-3 or a unique identifier of 44 with a key of 11-2-3. A controller 112 associated with an inductive reader 102 can then assign the unique identifier to the corresponding product and communicate the unique identifier—and optionally other information related to the product—to a central hub 168 as set forth above.

Where each isolated resonant circuit occupies only one bin, the equation for all possible numeric identification codes becomes:

$$\sum_{i=1}^{k} \frac{n!}{(n-i)!i!} \cdot m^i$$

where n represents the number of possible prime numbers, k represents the number of isolated resonant circuits, and m represents the number of possible bins.

Where each isolated resonant circuit occupies more than one bin, the below five operations provide solutions for k=1 through 5, respectively:

$$m \cdot n$$

$$\frac{n!}{(n-2)!2!} \cdot m^2 + m \cdot n$$

$$\frac{n!}{(n-3)!3!} \cdot m^3 + \left[ \frac{(n+2)!}{(n-1)!3!} - \frac{n!}{(n-3)!3!} - n \right] \cdot m^2 + m \cdot n$$

$$\frac{n!}{(n-4)!4!} \cdot m^4 +$$

$$n \cdot (n-1) \cdot m^3 + \left[ \frac{(n+3)!}{(n-1)!4!} - \frac{n!}{(n-4)!4!} - n \cdot (n-1) - n \right] \cdot m^2 + m \cdot n$$

$$\frac{n!}{(n-5)!5!} \cdot m^5 + n \cdot \frac{(n-1)!}{(n-4)!3!} \cdot m^4 +$$

-continued $$2 \cdot n \cdot \frac{(n-1)!}{(n-3)!2!} \cdot m^3 + 2 \cdot n \cdot (n-1) \cdot m^2 + m \cdot n$$

Based on the above operations, a significant number of possible combinations can be generated with a given number of bins, isolated resonant circuits, and powers of primes. For example, for an identification circuit having only two coils for five bins, there are 4,100 possible numeric combinations where n=20. The possible numeric combinations increases to 9,150 for n=30, 25,250 for n=40 and 100,500 for n=100. Also by example, with five coils (k=5), thirty bins (m=30) and thirty prime numbers (n=30), there can be 3,552,347, 286,900 possible unique product identifiers. While described as relating to numeric identification codes for products and product packaging, the method of the present embodiment can be utilized across a wide range of other applications where remote device identification by inductive coupling is desired.

To reiterate, a product identification system can include a storage device 104 for a product including a plurality of isolated resonant circuits 120, 122 and an inductive reader 102 including a primary tank circuit, the inductive reader 102 being adapted to determine the identity of the product based on the resonant frequencies of the isolated resonant circuits 120, 122. The inductive reader 102 can include a controller 112 adapted to assign a prime number and an integer to the resonant frequency of each of the plurality of isolated resonant circuits 120, 122. The controller 112, or central hub 168 for example, can then assign a unique identifier to the storage device 104 based on the product of the prime number raised to the corresponding integer for each resonant frequency, where the unique identifier defines a prime factorization. For example, a plurality of isolated resonant circuits having resonant frequencies of 130 kHz (bin 1) and 200 kHz (bin 2) can have a unique identifier of (or based on) 363 according to the formula $3^1 \times 11^2 \times 5^0$ for a key of 3-11-5.

Figure 60:
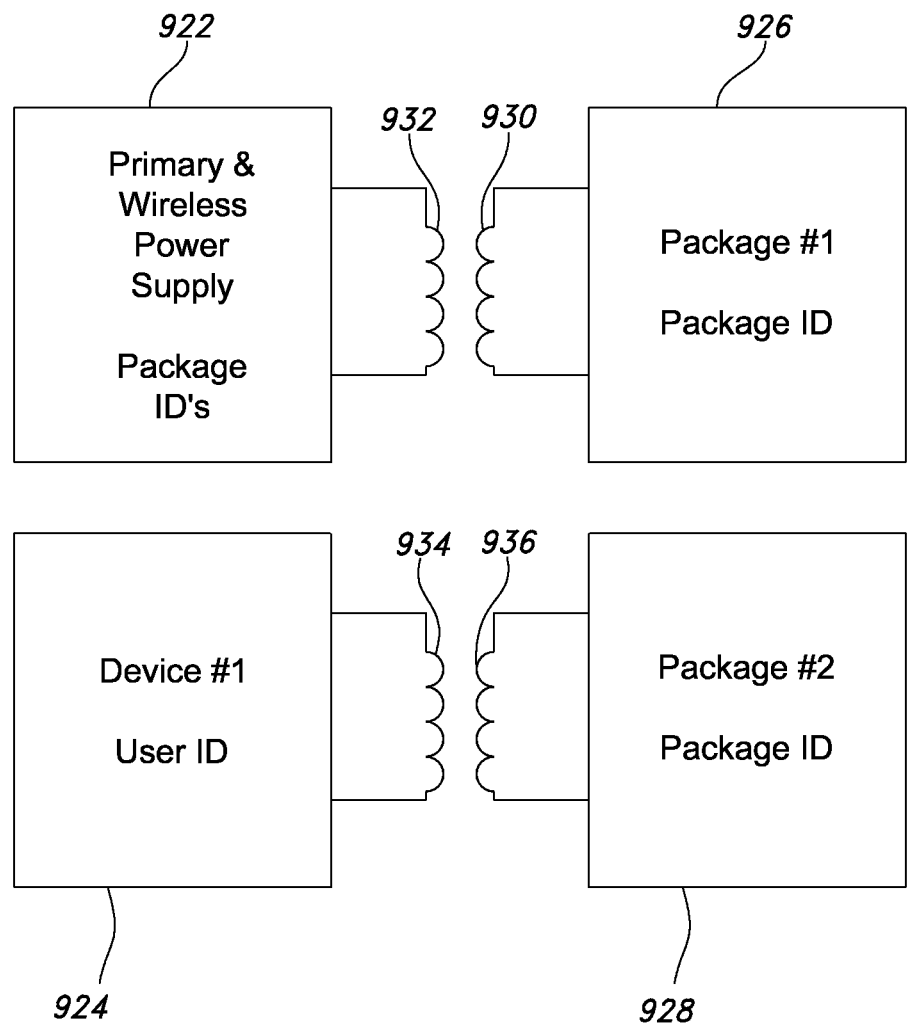
FIG. 60 is a schematic of a first device identification system.

In another embodiment, a device identification system is illustrated in FIG. 60 and generally designated 920. As disclosed below, the device identification system 920 can be used to share data between portable devices, contactless power supplies, and products or product packages. Referring now to FIG. 60, the device identification system includes a contactless power supply 922, a portable device 924 and one or more packages 926, 928. The contactless power supply 922 can include a series or parallel resonant capacitor and a controller for storing a plurality of identification profiles. The first package 926 can include a secondary tank circuit including a secondary coil 930. The secondary coil 930 can include a printed trace winding on a flexible, non-conductive substrate, which can be applied to an exterior surface of the package 926 using an adherent. The first package 926 can also include a series or parallel resonant capacitor selected to have a capacitance such that the secondary tank circuit includes a resonant frequency corresponding to a driving or operating frequency of the contactless power supply 922.

In use, the contactless power supply 922 can provide power to the first package 926, and can identify and authenticate the first package substantially as described above. In this regard, the contactless power supply 922 and the first package 926 include a wireless power and passive communication link. In like manner, the portable device 924 and a second package 928 also share a passive communication link, where the mobile device 924 is optionally operable to provide wireless power to the second package 928. In this embodiment, the portable device 924, optionally a mobile device such as a mobile phone or personal digital assistant (PDA), includes a contactless power supply having a primary coil 934. The second package 928 includes a corresponding secondary coil 936. The primary and secondary coils 934, 936 can include printed windings on a flexible, non-conductive substrate, optionally applied to the exterior of the device 924 and package 928 using an adherent. In a communications-only mode, the device 924 can identify and authenticate the package 928 in the manner described above in connection with the contactless power supply 922 and first package 926. In a communications and power mode, the device 924 can provide wireless power to the package 928 according to a predetermined profile in response to the identification and authentication of the package 928.

The portable device 924 can receive data unrelated to the identity or power needs of the package 928. For example, the portable device 924 can receive one or more virtual codes associated with the package 928, and can electronically verify the code and/or determine if the code is a winner. In this example, the code can correspond to the reflected impedance of the secondary coil 936 when closely coupled with the primary coil 934 of the portable device 924. Using an internet connection, for example, the device 924 can verify the status of the code, or redeem the code, at a host website, optionally as part of a promotional sweepstakes for the package 928. In this regard, additional information is shared between the device 924 and the package 928 that may not be part of the package identification or other information associated with wireless power transfer.

Figure 61:
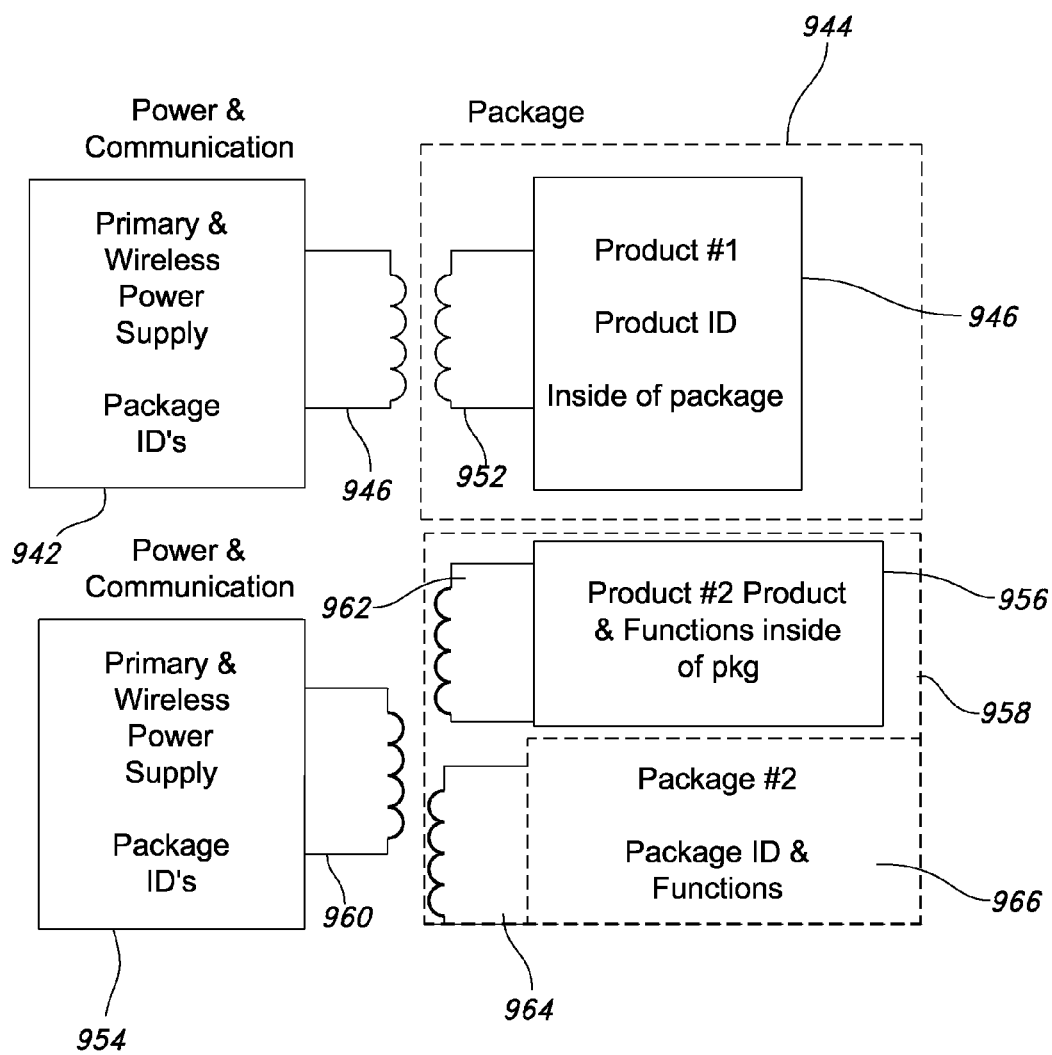
FIG. 61 is a schematic of a second device identification system.
Figure 62:
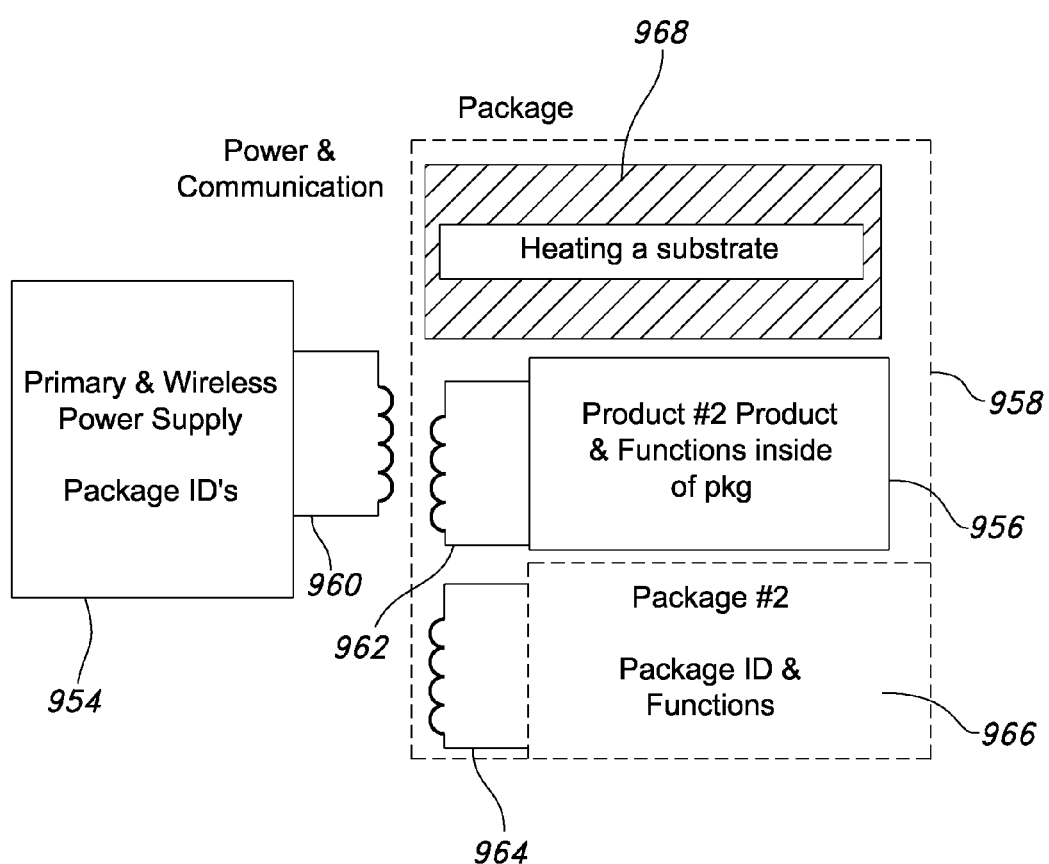
FIG. 62 is a schematic of the device identification system of FIG. 61 including a substrate for heating the contents of a package.
Figure 63:
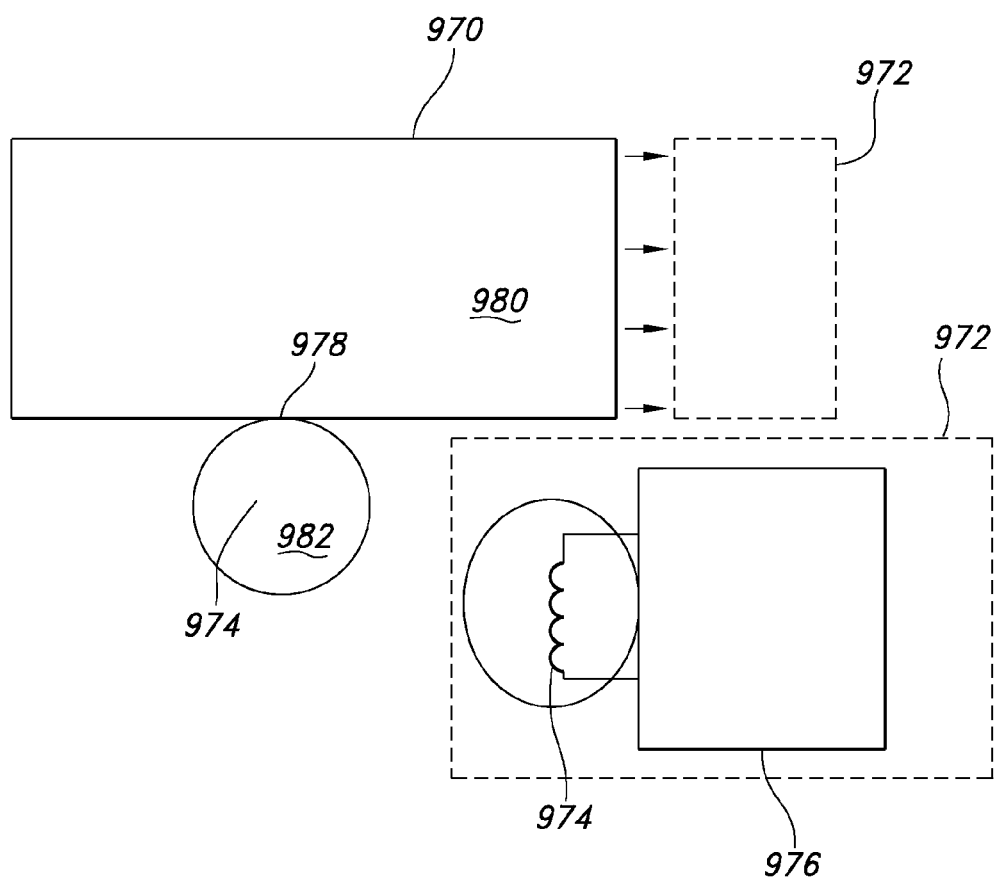
FIG. 63 is a schematic of the device identification system of FIG. 61 including printed secondary circuit.

In another embodiment, a point of sale wireless power system is illustrated in FIGS. 61-63 and generally designated 940. As disclosed below, the wireless power system 940 can be used to share power and data between a contactless power supply, products and/or product packages associated with a point of sale display.

Referring now to FIG. 61, the point of sale wireless power system 940 includes a first contactless power supply 942, a first container or package 944 and a first product 946 contained within, supported by or otherwise associated with the first package 944. The first contactless power supply 942 can include a primary tank circuit 948 and a controller 950 for storing a plurality of identification profiles, power transfer profiles, or other information. The corresponding product 946 can include a secondary tank circuit 952 contained on or within the product itself. The secondary tank circuit 952 can provide power to an internal battery contained within the product 946 to ensure the battery is sufficiently charged prior to purchase. Alternatively, or in addition, the secondary tank circuit 952 can provide power to a load associated with the product 946. For example, the load can include one or more LEDs, OLEDs, LCD displays, e-ink displays, speaker circuits, servos, transducers, actuators, motors, or other devices. In addition, the product 946 can include a demo mode, by which the product 946 generates sound, motion, animation or illumination to attract attention to the product 946, particularly when subject to a time varying electromagnetic field from the primary tank circuit 948. This can be desirable where all or a portion of the product 946 is visible through the product container 944.

As also shown in FIG. 61, the system 940 can include a second contactless power supply 954 underlying or proximate to a second product 956 contained within a second package 958. Like the first contactless power supply 942, the second contactless power supply 954 includes a primary tank circuit 960. Though not shown, the primary tank circuit 960 can include a series or parallel resonant capacitor, and the second contactless power supply 954 can include a controller for storing a plurality of identification profiles, power transfer profiles, or other information. The corresponding product 956 includes a secondary tank circuit 962 contained within the product itself to power to an internal battery and/or to directly power the product 956. In addition, the packaging 958 can include an additional secondary tank circuit 964 to provide power to a load 966. The load can include an LCD, OLED, LED, e-ink display, speaker or other device substantially as described above. The product 956 and the package 958 can each generate sound, motion, animation, illumination or other output. In this respect, the product 956 interacts with the packaging lighting, for example, and other functions to promote the product 956 at the point of sale. As optionally shown in FIG. 62, the second package 958 can further include a heating element 968. The heating element 296 can include a ferromagnetic material substantially as described above in connection with FIG. 18. For example, the heating element 968 can include a metal foil applied to a paperboard surface of the second package 958 to heat the package contents at the point of sale. The heating element 968 can be directly heated by application of a magnetic flux from the primary tank circuit 960, or can be indirectly heated using a secondary tank circuit and optional battery. The package contents can include a heated beverage, food product, lotion, serum and/or therapy ointment, for example.

Referring now to FIG. 63, the point of sale wireless power system 940 can include a printed label 970 for a package 972 at the point of sale. The printed label 970 includes a secondary coil 974 electrically connected to a load. The secondary coil 974 can include a printed trace winding, and the load can include an LCD, OLED, LED, e-ink display, speaker or other device substantially as set forth above. The load and the secondary coil 974 can be formed on a flexible, non-conductive substrate having an adhesive backing. The substrate includes a fold line 978, for example a weakened or perforated hinge, separating an upper portion of the substrate 980 from a lower portion of the substrate 982. The upper portion of the substrate 980 supports the load, and the lower portion of the substrate 982 supports the secondary coil 974. The label 970 can be sized to generally conform to at least one surface of the package 972. For example, the upper label portion 980 can be sized to conform to at least one sidewall of the package 972, while the lower label portion 982 can flex about the fold line 978 to conform to the base of the package 982. As noted above, the label 970 can include an adherent, for example a pressure sensitive adhesive, on a rear surface thereof to join the label 970 to the package 972. In use, the secondary coil 974 is placed proximate a corresponding primary coil to improve the coupling coefficient therebetween.

VIII. Printed Secondary Circuits

Figure 64:
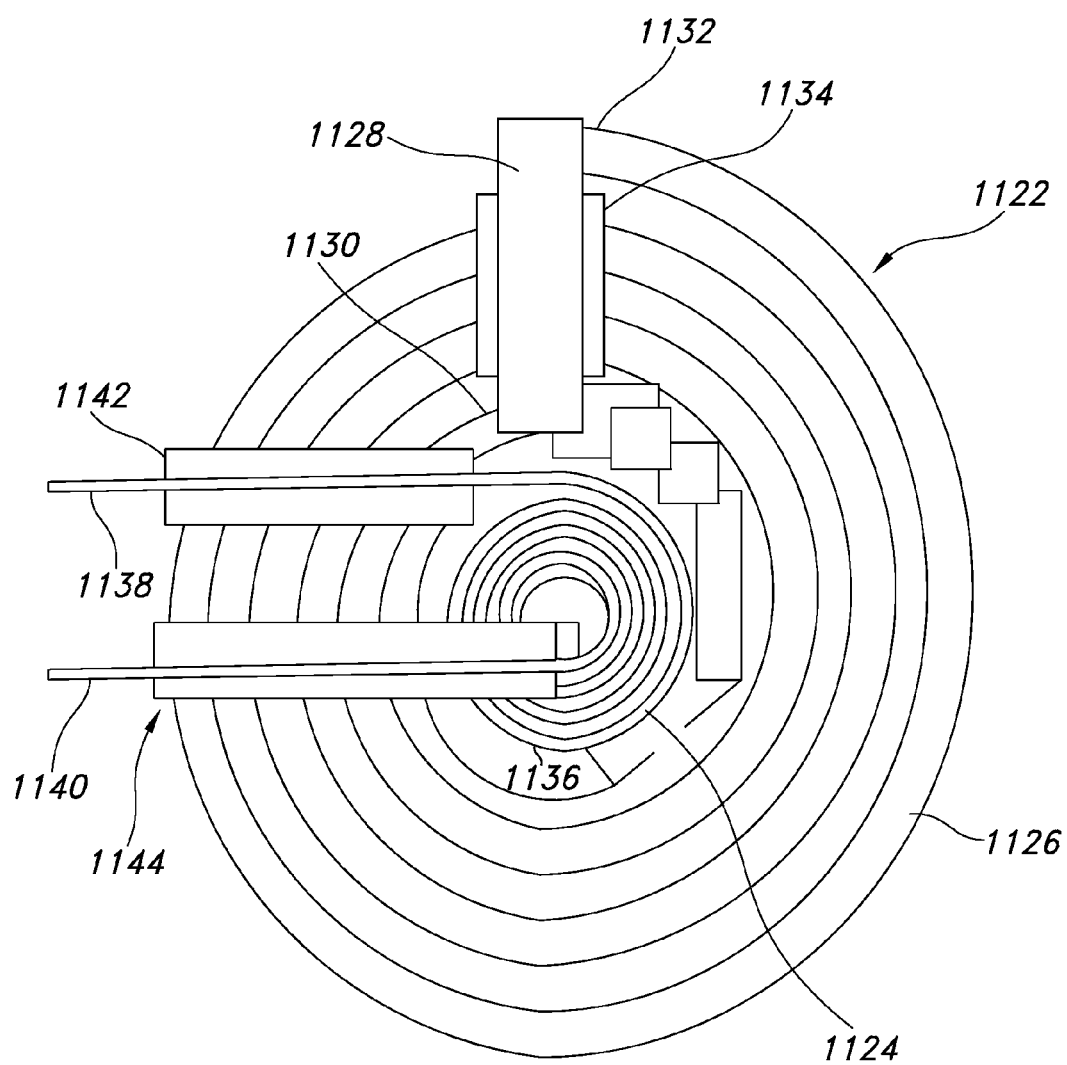
FIG. 64 is a diagram of a first ink printed secondary circuit.

According to another aspect of the invention, a printed ink secondary circuit is illustrated in FIG. 64 and generally designated 1100. As disclosed below, the printed ink secondary circuit 1100 can increase the range of a contactless power supply used in connection with a point of sale display. In particular, the printed ink secondary circuit 1100 can increase the range of a wireless power system by electrically isolating a resistive load from the secondary coil of a contactless power supply.

Referring now to FIG. 64, the printed ink secondary 1100 is formed on a non-conductive flexible substrate and includes a receiver primary trace winding 1122 and a receiver secondary trace winding 1124. The receiver primary trace winding 1122 and the receiver secondary trace winding 1124 are substantially coplanar and coaxial, where the receiver primary trace winding 1122 encompasses and is radially spaced apart from the receiver secondary trace winding 1124. The receiver primary trace winding 1122—which functions as the inductive secondary in a contactless power supply system—is shown as including an inductive element 1126 with three windings and an optional resistive, capacitive, or conductive element 1128 extending across first and second end portions 1130, 1132 of the inductive element 1126. The resistive, capacitive or conductive element 1128, optionally referred to as a printed ink jumper 1128, is spaced apart from the inductive element 26 using a first printed ink insulated layer 1134. The printed ink jumper 1128 can be selected to improve the overall performance and efficiency of the printed ink secondary 1120, and in particular the receiver primary trace winding 1122. For example, the printed ink jumper 1128 can include a capacitive element selected such that the receiver primary trace winding 1122 includes a resonant frequency corresponding to the driving or operating frequency of an primary coil/contactless power supply. In this respect, the printed ink jumper 1128 can be selected to tune or otherwise optimize the performance of the printed ink secondary 1120.

As also shown in FIG. 64, the receiver secondary trace winding 1124 includes an inductive element 1136 with four windings, the inductive element 1136 being substantially disposed within the core of the receiver primary trace winding 1122. The receiver secondary trace winding 24 further includes first and second end portions 1138, 1140 extending over and spaced apart from the primary inductive element 1126. In addition, second and third printed ink insulating layers 1142, 1144 are interposed between the first and second end portions 1138, 1140, respectively, and the primary inductive element 1126. The first and second end portions 1138, 1140 of the receiver secondary trace winding 1124 can be electrically coupled across a load (not shown) to provide a source of electrical power to the load. Although the receiver primary and secondary trace windings 1122, 1124 are shown in FIG. 64 on the same side of the non-conductive flexible substrate, the receiver primary and secondary trace windings 1122, 1124 may alternatively be disposed on opposite sides of the non-conductive flexible substrate. In addition, the receiver primary and secondary trace windings 1122, 1124 may include any suitable geometry as desired, including spiral, rectangular or jagged windings, and may include any number of windings as desired.

As noted above, the printed ink secondary 1120 can be utilized to increase the range of a wireless power system, including a wireless power system associated with a point of sale display, by isolating a resistive load from the receiver primary trace winding 1122. In this respect, the receiver primary trace winding 1122 and jumper element 1128 form a free resonating circuit or isolated resonating circuit. The printed ink secondary 1120 can include a pressure sensitive adhesive applied to the flexible, non-conductive substrate opposite the receiver primary and secondary trace windings 1122, 1124. When applied to a surface associated with the point of sale display, the printed ink secondary 1120 provides a source of electrical power to the load when subject to a time varying magnetic flux. The load can include any device associated with a point of sale display, including an LED, an LCD display, a speaker coil, an energy storage device such as a battery or a capacitor, or other point of sale applications as noted herein.

Figure 65:
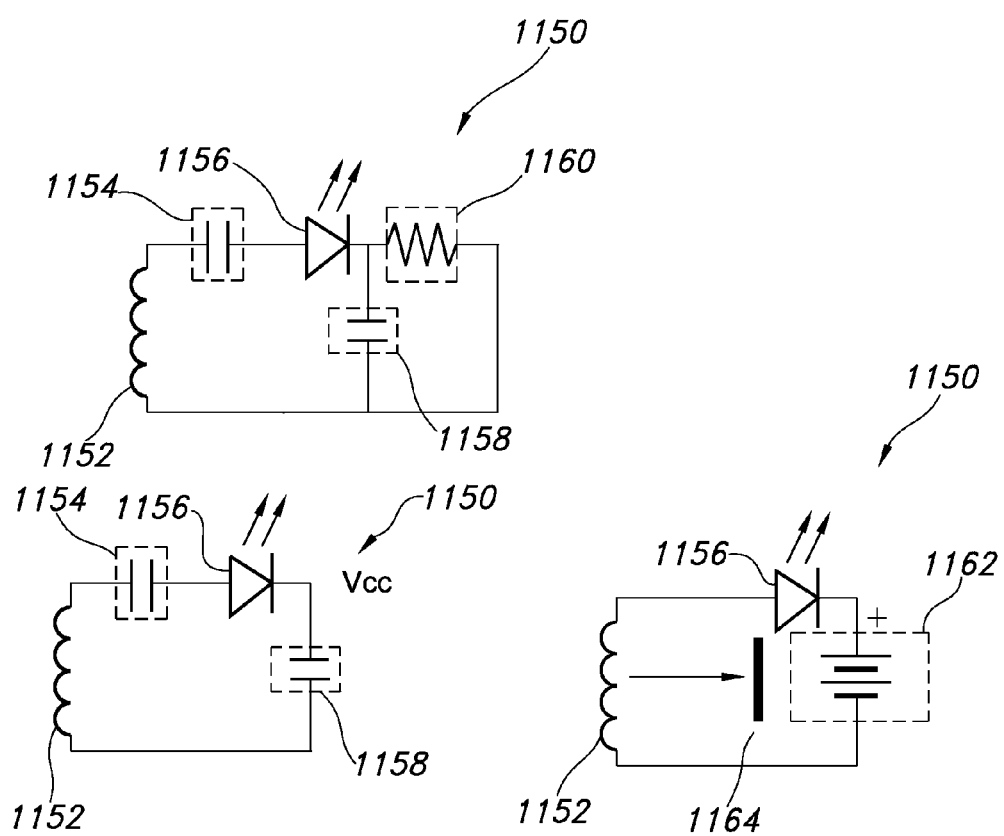
FIG. 65 is a diagram of a second ink printed secondary circuit.

In another embodiment, a printed power supply is shown in FIG. 65 and generally designated 1150. The printed power supply 1150 can be formed on a flexible, insulating substrate and can include a printed secondary trace winding 1152, a printed series resonant capacitive element 1154, a diode 1156, a smoothing capacitive element 1158, and a series resistive load 1160. In the present embodiment, the printed power supply 1150 forms a printed secondary tank circuit for providing a power source to one or more loads 1160 associated with a point of sale display. The printed series resonant capacitive element 1154 can be selected such that the printed power supply 1150 includes a resonant frequency corresponding to the driving or operating frequency of a contactless power supply. That is, the printed series resonant capacitive element 1154 can be selected to tune or otherwise optimize the performance of the printed power supply 1150. In addition, the diode 1156 can be an LED, and further optionally an OLED. In this respect, the LED 1156, together with the smoothing capacitive element 1158, can provide a rectified DC output to a load 1160 while also providing a light output at a relatively low operating voltage. The load 1160 can include any device associated with a point of sale display, including an additional LED, an e-ink display, an LCD display, a speaker coil, and an energy storage device such as a battery or a capacitor, for example. While described above as providing a rectified voltage to a load 1160, the printed power supply 1150 can instead provide a regulated output, Vcc, relative to ground, Gnd, as also shown in FIG. 65. For example, the printed power supply can suitably provide a 3V DC output for use in connection with a point of sale display.

As also shown in FIG. 65, the printed power supply 1150 can provide a rectified voltage to an energy storage device, for example a capacitor or a battery 1162. In this embodiment, the series LED 1156 is electrically connected between a first lead of the inductive winding 1152 and a positive terminal of the battery 1162, optionally using a conductive epoxy. In like manner, the negative terminal of the battery 1162 is electrically connected to the second lead of the inductive winding 1152. The LED 1156 functions as a rectifying diode to prevent backflow of power through the inductive winding 1152. The printed circuit 1150 utilizes the resistance of the inductive winding 1152 in combination with the LED 1156 to facilitate rectification of an AC voltage to charge the energy storage device 1162. The inductive winding 1152 can include a resistance selected such that the winding 1152 functions as a current limiter for the LED 1156 and the battery 1162. For example, the inductive winding 1152 can include a resistance of 800 ohms, though other values can also be utilized. Though not shown, the printed power supply 1150 can include a capacitor connected in series between the inductive winding 1152 and the LED 1156. Optionally, the LED 1156 is operable to indicate the power level of the battery 1162, or to indicate that the power level of the battery has fallen below a predetermined level. For example, the LED intensity could indicate power level if needed.

As also shown in FIG. 65, the printed circuit 1150 can include printed shielding 1164 to at least partially shield the battery 1162 from a magnetic flux, thereby minimizing eddy currents in the battery 1162. A process for assembling the printed circuit of FIG. 65 can include providing a non-conductive substrate, printing an electromagnetic shielding layer 1164 on at least one surface of the substrate, electrically connecting the inductive winding 1152 to an LED 1156 on a front portion of the substrate, and providing a graphic overlay on the front surface of the substrate. The shielding layer 1164 and the graphic overlay can be coextensive with the substrate to provide a supporting surface for the inductive winding 1152 and LED 1156. The circuit 1150 can include first and second electrical contacts, e.g., crimped conductive tabs, on the rear surface of the substrate for electrical connection with a battery 1162. A suitable inductive reader can identify and/or authenticate the printed battery charging circuit 1150 based on its reflected impedance. Upon identification and/or authentication, a contactless power supply can provide power to the printed circuit 1150 according to a predetermined profile, and/or based on the reflected impedance of the printed circuit.

As noted above, the printed power supply 1150 can be formed on a flexible insulating substrate. The substrate can include portions of a product, product packaging, or display surface, for example. Alternatively, the substrate can be separate or separable from the product, product packaging, or display surface, and can instead include a pressure sensitive adhesive opposite the printed power supply 1150. Because the trace elements and LED (or OLED) of the printed power supply are relatively thin, the printed power supply can be readily positionable on a product, product packaging, or display surface with minimal overall effect on the size and weight of the corresponding product, product packaging, or display surface. When subject to a time varying magnetic flux, the resulting DC output can be applied through one or more printed transistors or printed FETs to further add to the functionality of a point of sale display as disclosed herein.

Figure 66:
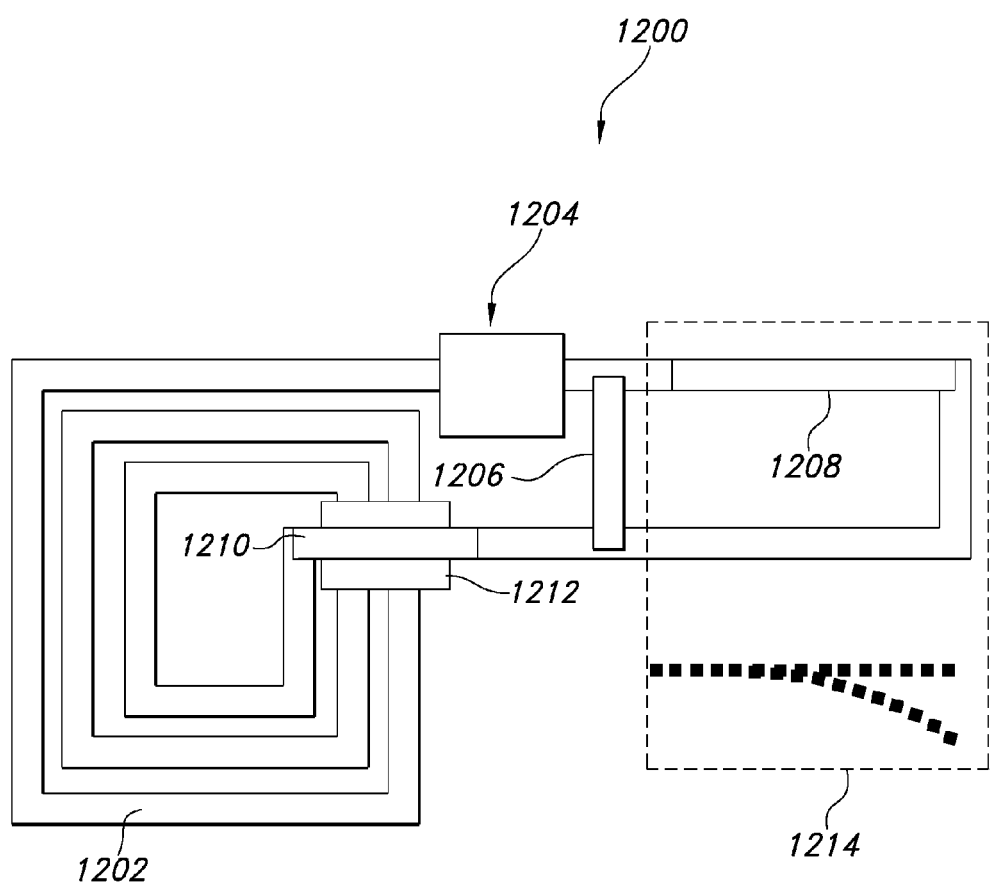
FIG. 66 is a diagram of a printed resonant circuit formed on a pliable tab.
Figure 67:
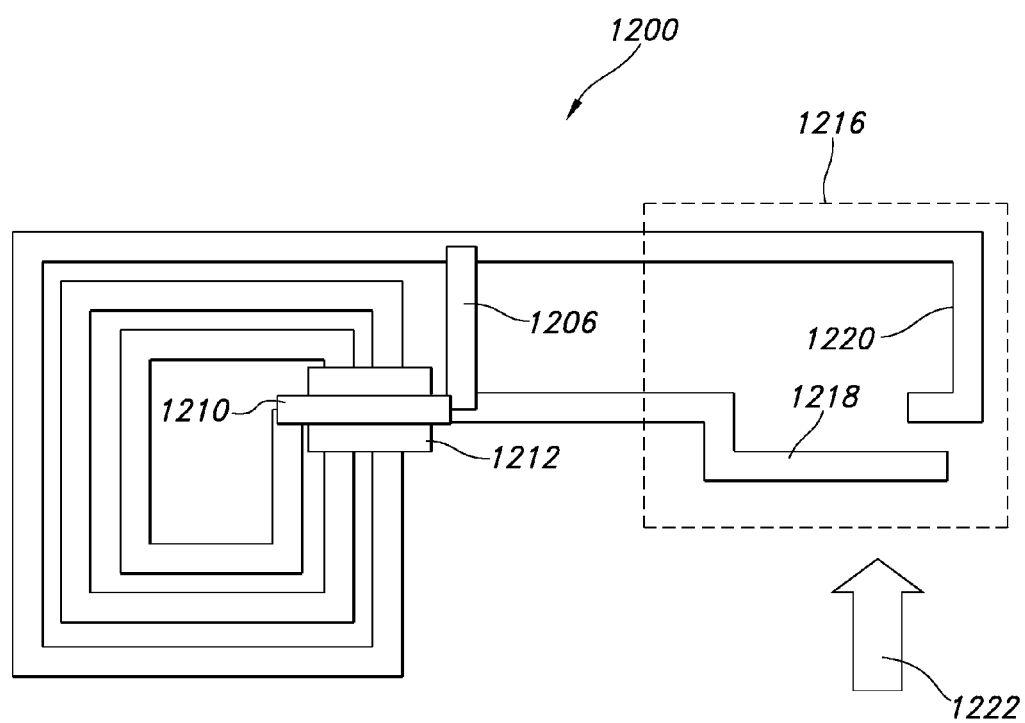
FIG. 67 is a diagram of a printed resonant circuit including a pressure switch.

In another embodiment, a printed secondary circuit is shown in FIG. 66 and generally designated 1200. The secondary circuit 1200 can be formed on a non-conductive flexible substrate and includes a trace winding 1202, a printed ink capacitor 1204, first and second carbon printed resistive elements 1206, 1208, and a printed ink jumper 1210 to interconnect end portions of the trace winding across a printed ink insulated layer 1212. A portion of the substrate 1214, when flexed, results in a change in impedance of the second carbon printed resistive element 1208, thereby changing the reflected impedance of the secondary circuit 1200. In the manner as described above, an inductive reader 102 and/or contactless power supply 700 can identify the change in impedance of the secondary circuit 1200, and can provide power according to the specific needs of the corresponding product or product packaging. This embodiment can be useful, for example, in identifying the position, weight and/or movement of the product or product packaging on a point of sale display. As optionally shown in FIG. 67, the secondary circuit 1200 includes a sensor 1216 that acts as a pressure sensitive switch to cause two traces 1218, 1220 to form a closed circuit when the pressure sensitive switch is compressed by a mechanical load 1222. The varying resistance causes a varying impedance in the secondary circuit 1200, which can be read by the inductive reader and/or contactless power supply as described above. This can be used to indicate the number of times a product has been touched, and can provide basic feedback for indicating use, help, information, reorder and other inputs to the system from the package or device.

Figure 68:
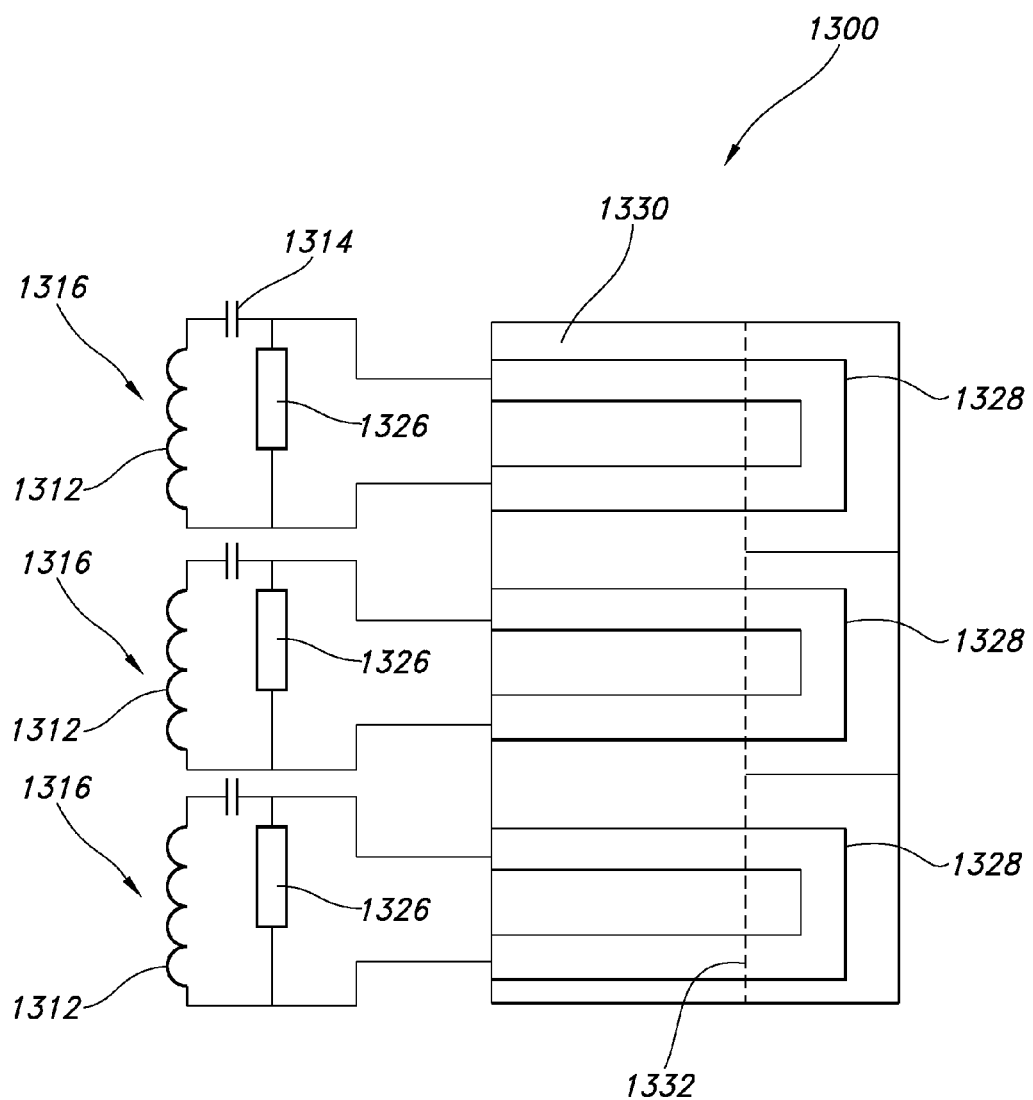
FIG. 68 is a circuit diagram of a printed resonant circuit having resistive elements and bypass elements.
Figure 69:
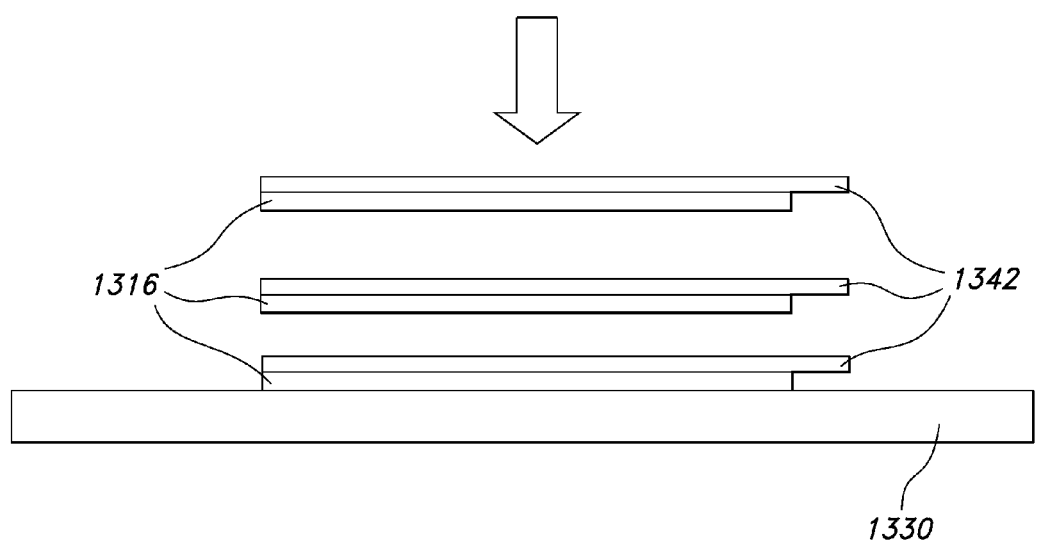
FIG. 69 is a side view of multiple layered resonant circuits.
Figure 70:
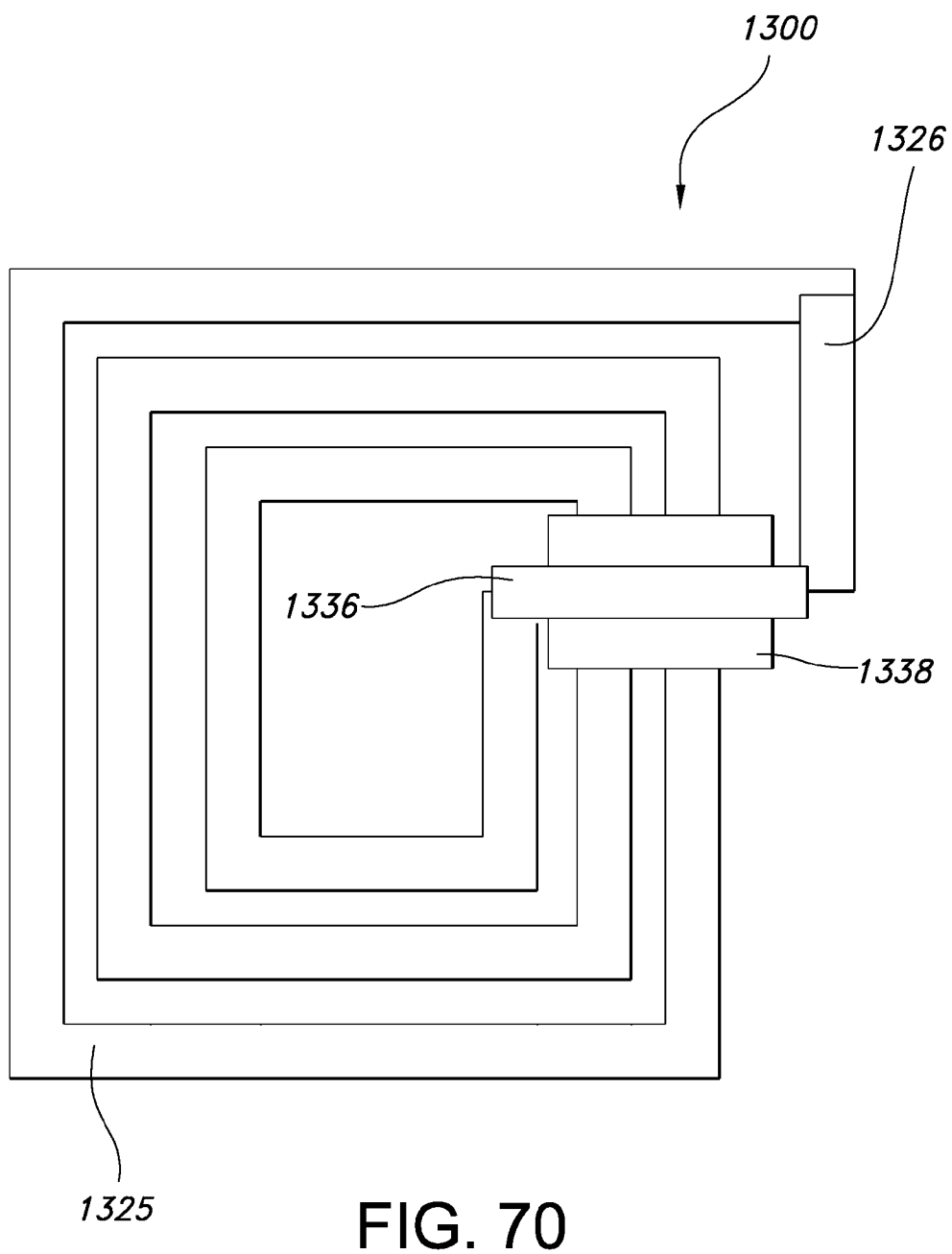
FIG. 70 is a diagram of the printed resonant circuit of FIG. 67 without a bypass element.
Figure 71:
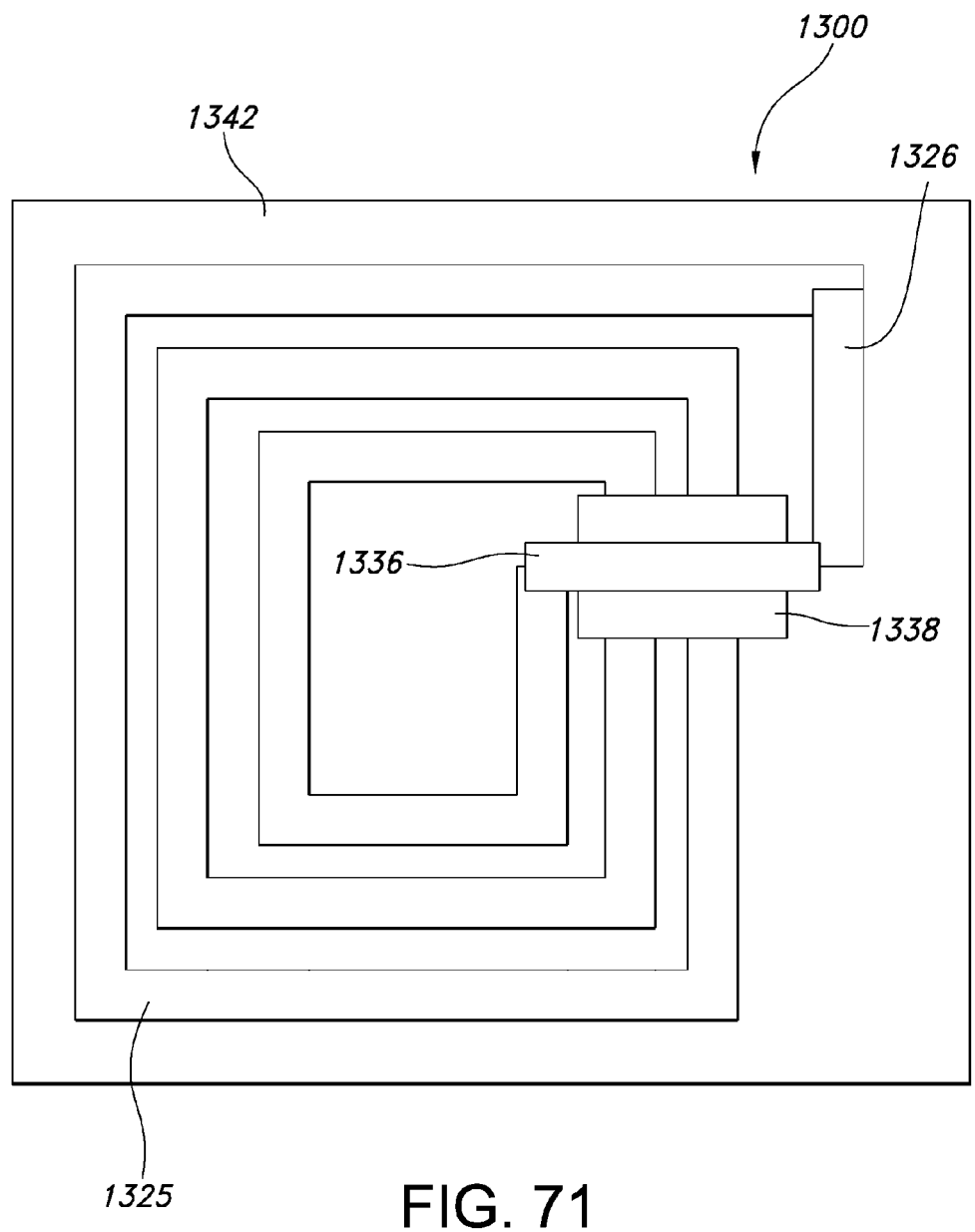
FIG. 71 is a diagram of the printed resonant circuit of FIG. 70 including printed shielding.

In another embodiment, a printed secondary circuit is shown in FIG. 68 and generally designated 1300. The printed secondary circuit 1300 includes multiple isolated resonant circuits 1316, 1318, 1320 for forming a resistor array and including a trace winding 1312, a series resonant capacitor 1314, a series resistive element 1326 and a bypass element 1328 to short the resistive element 1326. The configuration of the resistive element 1326 and the bypass element 1328 may be set by the manufacturer or may be selectable by the user of the product container 1304. For example, physical switches may be employed to select the state of each bypass element 1328. The physical switches may be push-buttons, a multi-pole slider switch, or a multi-pole rotary switch. As shown in FIG. 68, however, the isolated resonant circuits 1316 are formed from conductive ink on a non-conducting substrate 1330, where the bypass element 1328 is opened in response to the separation of a portion of the non-conducting substrate. In the event that the user desires to open one of the bypass elements 1328, a user can tear off a designated portion of the substrate 1330 along a perforation 1332. In this manner, the state of the "n" number of resonant circuits 1316 can indicate which of $2^n$ power levels should be applied to a corresponding product or product container. In addition, the isolated resonant circuits 1316 can overlie each other on a packaging material as shown in FIG. 69. Here, the isolated resonant circuits 1316 are separated via corresponding layers of insulating ink 1342 substantially as set forth above in connection with FIG. 24. As also shown in FIG. 70, both the tear tab and the printed ink capacitor are omitted to illustrate their optional inclusion in the isolated resonant circuit 1300. In this case, the resonant frequency is determined in part based on the number of turns in the isolated resonant circuit 1300. In another variation as shown in FIG. 71, the isolated resonant circuit 1300 is printed over a coating of magnetic shielding material 1342, which can also be applied by printing methods. This option may prove beneficial in instances where improved inductive coupling is needed, e.g., in instances where a secondary circuit is applied to a metal package.

While the printed secondary circuit 1300 is shown in FIG. 68 as including three isolated resonant circuits 1316, the printed secondary circuit 1300 can instead include a single resistor array circuit having a plurality of resistors electrically connected to a single secondary coil. The resistors can be connected in parallel or in series with respect to the secondary coil, and can be selectively added to or removed from the resistor array substantially as set forth above. By selectively adding or removing the resistors to the printed secondary circuit 1300, the inductive identification profile of the printed secondary circuit 1300 can be selectively controlled. For example, as parallel resistors are removed from the circuit 1300, the inductive identification profile, and in particular its amplitude, can change to reflect the change in overall impedance. The printed secondary circuit 1300 can also have an initial inductive identification profile having an initial resistance. As resistors (or other impedance elements) are effectively added or removed from the printed secondary circuit 1300, the inductive identification profile can change to optionally define power needs, product quantities, or other information passively conveyed by the printed secondary circuit 1300.

Figure 72:
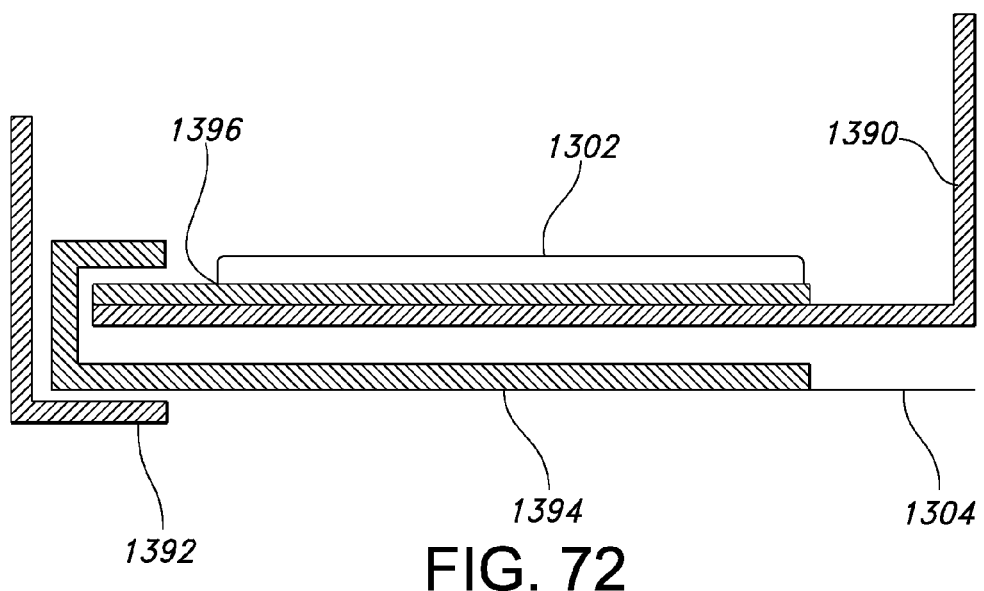
FIG. 72 is a diagram of a first multi-layer resonant circuit supported by a package container.
Figure 73:
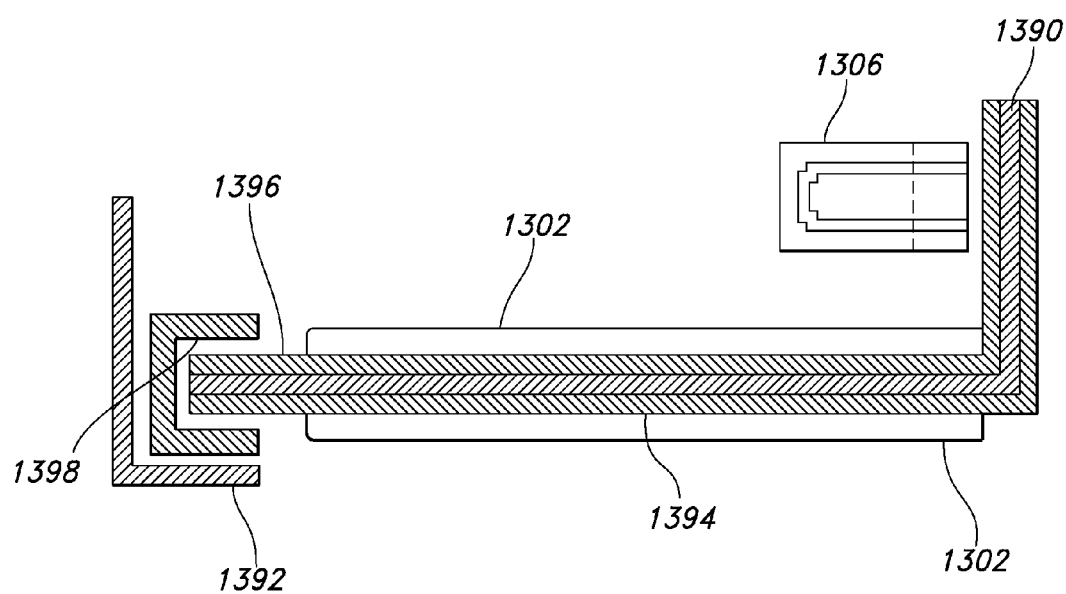
FIG. 73 is a diagram of a second multi-layer resonant circuit supported by a package container.

In the embodiments described in connection with FIGS. 66-71 above, the isolated resonant circuits can be constructed by printing conductive ink on a package substrate. In instances where multiple layers are desired, the layers can be isolated from each other by printing a non-conductive ink layer between adjacent printed circuits. As shown in FIG. 72 for example, a first conductive circuit 1394 is positioned between an exterior label 1304 and a portion of the package substrate 1390. A second conductive circuit 1396 is positioned within the package container, spaced apart from the first conductive circuit 1394 by the packaging substrate 1390. As alternatively shown in FIG. 73, a two layer circuit 1306 can include a first printed secondary circuit 1394 on the exterior of a product packaging 1390 and a second printed secondary circuit 1396 on the interior of a product packaging 1390. Insulating ink layers 1302 can be spaced apart and disposed over the first and second printed secondary circuits 1394, 1396. The conductive circuits 1394, 1396 can also include removal circuit tabs 1306 as described above in connection with FIG. 68 to increase the available circuit topologies. Each printed secondary circuit 1300 can also include a predetermined inductive identification profile set by the manufacturer. For example, the printed secondary circuit 1300 can be laser tuned to include an inductive identification profile that corresponds to the identity of the intended recipient, for example. Also by example, the printed secondary circuit 1300 can be laser tuned to include a single inductive identification profile which can be subsequently varied by manipulation of the one or more switches and/or isolated resonant circuits noted above, optionally by a manufacturer, a retailer and/or an end user.

Figure 74:
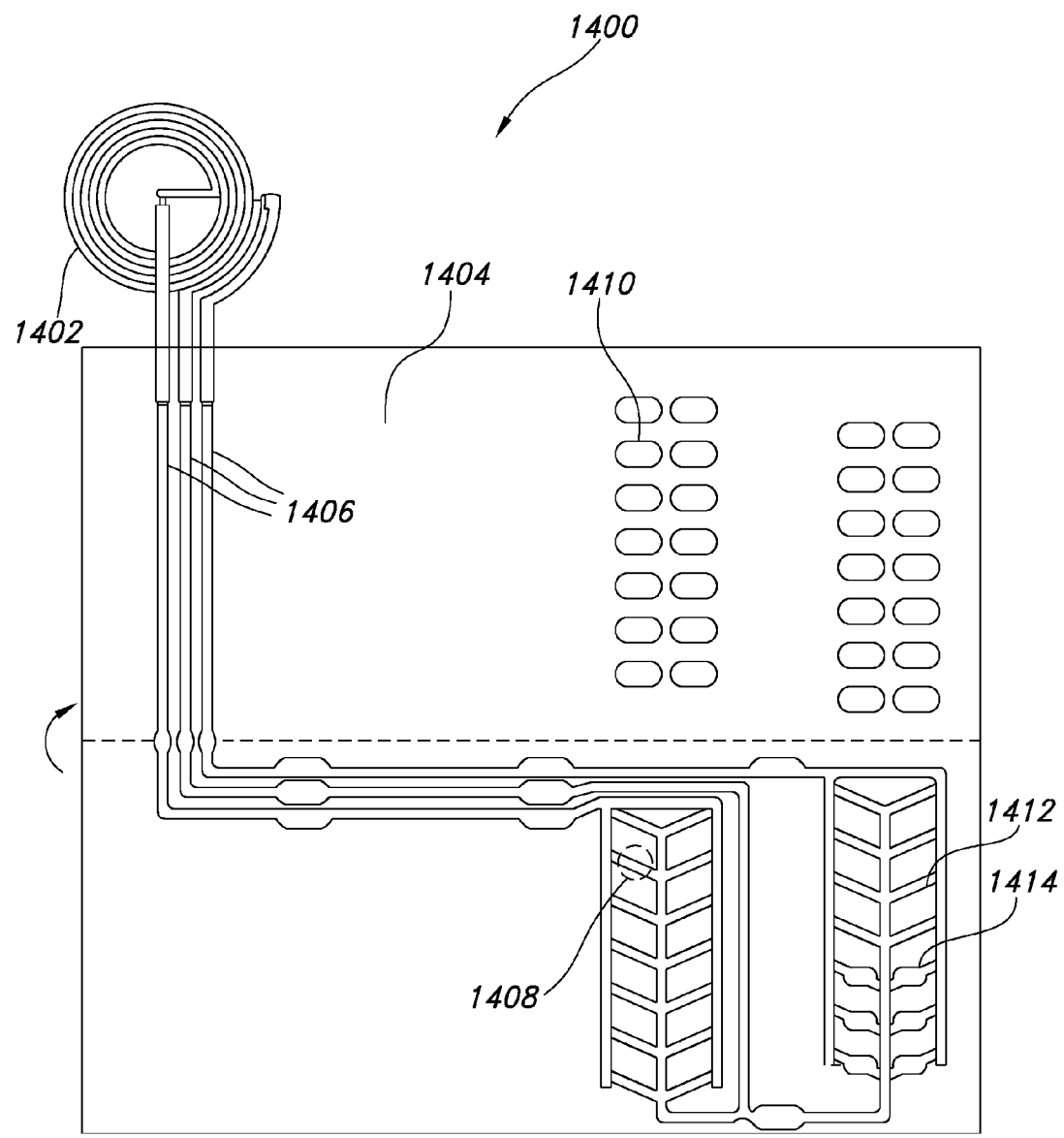
FIG. 74 is a diagram of a printed product count sensor.

In another embodiment, a printed product count sensor is shown in FIG. 74 and generally designated 1400. The product count sensor 1400 includes a secondary coil 1402 and a printed substrate 1404. The substrate 1404 may be formed of paperboard, plastic, composite, or any other suitable material. The product count sensor 1400 can also include one or more conductors 1406 electrically connected to the secondary coil 1402 for forming a closed electrical circuit. The conductors 1406 may be printed on the substrate 1404, adhered using adhesive, or otherwise affixed to the substrate 1404 according to any other suitable technique. The conductors 1406 can extend across perforated sections 1408 in the substrate 1404 that align with product holes 1410 when the lower portion of the substrate 1404 is folded lengthwise over the upper portion of the substrate 1404. Resistive elements 1412 and capacitive elements 1414 can also be positioned over perforated sections 1408. An insulator 1416 can extend over the conductors 1406, the resistive elements 1412 and the capacitive elements 1414. The product count sensor 1400 may be formed with a product container during its manufacture, or affixed to a product container after its manufacture.

The product count sensor 1400 can have an initial impedance when the conductors 1406, the resistive elements 1412 and the capacitive elements 1414 are generally intact. As the perforated sections 1408 are removed, and with them the overlying conductor 1406, resistive element 1412 or capacitive element 1414, the impedance of the product count sensor 1400 can change. This variation in impedance can be measured by a nearby inductive reader. For example, the removal of perforated sections 1408 can correspond to the removal of items from a product display stand. As products are removed, an inductive reader can monitor the change in reflected impedance and correlate the change to the removal of certain products with reference to a look-up table stored in memory. The product amount, product type and unique inductive reader identifier may be transmitted to a central hub 168 and to a network server 174 substantially as set forth above. Accordingly, the printed product count sensor 1400 can allow a dense packaging configuration while overcoming spacing and other limitations associated with standard printed circuits. Alternatively, the removal of select perforated sections 1408 by a retailer can indicate the anticipated expiration date of a package. By optionally using conductive ink rather than copper, and by optionally using tightly overlapping windings that are separated by a thin insulating layer, the desired density and number of layers can be achieved in a cost effective manner. Multiple coils, multiple layers of windings, and multiple electrical circuits can be readily stacked, or can be electrically connected in parallel for improved power handling. These components can be printed directly on a ferromagnetic shielding material in one or more layers according to the desired thickness and density.

The above descriptions are those of the current embodiments of the invention. Various alterations and changes can be made without departing from the spirit and broader aspects of the invention as defined in the appended claims, which are to be interpreted in accordance with the principles of patent law including the doctrine of equivalents. Any reference to elements in the singular, for example, using the articles "a," "an," "the," or "said," is not to be construed as limiting the element to the singular.

The invention claimed is:

1. A method, comprising:
    providing an inductive power supply at a point of sale, the inductive power supply including a primary coil that is adapted to generate a time-varying electromagnetic field;
    providing a package at the point of sale, the package including a plurality of resonant circuits including a secondary coil and a luminescent load, each of the plurality of resonant circuits having a different resonant frequency; and
    selectively driving the primary coil with a plurality of different operating frequencies corresponding to at least two different resonant frequencies of the plurality of resonant circuits,
    wherein the luminescent load of a first one of the plurality of resonant circuits illuminates in response to the primary coil being driven with an operating frequency corresponding to the resonant frequency of the first one of the plurality of resonant circuits, and
    wherein the luminescent load of a second one of the plurality of resonant circuits illuminates in response to the primary coil being driven with an operating frequency corresponding to the resonant frequency of the second one of the plurality of resonant circuits.

2. The method according to claim 1 further including monitoring for motion in proximity to separate from the package and, in response to motion be detected, performing the step of driving the primary coil with a plurality of operating frequencies.

3. The method according to claim 1 wherein the plurality of resonant circuits include a series resonant capacitor having a pre-selected capacitance, the resonant frequency of each of the plurality of resonant circuits being based on the pre-selected capacitance of the corresponding series resonant capacitor.

4. The method according to claim 1 wherein the luminescent load includes a light emitting diode, an e-ink display, an electroluminescent display, or a liquid crystal display.

5. The method according to claim 1 wherein the luminescent load is a light emitting diode, the light emitting diode rectifying an alternating current induced in the resonant circuit.

6. The method according to claim 1 wherein the secondary coil includes a printed trace winding.

7. A system comprising:
    a package at a point of sale, the package including a plurality of resonant circuits including a secondary coil and a luminescent load having a luminescent output, each of the plurality of resonant circuits having a different resonant frequency; and
    an inductive power supply at the point of sale, the inductive power supply including a primary coil that is adapted to generate a time-varying electromagnetic field,
    wherein the primary coil is selectively operable at a plurality of different operating frequencies corresponding to at least two different resonant frequencies of the plurality of resonant circuits, such that the primary coil, when selectively inductively coupled to one or more the plurality of resonant circuits, controls the luminescent output of the luminescent load of the one or more of the plurality of resonant circuits while the product package is at the point of sale.

8. The system according to claim 7 further comprising a motion sensor to detect motion in proximity to and separate from the package, wherein the inductive power supply is operable to control the luminescent output of the luminescent load of the one or more of the plurality of resonant circuits in response to the detected motion.

9. The system according to claim 7 further including a capacitor electrically connected in series between the secondary coil and the luminescent load for each of the plurality of resonant circuits.

10. The system according to claim 7 wherein the luminescent load includes a light emitting diode, an e-ink display, an electroluminescent display, or a liquid crystal display.

11. The system according to claim 7 wherein the luminescent load is a light emitting diode, the light emitting diode rectifying an alternating current induced in the resonant circuit.

12. The system according to claim 7 wherein the secondary coil includes a printed trace winding.

13. A product package comprising:
    a plurality of resonant circuits that are electrically isolated from each other, each of the plurality of resonant circuits including a secondary coil, a series resonant capacitor, and a luminescent load, each of the plurality of resonant circuits having a different resonant frequency;
    wherein a first one of the plurality of resonant circuits provides a luminescent output when electrically coupled to a primary coil that is driven with time-varying current at a first operating frequency corresponding to the resonant frequency of the first resonant circuit; and
    wherein a second one of the plurality of resonant circuits provides a luminescent output when electrically coupled to the primary coil when driven with time-varying current at a second operating frequency corresponding to the resonant frequency of the second resonant circuit,
    such that luminescent output of the product package is controlled by selective operation of the primary coil at the first or second operating frequencies, the primary coil being at the point of sale.

14. The product package of claim 13 wherein the luminescent load includes a light emitting diode.

15. The product package of claim 14 wherein the light emitting diode rectifies an alternating current induced in the corresponding resonant circuit.

16. The product package of claim 13 wherein the luminescent load includes an e-ink display.

17. The product package of claim 13 wherein the luminescent load includes an electroluminescent display.

18. The product package of claim 13 wherein the luminescent load includes a liquid crystal display.

19. The product package of claim 13 wherein the secondary coil includes a printed trace winding.

20. The product package of claim 13 wherein the plurality of luminescent loads are externally viewable at the point of sale.

* * * * *